United States Patent
Merali et al.

(10) Patent No.: US 12,465,582 B2
(45) Date of Patent: Nov. 11, 2025

(54) (S)-2-AMINO-6-((3-AMINOPROPYL)AMINO) HEXANOIC ACID (APL) FOR USE IN THE TREATMENT OF NON-ALCOHOLIC STEATOHEPATITIS (NASH), LIVER INFLAMMATION, HEPATOCELLULAR BALLOONING, LIVER FIBROSIS AND STEATOSIS

(71) Applicant: Temple University—Of The Commonwealth System Of Higher Education, Philadelphia, PA (US)

(72) Inventors: Salim Merali, Philadelphia, PA (US); Wayne E. Childers, Philadelphia, PA (US); Carlos Barrero, Philadelphia, PA (US); George C. Morton, Philadelphia, PA (US); Mario Cesar Rico, Philadelphia, PA (US)

(73) Assignee: Temple University—Of The Commonwealth System of Higher Education, Philadelphia, PA (US)

( * ) Notice: Subject to any disclaimer, the term of this patent is extended or adjusted under 35 U.S.C. 154(b) by 587 days.

(21) Appl. No.: 17/996,830

(22) PCT Filed: Apr. 23, 2021

(86) PCT No.: PCT/US2021/028849
§ 371 (c)(1),
(2) Date: Oct. 21, 2022

(87) PCT Pub. No.: WO2021/217006
PCT Pub. Date: Oct. 28, 2021

(65) Prior Publication Data
US 2023/0172886 A1 Jun. 8, 2023

Related U.S. Application Data

(60) Provisional application No. 63/015,175, filed on Apr. 24, 2020.

(51) Int. Cl.
*A61K 31/198* (2006.01)
*A61K 9/00* (2006.01)
*A61P 1/16* (2006.01)

(52) U.S. Cl.
CPC .......... *A61K 31/198* (2013.01); *A61K 9/0056* (2013.01); *A61P 1/16* (2018.01)

(58) Field of Classification Search
CPC ........ A61K 31/198; A61K 9/0056; A61P 1/16
See application file for complete search history.

(56) References Cited

U.S. PATENT DOCUMENTS

| | | |
|---|---|---|
| 5,059,595 A | 10/1991 | Le Grazie |
| 5,073,543 A | 12/1991 | Marshall et al. |
| 5,120,548 A | 6/1992 | McClelland et al. |
| 5,344,846 A | 9/1994 | Jakus et al. |
| 5,591,767 A | 1/1997 | Mohr et al. |
| 5,639,476 A | 6/1997 | Oshlack et al. |
| 5,674,533 A | 10/1997 | Santus et al. |
| 5,733,566 A | 3/1998 | Lewis |
| 6,958,325 B2 | 10/2005 | Domb |
| 7,799,782 B2 | 9/2010 | Munson et al. |
| 10,729,670 B2 | 8/2020 | Merali et al. |
| 2009/0253641 A1 | 10/2009 | Neufer et al. |
| 2013/0030007 A1 | 1/2013 | Penninger et al. |
| 2014/0286909 A1 | 9/2014 | Garcia-Rodenas |
| 2014/0294774 A1 | 10/2014 | Nieuwdorp et al. |
| 2015/0182483 A1 | 7/2015 | Goldberg et al. |
| 2016/0038542 A1 | 2/2016 | Riordan et al. |
| 2016/0113951 A1 | 4/2016 | Dhurandhar et al. |

FOREIGN PATENT DOCUMENTS

| | | |
|---|---|---|
| CN | 103833623 A | 6/2014 |
| CN | 103833623 B | 7/2016 |
| WO | WO 9732862 A1 | 9/1997 |
| WO | WO 2009100363 A2 | 8/2009 |
| WO | WO 2015161448 A1 | 10/2015 |
| WO | WO 2015187942 A1 | 12/2015 |
| WO | WO 2017044933 A1 | 3/2017 |
| WO | WO 2017208232 A1 | 12/2017 |
| WO | WO 2019173633 A1 | 9/2019 |
| WO | WO 2019173640 A1 | 9/2019 |
| WO | WO 2020061232 A1 | 3/2020 |
| WO | WO-2021217006 A1 * | 10/2021 ................ A61P 1/16 |

OTHER PUBLICATIONS

"2-Amino-6-(4-aminobutylamino)hexanoic acid" PubChem, National Center for Biotechnology Information, CID 21878230, Dec. 5, 2007, from URL: https://pubchem.ncbi.nlm.nih.gov/compound/21878230, (8 pages).

"Carboxyspermidine", PubChem, National Center for Biotechnology Information, CID 194196, Aug. 9, 2005, from URL: https://pubchem.ncbi.nlm.nih.gov/compound/194196, (17 pages).

"Deoxyhypusine", PubChem, National Center for Biotechnology Information, CID 122083, Aug. 3, 2005, retrieved Oct. 22, 2017 from URL: https://pubchem.ncbi.nlm.nih.gov/compound/122083, (16 pages).

"Hypusine", PubChem, National Center for Biotechnology Information, CID 65396, Aug. 8, 2005, retrieved May 5, 2019 from URL: https://pubchem.ncbi.nlm.nih.gov/compound/65396, (16 pages).

"QOATVJLOYOWEAF-GSVOUGTGSA-N", PubChem, National Center for Biotechnology Information, CID 42552857, May 30, 2009, retrieved Apr. 30, 2019 from URL: https://pubchem.ncbi.nlm.nih.gov/compound/42552857, (7 pages).

"SCHEMBL6316203", PubChem, National Center for Biotechnology Information, CID 54059533, Dec. 4, 2011, retrieved Oct. 26, 2017 from URL: https://pubchem.ncbi.nlm.nih.gov/compound/54059533, (13 pages).

(Continued)

*Primary Examiner* — Kevin E Weddington
(74) *Attorney, Agent, or Firm* — Riverside Law LLP

(57) ABSTRACT

(S)-2-amino-6-((3-aminopropyl)amino)hexanoic acid (APL) for use in the treatment of non-alcoholic steatohepatitis (NASH), liver inflammation, hepatocellular ballooning, liver fibrosis and steatosis.

37 Claims, 12 Drawing Sheets

(56) References Cited

OTHER PUBLICATIONS

"XWFMFISJOAWOMB-UHFFFAOYSA-N" PubChem, National Center for Biotechnology Information, CID 18674791, Dec. 4, 2007, retrieved May 5, 2019 from URL: https://pubchem.ncbi.nlm.nih.gov/compound/18674791, (8 pages).
Ascaso et al., "Diagnosing Insulin Resistance by Simple Quantitative Methods in Subjects With Normal Glucose Metabolism", Diabetes Care, vol. 26, No. 12, Dec. 2003, pp. 3320-3325, DOI: 10.2337/diacare.26.12.3320, (6 pages).
Bey et al., "Analogs of ornithine as inhibitors of ornithine decarboxylase. New deductions concerning the topography of the enzyme's active site", Journal of Medicinal Chemistry, Vo. 21, No. 1, 1978, pp. 50-55, DOI: 10.1021/jm00199a009, (6 pages).
Beyaz et al., "High-fat diet enhances stemness and tumorigenicity of intestinal progenitors", Nature, vol. 531, Mar. 3, 2016, pp. 53-58, DOI: 10.1038/nature17173, (6 pages).
Beyaz et al., "High-fat diet enhances stemness and tumorigenicity of intestinal progenitors", Nature, vol. 531, Mar. 3, 2016, pp. 53-58, DOI: 10.1038/nature17173, Supplementary Materials (13 pages).
Boden et al., "Excessive caloric intake acutely causes oxidative stress, GLUT4 carbonylation, and insulin resistance in healthy men", Science Translational Medicine, vol. 7, No. 304, Sep. 9, 2015, pp. 304re7, DOI: 10.1126/scitranslmed.aac4765, (10 pages).
Boden et al., "Excessive caloric intake acutely causes oxidative stress, GLUT4 carbonylation, and insulin resistance in healthy men", Science Translational Medicine, vol. 7, No. 304, Sep. 9, 2015, pp. 304re7, DOI: 10.1126/scitranslmed.aac4765, Supplementary Materials, (13 pages).
Datta et al., "Glutamate metabolism in HIV-1 infected macrophages: Role of HIV-1 Vpr", Cell Cycle, vol. 15, No. 17, May 31, 2016, pp. 2288-2298, DOI: 10.1080%2F15384101.2016.1190054, (11 pages).
Demozay et al., "FALDH Reverses the Deleterious Action of Oxidative Stress Induced by Lipid Peroxidation Product 4-Hydroxynonenal on Insulin Signaling in 3T3-L1 Adipocytes", Diabetes, vol. 57, No. 5, May 2008, pp. 1216-1226, DOI: 10.2337/db07-0389, (11 pages).
Dietmair et al., "Towards quantitative metabolomics of mammalian cells: Development of a metabolite extraction protocol", Analytical Biochemistry, vol. 404, No. 2, Sep. 15, 2010, pp. 155-164, DOI:10.1016/j.ab.2010.04.031, Abstract (1 page).
Extended European Search Report for EP Application No. 17849523.0 dated Mar. 20, 2020 (9 pages).
Extended European Search Report for EP Application No. 19763756.4 dated Nov. 23, 2021 (7 pages).
Extended European Search Report for EP Application No. 19763857.0 dated Nov. 30, 2021 (8 pages).
International Search Report and Written Opinion for PCT/US2017/050462 dated Dec. 21, 2017 (11 pages).
International Search Report and Written Opinion for PCT/US2019/021220 dated Jun. 3, 2019 (8 pages).
International Search Report and Written Opinion for PCT/US2019/021230 dated Jun. 10, 2019 (7 pages).
International Search Report and Written Opinion for PCT/US2021/028849 dated Jul. 20, 2021 (11 pages).
Kastle et al., "Protein oxidative modification in the aging organism and the role of the ubiquitin proteasomal system", Current Pharmaceutical Design, vol. 17, No. 36, Dec. 2011, pp. 4007-4022, DOI: 10.2174/138161211798764898, Abstract (1 page).
Maier et al., "Hypusine: a New Target for Therapeutic Intervention in Diabetic Inflammation", Discovery Medicine, vol. 10, No. 50, Jul. 2010, pp. 18-23, (7 pages).
Nathan, David M., on behalf of the International Expert Committee, "International Expert Committee Report on the Role of the A1C Assay in the Diagnosis of Diabetes: Response to Kilpatrick, Bloomgarden, and Zimmet", Diabetes Care, vol. 32, No. 12, Dec. 2009, pp. e160, DOI: 10.2337/dc09-1777, (1 page).
Paoletti et al., "Metabolic Syndrome, Inflammation and Atherosclerosis", Vascular Health and Risk Management, vol. 2, No. 2, Jun. 2006, pp. 145-152, DOI: 10.2147/vhrm.2006.2.2.145, (8 pages).
Reaven, Gerald M., "Role of Insulin Resistance in Human Disease", Nutrition, vol. 13, No. 1, Jan. 1997, pp. 64-66, DOI: 10.1016/s0899-9007(96)00380-2, (1 page).
Robbins et al., "Inhibition of Deoxyhypusine Synthase Enhances Islet β Cell Function and Survival in the Setting of Endoplasmic Reticulum Stress and Type 2 Diabetes", The Journal of Biological Chemistry, vol. 285, No. 51, Dec. 17, 2010, pp. 39943-39952, DOI: 10.1074/jbc.M110.170142, (11 pages).
Schaur et al., "4-Hydroxy-nonenal—A Bioactive Lipid Peroxidation Product", Biomolecules, vol. 5, No. 4, Sep. 30, 2015, pp. 2247-2337, DOI: 10.3390/biom5042247, (91 pages).
Schaur, Rudolf J., "Basic aspects of the biochemical reactivity of 4-hydroxynonenal", Molecular Aspects of Medicine, vol. 24, No. 4-5, Aug.-Oct. 2003, pp. 149-159, DOI: 10.1016/S0098-2997(03)00009-8, Abstract (1 page).
Tersey et al., "Protective effects of polyamine depletion in mouse models of type 1 diabetes: implications for therapy", Amino Acids, vol. 46, No. 3, Jul. 12, 2013, pp. 633-642, DOI: 10.1007/s00726-013-1560-7, Author Manuscript (16 pages).
The International Expert Committee, "International Expert Committee Report on the Role of the A1C Assay in the Diagnosis of Diabetes", Diabetes Care, vol. 32, No. 7, Jul. 2009, pp. 1327-1334 DOI: 10.2337/dc09-9033, (8 pages).
Xu et al., "Chapter Fourteen—Detecting Protein Carbonylation in Adipose Tissue and in Cultured Adipocytes", Method in Enzymology, vol. 538, 2014, pp. 249-261, DOI: 10.1016/B978-0-12-800280-3.00014-1, Abstract (1 page).
Zhai et al., "Structural Analysis and Optimization of Context-Independent Antibodies", Journal of Molecular Biology, vol. 428, No. 3, Feb. 13, 2016, pp. 603-617, DOI: 10.1016/j.jmb.2016.01.006, (15 pages).

* cited by examiner

(S)-2-AMINO-6-((3-AMINOPROPYL)AMINO) HEXANOIC ACID (APL) FOR USE IN THE TREATMENT OF NON-ALCOHOLIC STEATOHEPATITIS (NASH), LIVER INFLAMMATION, HEPATOCELLULAR BALLOONING, LIVER FIBROSIS AND STEATOSIS

CROSS-REFERENCE TO RELATED APPLICATIONS

The present application is a 35 U.S.C. § 371 National Stage Application of International Application No. PCT/US2021/028849, filed on Apr. 23, 2021, which claims the benefit of U.S. Provisional Application No. 63/015,175, filed Apr. 24, 2020, each of which is incorporated by reference in its entirety.

TECHNICAL FIELD

The invention relates to methods and compositions for the treatment of non-alcoholic steatohepatitis (NASH).

BACKGROUND

Non-alcoholic steatohepatitis (NASH) is a non-benign disorder characterized by substantial health risks. Subjects diagnosed with NASH are at significantly increased risk of morbidity and mortality. More specifically, NASH is characterized by increased risk of cardiovascular and liver-related mortality. NASH can lead to cirrhosis, which in turn can result in fluid retention, muscle wasting, bleeding from the intestines, and liver failure. Liver transplantation is the only treatment for advanced cirrhosis with liver failure, with NASH is currently the number two reason for liver transplants.

Accordingly, there is a continuing need for therapeutic agents for the treatment of NASH.

SUMMARY

Described herein in that are new methods for treating liver diseases and disorders, including non-alcoholic steatohepatitis (NASH).

In one aspect, the invention features a method for treating non-alcoholic steatohepatitis (NASH), the method comprising administering to the subject in need thereof an effective amount of a compound according to Formula I,

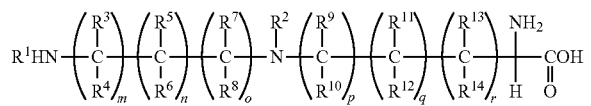

or a pharmaceutically acceptable salt thereof, wherein:

$R^1$ is selected from the group consisting of hydrogen, —($C_1$-$C_8$)alkyl, —($C_1$-$C_8$)alkenyl, —($C_1$-$C_8$)alkynyl, unsubstituted or substituted -ara($C_1$-$C_6$)alkyl, unsubstituted or substituted -heteroara($C_1$-$C_6$)alkyl, where the substituents on said substituted ara($C_1$-$C_6$)alkyl and substituted heteroara($C_1$-$C_6$)alkyl are selected from the group consisting of halogen, —CN, —$NO_2$, —$NH_2$, —NH($C_1$-$C_6$)alkyl, —N[($C_1$-$C_6$)alkyl]$_2$, —OH, halo($C_1$-$C_6$)alkyl, —($C_1$-$C_6$)alkoxy, halo($C_1$-$C_6$)alkoxy, —SH, thio($C_1$-$C_6$)alkyl, —$SONH_2$, —$SO_2NH_2$, —SO—($C_1$-$C_6$)alkyl, —$SO_2$—($C_1$-$C_6$)alkyl, —$NHSO_2$($C_1$-$C_6$)alkyl, and —$NHSO_2NH_2$;

$R^2$ is selected from the group consisting of hydrogen, —($C_1$-$C_8$)alkyl, —($C_1$-$C_8$)alkenyl, —($C_1$-$C_8$)alkynyl, unsubstituted or substituted -ara($C_1$-$C_6$)alkyl, unsubstituted or substituted -heteroara($C_1$-$C_6$)alkyl, where the substituents on said substituted ara($C_1$-$C_6$)alkyl and substituted heteroara($C_1$-$C_6$)alkyl are selected from the group consisting of halogen, —CN, —$NO_2$, —$NH_2$, —OH, halo($C_1$-$C_6$)alkyl, —($C_1$-$C_6$)alkoxy, halo($C_1$-$C_6$)alkoxy, —SH, thio($C_1$-$C_6$)alkyl, —$SONH_2$, —$SO_2NH_2$, —SO—($C_1$-$C_6$)alkyl, —$SO_2$—($C_1$-$C_6$)alkyl, —$NHSO_2$($C_1$-$C_6$)alkyl, and —$NHSO_2NH_2$;

$R^3$, $R^4$, $R^7$, $R^8$, $R^9$, $R^{10}$, $R^{13}$ and $R^{14}$ are independently selected from the group consisting of hydrogen and —($C_1$-$C_6$)alkyl;

$R^5$ and $R^6$ are independently selected from the group consisting of hydrogen, —($C_1$-$C_6$)alkyl and —OH, provided that both $R^5$ and $R^6$ cannot be —OH;

$R^{11}$ and $R^{12}$ are independently selected from the group consisting of hydrogen, —($C_1$-$C_6$)alkyl and —OH, provided that both $R^{11}$ and $R^{12}$ cannot be —OH;

m is an integer from 1 to 4;
n is an integer from 0 to 4
is an integer from 0 to 4;
p is an integer from 1 to 4;
q is an integer from 0 to 4; and
r is an integer from 0 to 4.

In another aspect, the invention features compounds according to Formula I, or a pharmaceutically acceptable salt thereof, for use in treating NASH in a subject.

In another aspect, the invention features compounds of Formula I, or a pharmaceutically acceptable salt thereof, for preparation of a medicament for treatment of NASH.

In embodiments, a compound of Formula I is (S)-2-amino-6-((3-aminopropyl)amino)hexanoic acid,

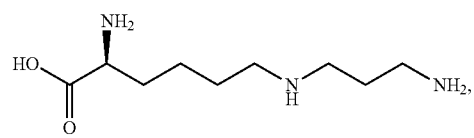

or a pharmaceutically acceptable salt thereof. In embodiments, a compound of Formula (I) is (S)-2-amino-6-((3-aminopropyl)amino)hexanoic acid dihydrochloride,

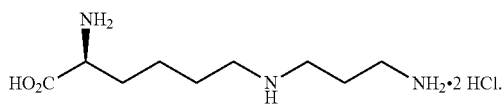

In embodiments, a compound of Formula I is (S)-2-amino-5-((6-aminohexyl)amino)pentanoic acid,

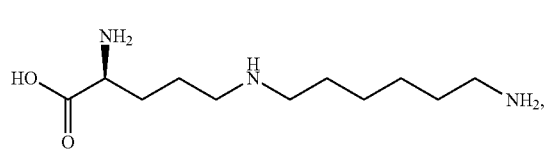

or a pharmaceutically acceptable salt thereof. In embodiments, a compound of Formula I is (S)-2-amino-5-((6-aminohexyl)amino)pentanoic acid trihydrochloride,

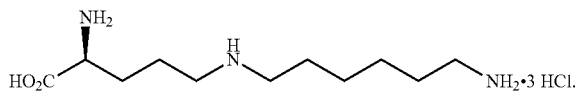

In embodiments, a compound of Formula I is (S)-2-amino-5-((5-aminopentyl)amino)pentanoic acid,

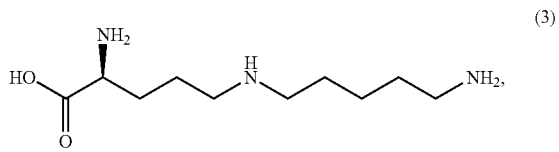 [SMILES: NCCCCCNCCC[C@H](N)C(=O)O]

or a pharmaceutically acceptable salt thereof. In embodiments, a compound of Formula I is (S)-2-amino-5-((5-aminopentyl)amino)pentanoic acid trihydrochloride,

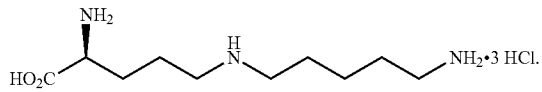

In embodiments, $R^1$ and $R^2$ are independently selected from the group consisting of hydrogen and —$(C_1-C_8)$alkyl.

In embodiments, each of $R^3$, $R^4$, $R^5$, $R^7$ and $R^8$ is independently selected from hydrogen and —$(C_1-C_8)$alkyl.

In embodiments, each of $R^9$, $R^{10}$, $R^{11}$, $R^{12}$, $R^{13}$ and $R^{14}$ is independently selected from hydrogen and —$(C_1-C_8)$alkyl.

In embodiments, each of $R^3$, $R^4$, $R^5$, $R^6$, $R^7$ and $R^8$ is independently selected from hydrogen and —$(C_1-C_8)$alkyl; and each of $R^9$, $R^{10}$, $R^{11}$, $R^{12}$, $R^{13}$ and $R^{14}$ is independently selected from hydrogen and —$(C_1-C_8)$alkyl.

In embodiments, or a pharmaceutically acceptable salt thereof, the sum of m+n+o is in the range of from 2 to 10, and the sum of p+q+r is in the range of from 2 to 10.

In embodiments, m is 3; p is 4; each of n, o, q and r is zero. In embodiments, $R^3$, $R^4$, $R^9$, and $R^{10}$ are independently selected from hydrogen and —$(C_1-C_8)$alkyl. In embodiments, $R^1$ and $R^2$ are independently selected from the group consisting of hydrogen and —$(C_1-C_8)$alkyl. In embodiments, $R^1$, $R^2$, $R^3$, $R^4$, $R^9$ and $R^{10}$ are hydrogen.

In embodiments, m is 4; n is 2; o is zero; p is 3; q is 1; and r is zero. In embodiments, $R^3$, $R^4$, $R^5$, $R^6$, $R^9$, $R^{10}$, $R^{11}$, and $R^{12}$ are independently selected from hydrogen and —$(C_1-C_8)$alkyl. In embodiments, $R^1$ and $R^2$ are independently selected from the group consisting of hydrogen and —$(C_1-C_8)$alkyl. In embodiments, $R^1$, $R^2$, $R^3$, $R^4$, $R^5$, $R^6$, $R^9$, $R^{10}$, $R^{11}$, and $R^{12}$, are hydrogen.

In embodiments, m is 4; n is 1; o is zero; p is 3; q is 1; and r is zero. In embodiments, $R^3$, $R^4$, $R^5$, $R^6$, $R^9$, $R^{10}$, $R^{11}$ and $R^{12}$ are independently selected from hydrogen and —$(C_1-C_8)$alkyl. In embodiments, $R^1$ and $R^2$ are independently selected from the group consisting of hydrogen and —$(C_1-C_8)$alkyl. In embodiments, $R^1$, $R^2$, $R^3$, $R^4$, $R^5$, $R^6$, $R^9$, $R^{10}$, $R^{11}$, and $R^{12}$ are hydrogen.

In embodiments, a subject is a human.

In embodiments, a compound of Formula I (e.g., any one of Compounds (1), (2), and (3)), or any pharmaceutically acceptable salt thereof, is administered to a subject for a time period that is at least about four, five, six, seven, eight, nine, ten, eleven, twelve, thirteen, fourteen, fifteen, or sixteen weeks.

In embodiments, a compound of Formula I (e.g., any one of Compounds (1), (2), and (3)), or any pharmaceutically acceptable salt thereof, is administered to a subject for a time period that is at least about 4-6, 4-8, 4-10, 4-12, 4-14, or 4-16 weeks.

In embodiments, a compound of Formula I (e.g., any one of Compounds (1), (2), and (3)), or any pharmaceutically acceptable salt thereof, is administered to a subject at a dose of about 2-1000, 10-1000 or 10-100 mg/kg/day.

In embodiments, a compound of Formula I (e.g., any one of Compounds (1), (2), and (3)), or any pharmaceutically acceptable salt thereof, is administered to a subject at a dose that is about 10 mg/kg or greater per day.

In embodiments, a compound of Formula I (e.g., any one of Compounds (1), (2), and (3)), or any pharmaceutically acceptable salt thereof, is administered to a subject at a dose that is about 2 mg/kg or greater per day.

In embodiments, a compound of Formula I (e.g., any one of Compounds (1), (2), and (3)), or any pharmaceutically acceptable salt thereof, is administered to a subject at a total daily dose that is about 100-5000, 500-5000 or 600-3000 mg per day.

In embodiments, a compound of Formula I (e.g., any one of Compounds (1), (2), and (3)), or any pharmaceutically acceptable salt thereof, is orally administered to a subject.

In embodiments, a subject has a NAFLD Activity Score (NAS) of ≥4.

In embodiments, a subject has a NAFLD Activity Score (NAS) of ≥5.

In embodiments, administering of the compound of Formula I (e.g., any one of Compounds (1), (2), and (3)), or any pharmaceutically acceptable salt thereof, results in a NAFLD Activity Score (NAS) of <4.

In embodiments, a subject has non-cirrhotic NASH.

In embodiments, a subject has cirrhotic NASH.

In embodiments, a subject has liver inflammation. In embodiments, liver inflammation is lobular inflammation.

In embodiments, administering of the compound of Formula I (e.g., any one of Compounds (1), (2), and (3)), or a pharmaceutically acceptable salt thereof results in a decrease in liver inflammation.

In embodiments, administering of the compound of Formula I (e.g., any one of Compounds (1), (2), and (3)), or a pharmaceutically acceptable salt thereof results in a liver inflammation score of 0 or 1.

In embodiments, the liver of the subject is characterized by hepatocellular ballooning.

In embodiments, administering of the compound of Formula I (e.g., any one of Compounds (1), (2), and (3)), or a pharmaceutically acceptable salt thereof results in a decrease in hepatocellular ballooning.

In embodiments, administering of the compound of Formula I (e.g., any one of Compounds (1), (2), and (3)), or a pharmaceutically acceptable salt thereof results in ballooning score of 0.

In embodiments, a subject has elevated hepatic alanine aminotransferase (ALT) levels.

In embodiments, administering of the compound of Formula I (e.g., any one of Compounds (1), (2), and (3)), or a pharmaceutically acceptable salt thereof results in decreased hepatic alanine aminotransferase (ALT) levels.

In embodiments, a subject has elevated hepatic aspartate aminotransferase (AST) levels.

In embodiments, administering of the compound of Formula I (e.g., any one of Compounds (1), (2), and (3)), or a pharmaceutically acceptable salt thereof results in decreased hepatic aspartate aminotransferase (AST) levels.

In embodiments, a subject has liver fibrosis. In embodiments, a subject has stage 2, stage 3, or stage 4 liver fibrosis. In embodiments, a subject has cirrhosis.

In embodiments, administering of the compound of Formula I (e.g., any one of Compounds (1), (2), and (3)), or a pharmaceutically acceptable salt thereof results in stabilization of liver fibrosis in the subject.

In embodiments, administering of the compound of Formula I (e.g., any one of Compounds (1), (2), and (3)), or a pharmaceutically acceptable salt thereof results in reversal of liver fibrosis in the subject.

In embodiments, a subject has a steatosis score of 1, 2, or 3.

In embodiments, administering of the compound of Formula I (e.g., any one of Compounds (1), (2), and (3)), or a pharmaceutically acceptable salt thereof results in a decrease in liver hypertrophy in the subject.

In one aspect, the invention features a method for reducing liver inflammation, the method comprising administering to the subject in need thereof an effective amount of a compound according to Formula I,

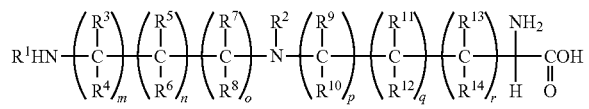

or a pharmaceutically acceptable salt thereof, wherein:

$R^1$ is selected from the group consisting of hydrogen, —($C_1$-$C_8$)alkyl, —($C_1$-$C_8$)alkenyl, —($C_1$-$C_8$)alkynyl, unsubstituted or substituted -ara($C_1$-$C_6$)alkyl, unsubstituted or substituted -heteroara($C_1$-$C_6$)alkyl, where the substituents on said substituted ara($C_1$-$C_6$)alkyl and substituted heteroara($C_1$-$C_6$)alkyl are selected from the group consisting of halogen, —CN, —$NO_2$, —$NH_2$, —NH($C_1$-$C_6$)alkyl, —N[($C_1$-$C_6$)alkyl)]$_2$, —OH, halo($C_1$-$C_6$)alkyl, —($C_1$-$C_6$)alkoxy, halo($C_1$-$C_6$)alkoxy, —SH, thio($C_1$-$C_6$)alkyl, —$SONH_2$, —$SO_2NH_2$, —SO—($C_1$-$C_6$)alkyl, —$SO_2$—($C_1$-$C_6$)alkyl, —$NHSO_2$($C_1$-$C_6$)alkyl, and —$NHSO_2NH_2$;

$R^2$ is selected from the group consisting of hydrogen, —($C_1$-$C_8$)alkyl, —($C_1$-$C_8$)alkenyl, —($C_1$-$C_8$)alkynyl, unsubstituted or substituted -ara($C_1$-$C_6$)alkyl, unsubstituted or substituted -heteroara($C_1$-$C_6$)alkyl, where the substituents on said substituted ara($C_1$-$C_6$)alkyl and substituted heteroara($C_1$-$C_6$)alkyl are selected from the group consisting of halogen, —CN, —$NO_2$, —$NH_2$, —OH, halo($C_1$-$C_6$)alkyl, —($C_1$-$C_6$)alkoxy, halo($C_1$-$C_6$)alkoxy, —SH, thio($C_1$-$C_6$)alkyl, —$SONH_2$, —$SO_2NH_2$, —SO—($C_1$-$C_6$)alkyl, —$SO_2$—($C_1$-$C_6$)alkyl, —$NHSO_2$($C_1$-$C_6$)alkyl, and —$NHSO_2NH_2$;

$R^3$, $R^4$, $R^7$, $R^8$, $R^9$, $R^{10}$, $R^{13}$, and $R^{14}$ are independently selected from the group consisting of hydrogen and —($C_1$-$C_6$)alkyl;

$R^5$ and $R^6$ are independently selected from the group consisting of hydrogen, —($C_1$-$C_6$)alkyl and —OH, provided that both $R^5$ and $R^6$ cannot be —OH;

$R^{11}$ and $R^{12}$ are independently selected from the group consisting of hydrogen, —($C_1$-$C_6$)alkyl and —OH, provided that both $R^{11}$ and $R^{12}$ cannot be —OH;

m is an integer from 1 to 4;

n is an integer from 0 to 4 is an integer from 0 to 4;

p is an integer from 1 to 4;

q is an integer from 0 to 4; and r is an integer from 0 to 4.

In embodiments, a compound of Formula I is (S)-2-amino-6-((3-aminopropyl)amino)hexanoic acid,

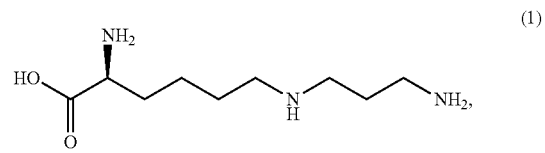 [SMILES: NCCCNCCCC[C@H](N)C(=O)O]

or a pharmaceutically acceptable salt thereof. In embodiments, a compound of Formula (I) is (S)-2-amino-6-((3-aminopropyl)amino)hexanoic acid dihydrochloride,

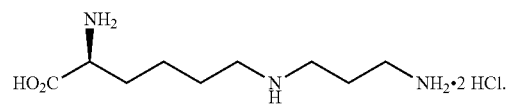

In embodiments, a compound of Formula I is (S)-2-amino-5-((6-aminohexyl)amino)pentanoic acid,

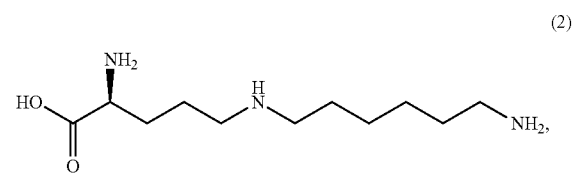 [SMILES: NCCCCCCNCCC[C@H](N)C(=O)O]

or a pharmaceutically acceptable salt thereof. In embodiments, a compound of Formula I is (S) amino-5-((6-aminohexyl)amino)pentanoic acid trihydrochloride,

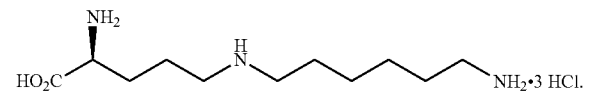

In embodiments, a compound of Formula I is (S)-2-amino-5-((5-aminopentyl)amino)pentanoic acid,

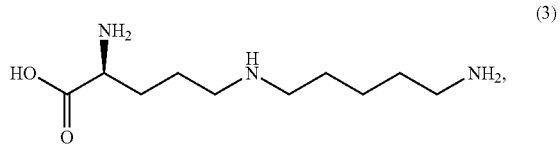 [SMILES: NCCCCCNCCC[C@H](N)C(=O)O]

or a pharmaceutically acceptable salt thereof. In embodiments, a compound of Formula I is (S)-2-amino-5-((5-aminopentyl)amino)pentanoic acid trihydrochloride,

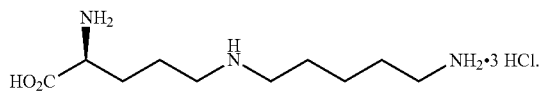

In embodiments, liver inflammation is lobular inflammation.

In embodiments, administering of the compound of Formula I (e.g., any one of Compounds (1), (2), and (3)) or a pharmaceutically acceptable salt thereof results in a liver inflammation score of 0 or 1.

In embodiments, a subject has non-alcoholic steatohepatitis (NASH).

In one aspect, the invention features a method for reducing hepatocellular ballooning, the method comprising administering to the subject in need thereof an effective amount of a compound according to Formula I,

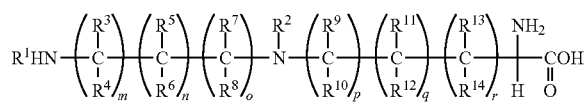

or a pharmaceutically acceptable salt thereof, wherein:
- $R^1$ is selected from the group consisting of hydrogen, —$(C_1$-$C_8)$alkyl, —$(C_1$-$C_8)$alkenyl, —$(C_1$-$C_8)$alkynyl, unsubstituted or substituted -ara$(C_1$-$C_6)$alkyl, unsubstituted or substituted -heteroara$(C_1$-$C_6)$alkyl, where the substituents on said substituted ara$(C_1$-$C_6)$alkyl and substituted heteroara$(C_1$-$C_6)$alkyl are selected from the group consisting of halogen, —CN, —$NO_2$, —$NH_2$, —NH$(C_1$-$C_6)$alkyl, —N[$(C_1$-$C_6)$alkyl]$_2$, —OH, halo$(C_1$-$C_6)$alkyl, —$(C_1$-$C_6)$alkoxy, halo$(C_1$-$C_6)$alkoxy, —SH, thio$(C_1$-$C_6)$alkyl, —$SONH_2$, —$SO_2NH_2$, —SO—$(C_1$-$C_6)$alkyl, —$SO_2$—$(C_1$-$C_6)$alkyl, —$NHSO_2(C_1$-$C_6)$alkyl, and —$NHSO_2NH_2$;
- $R^2$ is selected from the group consisting of hydrogen, —$(C_1$-$C_8)$alkyl, —$(C_1$-$C_8)$alkenyl, —$(C_1$-$C_8)$alkynyl, unsubstituted or substituted -ara$(C_1$-$C_6)$alkyl, unsubstituted or substituted -heteroara$(C_1$-$C_6)$alkyl, where the substituents on said substituted ara$(C_1$-$C_6)$alkyl and substituted heteroara$(C_1$-$C_6)$alkyl are selected from the group consisting of halogen, —CN, —$NO_2$, —$NH_2$, —OH, halo$(C_1$-$C_6)$alkyl, —$(C_1$-$C_6)$alkoxy, halo$(C_1$-$C_6)$alkoxy, —SH, thio$(C_1$-$C_6)$alkyl, —$SONH_2$, —$SO_2NH_2$, —SO—$(C_1$-$C_6)$alkyl, —$SO_2$—$(C_1$-$C_6)$alkyl, —$NHSO_2(C_1$-$C_6)$alkyl, and —$NHSO_2NH_2$;
- $R^3$, $R^4$, $R^7$, $R^8$, $R^9$, $R^{10}$, $R^{13}$ and $R^{14}$ are independently selected from the group consisting of hydrogen and —$(C_1$-$C_6)$alkyl;
- $R^5$ and $R^6$ are independently selected from the group consisting of hydrogen, —$(C_1$-$C_6)$alkyl and —OH, provided that both $R^5$ and $R^6$ cannot be —OH;
- $R^{11}$ and $R^{12}$ are independently selected from the group consisting of hydrogen, —$(C_1$-$C_6)$alkyl and —OH, provided that both $R^{11}$ and $R^{12}$ cannot be —OH;
- m is an integer from 1 to 4;
- n is an integer from 0 to 4
- is an integer from 0 to 4;
- p is an integer from 1 to 4;
- q is an integer from 0 to 4; and
- r is an integer from 0 to 4.

In embodiments, a compound of Formula I is (S)-2-amino-6-((3-aminopropyl)amino)hexanoic acid,

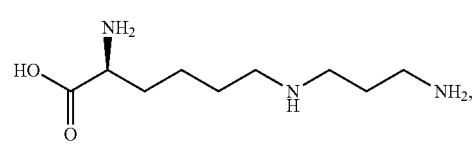

or a pharmaceutically acceptable salt thereof. In embodiments, a compound of Formula (I) is (S)-2-amino-6-((3-aminopropyl)amino)hexanoic acid dihydrochloride,

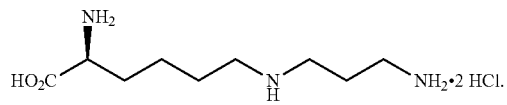

In embodiments, a compound of Formula I is (S)-2-amino-5-((6-aminohexyl)amino)pentanoic acid,

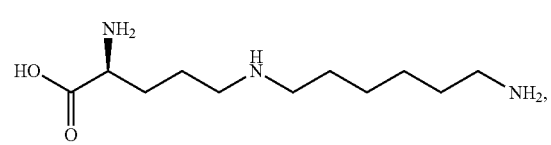

or a pharmaceutically acceptable salt thereof. In embodiments, a compound of Formula I is (S)-2-amino-5-((6-aminohexyl)amino)pentanoic acid trihydrochloride,

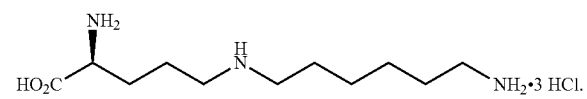

In embodiments, a compound of Formula I is (S)-2-amino-5-((5-aminopentyl)amino)pentanoic acid,

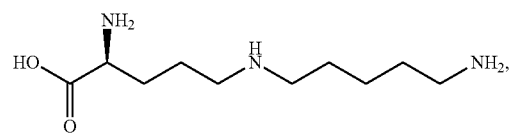

or a pharmaceutically acceptable salt thereof. In embodiments, a compound of Formula I is (S)-2-amino-5-((5-aminopentyl)amino)pentanoic acid trihydrochloride,

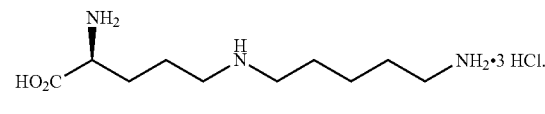

In embodiments, administering of the compound of Formula I (e.g., any one of Compounds (1), (2), and (3)), or a pharmaceutically acceptable salt thereof results in a ballooning score of 0.

In embodiments, a subject has non-alcoholic steatohepatitis (NASH).

In one aspect, the invention features a method for treating liver fibrosis, the method comprising administering to the subject in need thereof an effective amount of a compound according to Formula I,

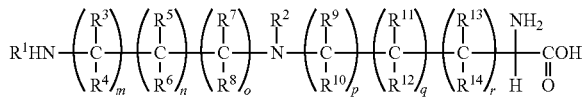

or a pharmaceutically acceptable salt thereof, wherein:
- $R^1$ is selected from the group consisting of hydrogen, —$(C_1$-$C_8)$alkyl, —$(C_1$-$C_8)$alkenyl, —$(C_1$-$C_8)$alkynyl, unsubstituted or substituted -ara$(C_1$-$C_6)$alkyl, unsubstituted or substituted -heteroara$(C_1$-$C_6)$alkyl, where the substituents on said substituted ara$(C_1$-$C_6)$alkyl and substituted heteroara$(C_1$-$C_6)$alkyl are selected from the group consisting of halogen, —CN, —$NO_2$, —$NH_2$, —NH$(C_1$-$C_6)$alkyl, —N[$(C_1$-$C_6)$alkyl)]$_2$, —OH, halo$(C_1$-$C_6)$alkyl, —$(C_1$-$C_6)$alkoxy, halo$(C_1$-$C_6)$alkoxy, —SH, thio$(C_1$-$C_6)$alkyl, —$SONH_2$, —$SO_2NH_2$, —SO—$(C_1$-$C_6)$alkyl, —$SO_2$—$(C_1$-$C_6)$alkyl, —$NHSO_2(C_1$-$C_6)$alkyl, and —$NHSO_2NH_2$;
- $R^2$ is selected from the group consisting of hydrogen, —$(C_1$-$C_8)$alkyl, —$(C_1$-$C_8)$alkenyl, —$(C_1$-$C_8)$alkynyl, unsubstituted or substituted -ara$(C_1$-$C_6)$alkyl, unsubstituted or substituted -heteroara$(C_1$-$C_6)$alkyl, where the substituents on said substituted ara$(C_1$-$C_6)$alkyl and substituted heteroara$(C_1$-$C_6)$alkyl are selected from the group consisting of halogen, —CN, —$NO_2$, —$NH_2$, —OH, halo$(C_1$-$C_6)$alkyl, —$(C_1$-$C_6)$alkoxy, halo$(C_1$-$C_6)$alkoxy, —SH, thio$(C_1$-$C_6)$alkyl, —$SONH_2$, —$SO_2NH_2$, —SO—$(C_1$-$C_6)$alkyl, —$SO_2$—$(C_1$-$C_6)$alkyl, —$NHSO_2(C_1$-$C_6)$alkyl, and —$NHSO_2NH_2$;
- $R^3$, $R^4$, $R^7$, $R^8$, $R^9$, $R^{10}$, $R^{13}$ and $R^{14}$ are independently selected from the group consisting of hydrogen and —$(C_1$-$C_6)$alkyl;
- $R^5$ and $R^6$ are independently selected from the group consisting of hydrogen, —$(C_1$-$C_6)$alkyl and —OH, provided that both $R^5$ and $R^6$ cannot be —OH;
- $R^{11}$ and $R^{12}$ are independently selected from the group consisting of hydrogen, —$(C_1$-$C_6)$alkyl and —OH, provided that both $R^{11}$ and $R^{12}$ cannot be —OH;
- m is an integer from 1 to 4;
- n is an integer from 0 to 4
- is an integer from 0 to 4;
- p is an integer from 1 to 4;
- q is an integer from 0 to 4; and
- r is an integer from 0 to 4.

In embodiments, a compound of Formula I is (S)-2-amino-6-((3-aminopropyl)amino)hexanoic acid, (1)

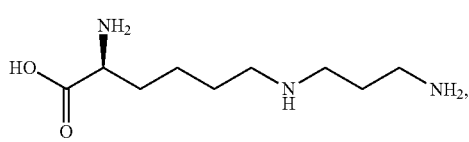

or a pharmaceutically acceptable salt thereof. In embodiments, a compound of Formula (I) is (S)-2-amino-6-((3-aminopropyl)amino)hexanoic acid dihydrochloride,

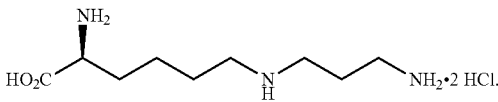

In embodiments, a compound of Formula I is (S)-2-amino-5-((6-aminohexyl)amino)pentanoic acid, (2)

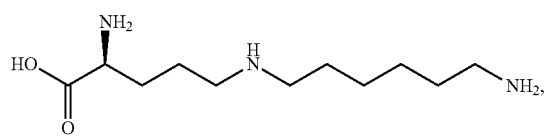

or a pharmaceutically acceptable salt thereof. In embodiments, a compound of Formula I is (S)-2-amino-5-((6-aminohexyl)amino)pentanoic acid trihydrochloride,

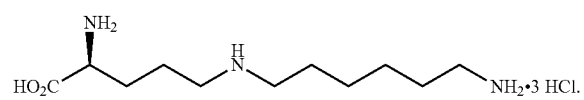

In embodiments, a compound of Formula I is (S)-2-amino-5-((5-aminopentyl)amino)pentanoic acid, (3)

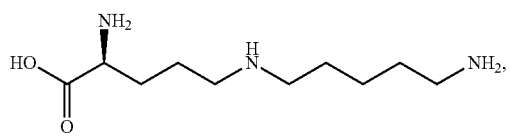

or a pharmaceutically acceptable salt thereof. In embodiments, a compound of Formula I is (S)-2-amino-5-((5-aminopentyl)amino)pentanoic acid trihydrochloride,

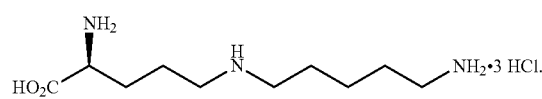

In embodiments, a subject has stage 2, stage 3, or stage 4 liver fibrosis.

In embodiments, a subject has cirrhosis.

In embodiments, administering of the compound of Formula I (e.g., any one of Compounds (1), (2), and (3)), or a pharmaceutically acceptable salt thereof results in stabilization of liver fibrosis in the subject.

In embodiments, administering of the compound of Formula I (e.g., any one of Compounds (1), (2), and (3)), or a pharmaceutically acceptable salt thereof results in reversal of liver fibrosis in the subject.

In embodiments, a subject has non-alcoholic steatohepatitis (NASH).

In one aspect, the invention features a method for treating steatosis, the method comprising administering to the subject in need thereof an effective amount of a compound according to Formula I,

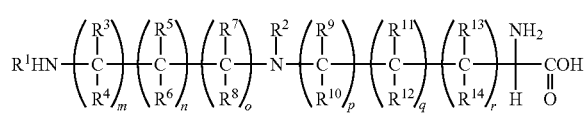

or a pharmaceutically acceptable salt thereof, wherein:

R$^1$ is selected from the group consisting of hydrogen, —(C$_1$-C$_8$)alkyl, —(C$_1$-C$_8$)alkenyl, —(C$_1$-C$_8$)alkynyl, unsubstituted or substituted -ara(C$_1$-C$_6$)alkyl, unsubstituted or substituted -heteroara(C$_1$-C$_6$)alkyl, where the substituents on said substituted ara(C$_1$-C$_6$)alkyl and substituted heteroara(C$_1$-C$_6$)alkyl are selected from the group consisting of halogen, —CN, —NO$_2$, —NH$_2$, —NH(C$_1$-C$_6$)alkyl, —N[(C$_1$-C$_6$)alkyl)]$_2$, —OH, halo(C$_1$-C$_6$)alkyl, —(C$_1$-C$_6$)alkoxy, halo(C$_1$-C$_6$)alkoxy, —SH, thio(C$_1$-C$_6$)alkyl, —SONH$_2$, —SO$_2$NH$_2$, —SO—(C$_1$-C$_6$)alkyl, —SO$_2$—(C$_1$-C$_6$)alkyl, —NHSO$_2$(C$_1$-C$_6$)alkyl, and —NHSO$_2$NH$_2$;

R$^2$ is selected from the group consisting of hydrogen, —(C$_1$-C$_8$)alkyl, —(C$_1$-C$_8$)alkenyl, —(C$_1$-C$_8$)alkynyl, unsubstituted or substituted -ara(C$_1$-C$_6$)alkyl, unsubstituted or substituted -heteroara(C$_1$-C$_6$)alkyl, where the substituents on said substituted ara(C$_1$-C$_6$)alkyl and substituted heteroara(C$_1$-C$_6$)alkyl are selected from the group consisting of halogen, —CN, —NO$_2$, —NH$_2$, —OH, halo(C$_1$-C$_6$)alkyl, —(C$_1$-C$_6$)alkoxy, halo(C$_1$-C$_6$)alkoxy, —SH, thio(C$_1$-C$_6$)alkyl, —SONH$_2$, —SO$_2$NH$_2$, —SO—(C$_1$-C$_6$)alkyl, —SO$_2$—(C$_1$-C$_6$)alkyl, —NHSO$_2$(C$_1$-C$_6$)alkyl, and —NHSO$_2$NH$_2$;

R$^3$, R$^4$, R$^7$, R$^8$, R$^9$, R$^{10}$, R$^{13}$ and R$^{14}$ are independently selected from the group consisting of hydrogen and —(C$_1$-C$_6$)alkyl;

R$^5$ and R$^6$ are independently selected from the group consisting of hydrogen, —(C$_1$-C$_6$)alkyl and —OH, provided that both R$^5$ and R$^6$ cannot be —OH;

R$^{11}$ and R$^{12}$ are independently selected from the group consisting of hydrogen, —(C$_1$-C$_6$)alkyl and —OH, provided that both R$^{11}$ and R$^{12}$ cannot be —OH;

m is an integer from 1 to 4;
n is an integer from 0 to 4
is an integer from 0 to 4;
p is an integer from 1 to 4;
q is an integer from 0 to 4; and
r is an integer from 0 to 4.

In embodiments, a compound of Formula I is (S)-2-amino-6-((3-aminopropyl)amino)hexanoic acid,

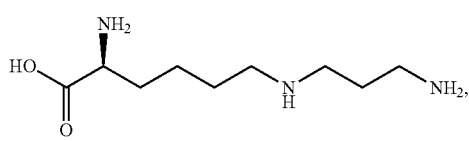

(1)

or a pharmaceutically acceptable salt thereof. In embodiments, a compound of Formula (I) is (S)-2-amino-6-((3-aminopropyl)amino)hexanoic acid dihydrochloride,

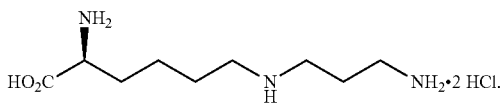

In embodiments, a compound of Formula I is (S)-2-amino-5-((6-aminohexyl)amino)pentanoic acid, (2)

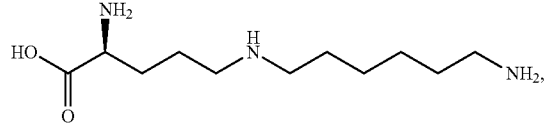

or a pharmaceutically acceptable salt thereof. In embodiments, a compound of Formula I is (S)-2-amino-5-((6-aminohexyl)amino)pentanoic acid trihydrochloride, In embodiments, a compound of Formula I is (S)-2-amino-5-((5-aminopentyl)amino)pentanoic acid, (3)

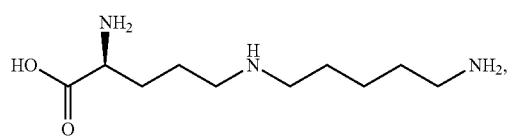

or a pharmaceutically acceptable salt thereof. In embodiments, a compound of Formula I is (S)-2-amino-5-((5-aminopentyl)amino)pentanoic acid trihydrochloride, In embodiments, a subject has a steatosis score of 1, 2, or 3.

In embodiments, administering of the compound of Formula I or a pharmaceutically acceptable salt thereof results in a decrease of steatosis in the subject.

In embodiments, a subject has non-alcoholic steatohepatitis (NASH).

As envisioned in the present disclosure with respect to the disclosed compositions of matter and methods, in one aspect the embodiments of the disclosure comprise the components and/or steps disclosed herein. In another aspect, the embodiments of the disclosure consist essentially of the components and/or steps disclosed herein. In yet another aspect, the embodiments of the disclosure consist of the components and/or steps disclosed herein.

BRIEF DESCRIPTION OF THE DRAWINGS

The accompanying drawings, which are included to provide a further understanding of the disclosure and are incorporated in and constitute a part of this specification, illustrate exemplary embodiments of the disclosure, and together with the description serve to explain the principles of the disclosure.

FIG. 1 is a plot of area under the curve (AUC) of a Glucose Tolerance Test (GTT) in Zucker lean (Fa/fa) and obese (fa/fa) rats treated twice daily for 78 days with either vehicle (positive control) or APL (treated). Two-way ANOVA and Bonferroni multiple comparison post tests were performed. A significant statistical difference was observed between positive control and treated groups (**$p<0.01$).

FIG. 2A and FIG. 2B, depicts data regarding the effect of APL on impaired glucose tolerance in a diet induced mouse model of NASH. FIG. 2A is a plot of glucose levels in C57BL/6J mice fed either chow diet (CHOW) and vehicle (negative control); high fat/high fructose diet (HFD) and vehicle (positive control); or HFD and APL (treated) for 131 days, after which animals were fasted, glucose was administered orally (2 mg/g body weight), and blood glucose was measured. Two-way ANOVA and Bonferroni multiple comparison post tests were performed. A significant statistical difference was observed between positive control and treated groups at 15-min (****$p<0.0001$), 60-min (*$p<0.05$), and 120-min (***$p<0.001$) time points. A significant statistical difference was also observed between negative control and positive control groups at 0-min and 30-min (*$p<0.05$), 45-min ($p<0.01$), and 15-min, 30-, 60 min-, and 120-min ($p<0.0001$) time points. There was no significant statistical difference between negative control group and treated group at any time point. FIG. 2B is a plot of AUC of glucose levels in C57BL/6J mice fed either CHOW or HFD. CHOW animals were treated twice daily for 120 days with either vehicle (negative control) or APL. HFD animals were treated with either vehicle (positive control), APL (treated) or pioglitazone (Pio). A significant statistical difference was observed between positive control and treated groups ($p<0.01$).

FIGS. 5A-5D, depicts data regarding hepatic steatosis in a mouse model of NASH. C57BL/6J mice were fed either CHOW or HFD. Mice were treated with vehicle or APL (p.o.b.i.d.). The APL dosage was 200 mg/kg/day, oral administration (p.o.) in two dosages per day (b.i.d.). Animals were fed at the same time as the vehicle of APL treatment for 20 weeks. CHOW (vehicle): mice fed chow and administered vehicle (negative control); HFD (vehicle): mice fed HFD and administered vehicle (positive control); HFD (APL): mice fed HFD and administered APL (treated). FIG. 5A comprises representative images of hematoxylin and eosin (H&E) stained liver tissue samples, and FIG. 5B comprises representative image of liver tissue samples immunostained with BODIPY and DAPI. FIGS. 5C and 5D depict plots of the number of nuclei data (FIG. 5C) and fat deposition data (FIG. 5D). Measurements were made in 20×-magnification fields. More than 21 fields from three different animals from each group were analyzed: negative control (#fields=26), positive control (#fields=25) and treated (#fields=23). Indirect measurement using ImageJ (Schneider et al., 2012, Nature Methods 9(7): 671-675) was used to calculate fat deposition (threshold showed in red). Fields containing large blood vessels were excluded from the counts. Nuclei counts were assessed using Harmony® 4.6 High-Content Imaging and Analysis Software of Operetta CLS™ (PerkinElmer, Waltham, MA) and a PerkinElmer confocal microscope. One-way ANOVA and Tukey's multiple comparison post tests were performed in both experiments. A significant statistical decrease in the number of hepatocytes in the positive control was observed (*$p<0.001$). There were no statistical differences between negative control group and the treated group. Further, there was a significant statistical differences in fat deposition between positive control and negative control ($p<0.01$). No significant statistical difference was observed in fat deposition between negative control and treated group.

FIGS. 6A and 6B, depicts data regarding Non-alcoholic fatty liver disease Activity Score (NAS) in a diet-induced obesity (DIO mouse model of NASH. C57BL/6J mice were fed either chow diet (CHOW) or high fat/high fructose diet (HFD. Mice were treated p.o.b.i.d with vehicle or APL (200 mg/kg body weight) for 130 days. CHOW Vehicle: mice fed chow and administered vehicle (negative control); HFD Vehicle: mice fed HFD and administered vehicle (positive control); HFD APL: mice fed HFD and administered APL (treated). FIG. 6A comprises representative images of hematoxylin and eosin (H&E) stained liver tissue samples. Arrow 1: macrovesicular steatosis. Arrow 2: microvesicular steatosis. Arrow 3: hypertrophy. Arrow 4: Inflammatory foci. FIG. 6B depicts the NAS component scores for steatosis (liver fat), inflammation, and hypertrophy for the various treatment groups. Two-way ANOVA and Bonferroni multiple comparison post tests were performed. A significant statistical difference between positive control and treated groups was observed (***$p<0.001$).

FIGS. 7A and 7B, depicts data regarding NAS in a DIO mouse model of NASH. C57BL/6J mice were fed either CHOW or HFD. Mice were treated p.o.b.i.d with vehicle or APL (TB-019; 200 mg/kg body weight) for 130 days. CHOW Vehicle: mice fed chow and administered vehicle (negative control); HFD Vehicle: mice fed HFD and administered vehicle (positive control); HFD APL: mice fed HFD and administered APL (TB-019; treated). Histopathological analyses of the non-alcoholic steatohepatitis, NASH activity score (NAS) was performed. FIG. 7A depicts the total NAS score averages of the groups (negative control=0.28±0.46; positive control=6±1.76; treated group=1.2±1.06). One-way ANOVA and Tukey's multiple comparison post tests were performed. ANOVA analysis displayed significant differences among groups (**$p<0.0001$). Post-test multiple comparison analysis (Tukey) showed also significant differences among all group pairs (negative control vs positive control, *$q=23.38$; negative control vs treated group, *$q=3.55$; and positive control vs treated group, *$q=18.5$). FIG. 7B depicts data regarding pathological changes in the liver of the DIO mouse model of NASH, specifically: (1) steatosis (st), (2) lobular inflammation (1i) and (3) hepatic ballooning (hb). Two-way ANOVA RM and Bonferroni multiple comparison post tests were performed. A significant statistical difference between negative control and positive control groups was observed for all comparisons ($p<0.0001$). A significant statistical difference between negative control and treated group was observed for lobular inflammation (p<0.0001). A significant statistical difference between treated group and positive control was observed for all comparisons (**p<0.0001).

FIGS. 8A, 8B, and 8C, depicts data regarding liver collagen fibers in a rat NASH model. FIG. 8A are images of representative Hematoxylin and Eosin staining of liver sections from Zucker (Fa/fa) lean rats, Zucker fa/fa obese rats administered vehicle, and Zucker (fa/fa) obese rats administered vehicle administered APL (40× magnification). FIG. 8B are images of representative images of Mason trichrome staining of liver sections (100× magnification). FIG. 8C are magnifications of the regions in red boxes in the images in FIG. 8B. Arrowheads point to collagen fibers in the mesenchymal hepatic tissue of the Zucker obese rats treated with vehicle.

FIGS. 9A, 9B, and 9C, depicts data regarding hepatic 4-hydroxynonenal (4-HNE) in a rat NASH model. FIG. 9A are representative images of 4-HNE immunofluorescence liver sections from Zucker (Fa/fa) lean rats, Zucker (fa/fa) obese rats administered vehicle (negative control), and Zucker (fa/fa) obese rats administered vehicle (positive control), or administered APL (treated). Confocal microscopy of liver tissue at 63× magnification. FIGS. 9B and 9C are plots of, respectively, the quantitation of the 4HNE/immunofluorescence intensity (4HNE intensity per $\mu m^2$ tissue area) and the quantitation of the total tissue area. One-way ANOVA and Tukey's multiple comparison post tests were performed in both experiments. A significant statistical differences were observed between control and APL treated groups (***p<0.001). No significant statistical difference was observed between negative control and treated groups (Ns=non-statistical difference).

FIGS. 10A and 10B, depicts data regarding hepatic 4-hydroxynonenal (4-HNE) in a DIO mouse model of NASH. FIG. 10A are representative image of 4-HNE immunofluorescence liver sections from C57BL/6 mice fed CHOW and treated with vehicle (negative control; left image), C57BL/6 mice fed HFD and treated with either vehicle (positive control; middle image) or APL (TB-019; treated; right image). Confocal microscopy of liver tissue at 20× and 63× magnification. FIG. 10B is a plot of the quantitation of the 4HNE/immunofluorescence intensity (4HNE intensity per $\mu m^2$ tissue area). One-way ANOVA and Tukey's multiple comparison post tests were performed. A significant statistical difference was observed between positive control and treated groups (***p<0.001). No statistical difference was observed between negative control and treated groups.

FIGS. 11A, 11B, 11C, 11D, 11E, and 11F, depicts data regarding surrogate serum biomarkers in AMLN diet mouse model of NASH. C57BL/6J mice were fed either CHOW or a modified AMLN diet that was changed to HFD after twenty (20) weeks. At week fifty (50) mice were treated with vehicle or APL (p.o.b.i.d.). The APL dosage 25, 50, or 100 mg/kg, oral administration (p.o.) in two dosages per day (b.i.d.) (total dosage of 50, 100, or 200 mg/kg/day). After sixteen (16) weeks of treatment with vehicle or APL samples were collected for analysis. Dunnet's multiple comparison test was performed. FIG. 11A depicts serum Alanine Aminotransferase (ALT) levels. FIG. 11B depicts serum Aspartate Aminotransferase (AST) levels. FIG. 11C depicts serum Alkaline Phosphatase (ALP) levels. FIG. 11D depicts serum triglyceride levels. FIG. 11E depicts serum Non-esterified Fatty Acid (NEFA) levels. FIG. 11F depicts serum cholesterol levels. All results depicted were obtained from mice receiving 50 mg/kg/day APL, except cholesterol wherein the mice received 200 mg/kg/day APL A significant statistical difference was observed between positive control and treated groups (*p<0.02; p=0.002; *p=0.0008, and ****p<0.0001).

FIGS. 12A and 12B, depicts data regarding NAS and fibrosis in an AMLN diet mouse model of NASH. C57BL/6J mice were fed either CHOW or a modified AMLN diet that was changed to HFD after twenty (20) weeks. At seek fifty (50) mice were treated with vehicle or APL (p.o.b.i.d.). The APL dosage 25, 50, or 100 mg/kg, oral administration (p.o.) in two dosages per day (b.i.d.) (total dosage of 50, 100, or 200 mg/kg/day). After sixteen (16) weeks of treatment with vehicle or APL biopsies were collected and stained with hematoxylin & eosin (H&E) and evaluated for steatosis, inflammation, and hepatocyte ballooning. FIG. 12A depicts the reduction in NAS the treated group as compared to the positive control. A significant statistical difference was observed between positive control and treated groups (*p<0.001). FIG. 12B depicts the reduction in liver fibrosis in the treated group as compared to the positive control. A significant statistical difference was observed between positive control and treated groups (**p<0.0001).

DEFINITIONS

Figure 1:
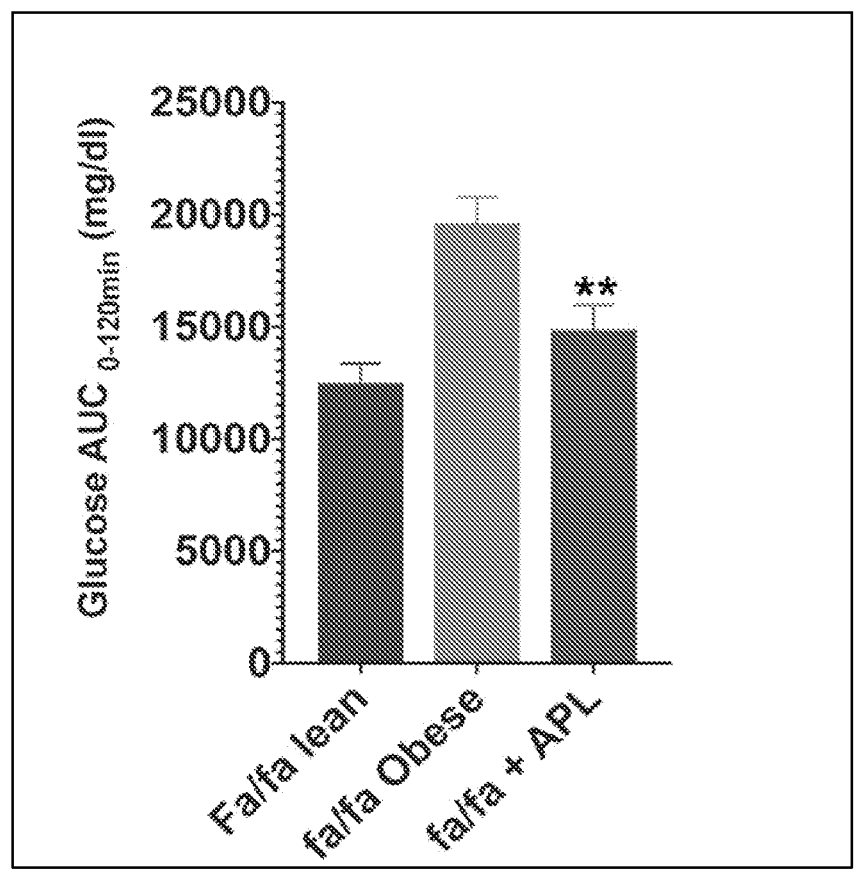
FIG. 1 depicts data regarding the effect of APL on impaired glucose tolerance in a rat model of NASH.

Unless defined otherwise, all technical and scientific terms used herein have the same meaning as commonly understood by one of ordinary skill in the art to which the disclosure pertains.

It is also to be understood that the terminology used herein is for the purpose of describing particular embodiments only, and is not intended to be limiting.

The articles "a" and "an" are used herein to refer to one or to more than one (i.e., to at least one) of the grammatical object of the article. By way of example, "an element" means one element or more than one element. Thus, recitation of "a cell", for example, includes a plurality of the cells of the same type.

"About" as used herein when referring to a measurable value such as an amount, a temporal duration, and the like, is meant to encompass variations of +/−20% or +/−10%, +/−5%, +/−1%, or +/−0.1% from the specified value, as such variations are appropriate to perform the disclosed methods.

The term "alkyl", by itself or as part of another substituent means, unless otherwise stated, a straight or branched chain hydrocarbyl having the designated number of carbon atoms (i.e., $C_1$-$C_6$ means one to six carbons). Examples include: methyl, ethyl, propyl, isopropyl, butyl, isobutyl, tert-butyl, pentyl, neopentyl, and hexyl. In embodiments, alkyl is ($C_1$-$C_6$)alkyl such as ($C_1$-$C_3$)alkyl (e.g., methyl and ethyl).

The term "alkenyl" employed alone or in combination with other terms, means, unless otherwise stated, a straight chain or branched chain hydrocarbyl having the stated number of carbon atoms, and containing one or more double bonds. Examples include ethenyl (vinyl), propenyl (allyl), crotyl, isopentenyl, butadienyl, 1,3-pentadienyl, and 1,4-pentadienyl. A functional group representing an alkenyl is exemplified by —$CH_2$—CH=$CH_2$—.

The term "alkynyl" employed alone or in combination with other terms, means, unless otherwise stated, a straight chain or branched chain hydrocarbyl having the stated number of carbon atoms, and containing on or more triple bonds.

The term "alkoxy" employed alone or in combination with other terms means, unless otherwise stated, an alkyl group, as defined above, connected to the rest of the molecule via an oxygen atom, such as, for example, methoxy, ethoxy, 1-propoxy, 2-propoxy (isopropoxy) and the higher homologs and isomers. The alkyl portion of the alkoxy group can have a designated number of carbon atoms as defined for alkyl groups above. In embodiments, alkoxy groups are $(C_1-C_6)$alkoxy such as $(C_1-C_3)$alkoxy (e.g., methoxy and ethoxy).

The terms "APL" and "TB-019", as used herein, refer to the compound of Formula I that is (S)-2-amino-6-((3-aminopropyl)amino)hexanoic acid (Compound (1)), or a pharmaceutically acceptable salt thereof.

The term "aromatic" refers to a carbocycle or heterocycle having one or more polyunsaturated rings having aromatic character (i.e., having (4n+2) delocalized π (pi) electrons where n is an integer).

The term "aryl" refers to an aromatic hydrocarbon ring system containing at least one aromatic ring. The aromatic ring can optionally be fused or otherwise attached to other aromatic hydrocarbon rings or non-aromatic hydrocarbon rings. Examples of aryl groups include, for example, phenyl, naphthyl, 1,2,3,4-tetrahydronaphthalene and biphenyl. Examples of aryl groups include phenyl and naphthyl.

The term "aralkyl" group refers to an alkyl group substituted with an aryl group.

An "effective amount" as used herein, means an amount of compound, when administered to a subject in need thereof (e.g., a patient suffering from or at risk of developing a disease or condition such as NASH), provides a therapeutic benefit in alleviating one or more manifestations of a disease or condition (such as, for example, to prevent, inhibit, treat, or lessen the symptoms of a particular disorder or disease (e.g., NASH)). It is understood, however, that the full therapeutic effect does not necessarily occur by administration of one dose, and may occur after administration of a series of doses. Thus, an effective amount may be administered in one or more administrations. In the context of therapeutic (including prophylactic) applications, the amount of active agent administered to the subject will depend on the type and severity of the disease or condition and on the characteristics of the subject, such as general health, age, sex, body weight and tolerance to drugs. It will also depend on the degree, severity and type of disease or condition. The skilled artisan will be able to determine appropriate dosages depending on these and other factors. The compounds of Formula I can also be administered in combination with one or more additional therapeutic compounds.

The terms "halo" or "halogen" by themselves or as part of another substituent mean, unless otherwise stated, a fluorine, chlorine, bromine, or iodine atom. In embodiments, halogen includes fluorine, chlorine, or bromine. In embodiments, halogen is fluorine or chlorine.

The term "heteroaralkyl" group refers to an alkyl group substituted with a heteroaryl group.

The term "heterocycle" or "heterocyclyl" or "heterocyclic" by itself or as part of another substituent means, unless otherwise stated, an unsubstituted or substituted, mono- or multi-cyclic heterocyclic ring system which consists of carbon atoms and at least one heteroatom selected from the group consisting of N, O, and S. The heterocycle typically contains from five to ten ring atoms. The heterocyclic system may be attached to another atom, unless otherwise stated, at any heteroatom or carbon atom of the heterocyclic system which affords a structural isomer.

The term "heteroaryl" or "heteroaromatic" refers to a heterocycle having aromatic character.

The term "hydrocarbyl", by itself or as part of another substituent means, unless otherwise stated, a straight or branched chain hydrocarbon having the number of carbon atoms designated (i.e. $C_1-C_6$ means one to six carbons). Examples include: methyl, ethyl, propyl, isopropyl, butyl, isobutyl, tert-butyl, pentyl, neopentyl, and hexyl. In embodiments, a hydrocarbyl is $(C_1-C_6)$alkyl such as $(C_1-C_3)$alkyls such as methyl and ethyl. The term "unsaturated hydrocarbyl" means a hydrocarbyl that contains at least one double or triple bond.

The term "haloalkyl" means an alkyl group wherein at least one hydrogen atom is replaced by a halogen atom. The term "perhaloalkyl" means a haloalkyl group wherein all the hydrogen atoms are replaced by halogen atoms. Perhaloalkyls include perfluoroalkyl, such as —$(C_1-C_6)$perfluoroalkyl (e.g., —$(C_1-C_3)$perfluoroalkyl groups such as —$CF_3$).

The term "haloalkoxy" means an alkoxy group wherein at least one hydrogen atom is replaced by a halogen atom. The term "perhaloalkoxy" means a haloalkoxy group wherein all the hydrogen atoms are replaced by halogen atoms. Perhaloalkoxy groups include perfluoroalkoxy such as —$(C_1-C_6)$ perfluoroalkoxy (e.g., —$(C_1-C_3)$perfluoroalkoxy such as —$OCF_3$).

As used herein, "individual" or "patient" or "subject" (as in the subject of the treatment) means both mammals and non-mammals. Mammals include, for example, humans; non-human primates, e.g. apes and monkeys; dogs, cats, cattle; horses; sheep; and goats. Non-mammals include, for example, fish and birds. The individual is, in one embodiment, a human being.

As used herein, the term "pharmaceutically acceptable" refers to a formulation of a compound that does not significantly abrogate the biological activity, a pharmacological activity and/or other properties of the compound when the formulated compound is administered to a patient. In embodiments, a pharmaceutically acceptable formulation does not cause significant irritation to a patient.

The term "substituted" means that an atom or group of atoms has replaced hydrogen as the substituent attached to another group. For aryl and heteroaryl groups, the term "substituted" refers to any level of substitution, namely mono-, di-, tri-, tetra-, or penta-substitution, where such substitution is permitted. The substituents are independently selected, and substitution may be at any chemically accessible position. Substituents may include, for example, one of the moieties from the group of halo, oxy, azido, nitro, cyano, alkyl, alkoxy, alkyl-thio, alkyl-thio-alkyl, alkoxyalkyl, alkylamino, trihalomethyl, hydroxyl, mercapto, hydroxy, alkylsilyl, cycloalkyl, cycloalkylalkyl, heterocycloalkyl, heteroaryl, alkenyl, alkynyl, aryl, and amino groups. Substituents comprising carbon chains can contain 1-6, 1-3, or 1-2 carbon atoms.

As used herein, the terms "treat" and "treatment" in connection with a disease or condition (e.g., NASH) are used interchangeably and are meant to indicate the taking of steps to obtain beneficial or desired clinical results in an individual suffering or at risk of a disease or condition (e.g., NASH), including preventing, maintaining, inhibiting, treating, or lessening the symptoms of the disease or condition. Accordingly, treatment of a patient can include the prevention or postponement of further disease progression (e.g., prophylaxis or maintenance), prevention or reduction in the severity of symptoms that have or are expected to develop, ameliorating existing symptoms and preventing additional symptoms, and/or prophylactic treatment of a subject who is at risk of developing a condition (e.g., NASH) resulting in a decrease in the probability that the subject will develop the condition.

Ranges: throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

DETAILED DESCRIPTION

Embodiments of the present disclosure are described below. It is, however, expressly noted that the present disclosure is not limited to these embodiments, but rather the intention is that modifications that are apparent to the person skilled in the art and equivalents thereof are also included.

Non-alcoholic fatty liver disease (NAFLD) can generally describe a spectrum of conditions in which excess fat accumulates in the liver and which is not caused by heavy alcohol use. For example, simple fatty liver (non-alcoholic fatty liver or NAFL) is a condition where there is fat in the liver with little or no liver inflammation or cell damage: this condition typically does not progress to result in liver damage or other complications. However, non-alcoholic steatohepatitis (NASH) is a separate condition in which a subject has a fatty liver along with liver inflammation (hepatitis) and/or cell damage, which can also result in fibrosis (including cirrhosis) or liver cancer. Only a subset of subjects with NAFLD have NASH (~20%), with ~3-12% of adults in the United States having NASH: nonetheless, NASH has been identified as the second leading cause for enrollment on liver transplant waitlists and liver transplantation. The severity of outcomes for patients suffering from NASH therefore highlights an urgent need for effective therapies.

Currently, the treatment of NAFLD and NASH relies on diet and other lifestyle modifications rather than pharmacotherapy. In particular, there have been considerable challenges associated with the development of effective therapeutics for NASH and associated pathologies or complications (e.g., fibrosis and cirrhosis).

It has been surprisingly found that compounds of Formula I are effective in treating liver diseases and disorders including non-alcoholic steatohepatitis (NASH) as well as conditions such as liver fibrosis (including cirrhosis), liver steatosis, liver inflammation (e.g., lobular inflammation), and hepatocyte ballooning that are associated with NASH or which can occur independently of NASH.

For example, compounds of Formula I, or pharmaceutically acceptable salts thereof, have been found to be efficacious in treating non-alcoholic steatohepatitis (NASH), as demonstrated in art-recognized rodent models of NASH. In particular, compounds of Formula I have been found to ameliorate diabetes-related impaired glucose tolerance (IGT); reduce fat deposition in the liver; attenuate hepatic steatosis; attenuate hepatic fibrosis, hepatic inflammation, hepatic hypertrophy, and treat NASH. Accordingly, compounds of Formula I, or any pharmaceutically acceptable salts thereof, can be useful in treating (e.g., preventing, inhibiting lessening, or maintenance) any of these conditions, including as described herein.

For example, individuals suffering from or at risk of non-alcoholic steatohepatitis (NASH) or other liver pathologies (including steatosis, liver inflammation (e.g., lobular inflammation), hepatocyte ballooning, and/or fibrosis (e.g., cirrhosis)) can benefit from treatment comprising administration of a compound according to Formula I, or a pharmaceutically acceptable salt thereof.

Compounds of Formula I

Compounds for use in a method of treating non-alcoholic steatohepatitis (NASH) include compounds according to Formula I,

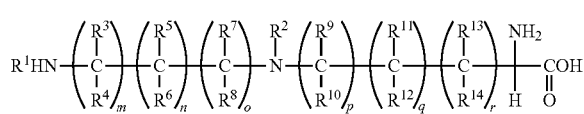

(I)

and pharmaceutically acceptable salts thereof,
wherein:
R$^1$ is selected from the group consisting of hydrogen, —(C$_1$-C$_8$)alkyl, —(C$_1$-C$_8$)alkenyl, —(C$_1$-C$_8$)alkynyl, unsubstituted or substituted -ara(C$_1$-C$_6$)alkyl, unsubstituted or substituted -heteroara(C$_1$-C$_6$)alkyl, where the substituents on said substituted ara(C$_1$-C$_6$)alkyl and substituted heteroara(C$_1$-C$_6$)alkyl are selected from the group consisting of halogen, —CN, —NO$_2$, —NH$_2$, —NH(C$_1$-C$_6$)alkyl, —N[(C$_1$-C$_6$)alkyl)]$_2$, —OH, halo(C$_1$-C$_6$)alkyl, —(C$_1$-C$_6$)alkoxy, halo(C$_1$-C$_6$)alkoxy, —SH, thio(C$_1$-C$_6$)alkyl, —SONH$_2$, —SO$_2$NH$_2$, —SO—(C$_1$-C$_6$)alkyl, —SO$_2$—(C$_1$-C$_6$)alkyl, —NHSO$_2$(C$_1$-C$_6$)alkyl, and —NHSO$_2$NH$_2$;

R$^2$ is selected from the group consisting of hydrogen, —(C$_1$-C$_8$)alkyl, —(C$_1$-C$_8$)alkenyl, —(C$_1$-C$_8$)alkynyl, unsubstituted or substituted -ara(C$_1$-C$_6$)alkyl, unsubstituted or substituted -heteroara(C$_1$-C$_6$)alkyl, where the substituents on said substituted ara(C$_1$-C$_6$)alkyl and substituted heteroara(C$_1$-C$_6$)alkyl are selected from the group consisting of halogen, —CN, —NO$_2$, —NH$_2$, —OH, halo(C$_1$-C$_6$)alkyl, —(C$_1$-C$_6$)alkoxy, halo(C$_1$-C$_6$)alkoxy, —SH, thio(C$_1$-C$_6$)alkyl, —SONH$_2$, —SO$_2$NH$_2$, —SO—(C$_1$-C$_6$)alkyl, —SO$_2$—(C$_1$-C$_6$)alkyl, —NHSO$_2$(C$_1$-C$_6$)alkyl, and —NHSO$_2$NH$_2$;

R$^3$, R$^4$, R$^7$, R$^8$, R$^9$, R$^{10}$, and R$^{14}$ are independently selected from the group consisting of hydrogen and —(C$_1$-C$_6$)alkyl;

R$^5$ and R$^6$ are independently selected from the group consisting of hydrogen, —(C$_1$-C$_6$)alkyl and —OH, provided that both R$^5$ and R$^6$ cannot be —OH;

R$^{11}$ and R$^{12}$ are independently selected from the group consisting of hydrogen, —(C$_1$-C$_6$)alkyl and —OH, provided that both R$^{11}$ and R$^{12}$ cannot be —OH;

m is 1, 2, 3 or 4;
n is 0, 1, 2, 3 or 4;
o is 0, 1, 2, 3 or 4;
p is 1, 2, 3 or 4;
q is 0, 1, 2, 3 or 4; and
r is 0, 1, 2, 3 or 4.

In embodiments, halo($C_1$-$C_6$)alkyl and/or halo($C_1$-$C_6$) alkoxy comprising $R^1$ and/or $R^2$ are selected from perhalo ($C_1$-$C_6$)alkyl and perhalo($C_1$-$C_6$).

In embodiments, $R^1$ is selected from hydrogen and —($C_1$-$C_8$)alkyl. In embodiments, $R^2$ is selected from hydrogen or —($C_1$-$C_8$)alkyl. In embodiments, $R^1$ and $R^2$ are independently selected from hydrogen and —($C_1$-$C_8$)alkyl. In the aforementioned embodiments, the —($C_1$-$C_8$)alkyl is —($C_1$-$C_6$)alkyl, —($C_1$-$C_3$)alkyl, or methyl or ethyl. In embodiments, $R^1$ and $R^2$ are hydrogen.

In embodiments, each of $R^3$, $R^4$, $R^5$, $R^6$, $R^7$, and $R^8$ is independently selected from hydrogen and —($C_1$-$C_8$)alkyl. The —($C_1$-$C_8$)alkyl is —($C_1$-$C_6$)alkyl, —($C_1$-$C_3$)alkyl, or methyl or ethyl. In embodiments, $R^3$, $R^4$, $R^5$, $R^6$, $R^7$, and $R^8$ are hydrogen.

In embodiments, each of $R^9$, $R^{10}$, $R^{11}$, $R^{12}$, $R^{13}$, and $R^{14}$ is independently selected from hydrogen and —($C_1$-$C_8$) alkyl. The —($C_1$-$C_8$)alkyl is —($C_1$-$C_6$)alkyl, —($C_1$-$C_3$) alkyl, or methyl or ethyl. In embodiments, $R^9$, $R^{10}$, $R^{11}$, $R^{12}$, and $R^{14}$ are hydrogen.

In embodiments, each of $R^3$ through $R^{14}$ are independently selected from hydrogen and —($C_1$-$C_8$)alkyl, according to the above schemes. In embodiments, $R^3$ through $R^{14}$ are hydrogen.

In embodiments of compounds of Formula I, the sum of m+n+o is in the range of from 2 to 10, 9, 8, 7, 6, 5, 4 or 3; in the range of from 3 to 10, 9, 8, 7, 6, 5 or 4; or in the range of from 4 to 10, 9, 8, 7, 6 or 5. In embodiments, the sum of m+n+o is 12, 11, 10, 9, 8, 7, 6, 5, 4, 3 or 2.

In embodiments of compounds of Formula I, the sum of p+q+r is in the range of from 1 to 10, 9, 8, 7, 6, 5, 4, 3 or 2; in the range of from 2 to 10, 9, 8, 7, 6, 5, 4 or 3; in the range of from 3 to 10, 9, 8, 7, 6, 5 or 4; or in the range of from 4 to 10, 9, 8, 7, 6 or 5. In embodiments, the sum of p+q+r is 12, 11, 10, 9, 8, 7, 6, 5, 4, 3, 2 or 1.

In embodiments of the aforesaid embodiments defining sums of m+n+o and/or defining sums of p+q+r, each of $R^3$ through $R^{14}$ are independently selected from hydrogen and —($C_1$-$C_8$)alkyl. In embodiments, $R^3$ through $R^{14}$ are hydrogen.

In embodiments of a compound of Formula I, m is 3; p is 4; and each of n, o, q and r is zero. In embodiments, $R^3$, $R^4$, $R^9$, and $R^{10}$ are independently selected from hydrogen and —($C_1$-$C_8$)alkyl. In embodiments, $R^3$, $R^4$, $R^9$, and $R^{10}$ are independently hydrogen. In embodiments, $R^1$ and $R^2$ may be independently selected from hydrogen and —($C_1$-$C_8$)alkyl. In embodiments, $R^1$ and $R^2$ may be independently hydrogen. In embodiments, $R^1$, $R^2$, $R^3$, $R^4$, $R^9$ and $R^{10}$ are hydrogen. In embodiments, the compound of Formula I is (S)-2-amino-6-((3-aminopropyl)amino)hexanoic acid (Compound (1)), or a pharmaceutically acceptable salt thereof.

In embodiments of a compound of Formula I, m is 4; n is 1 or 2; p is 3; and each of o, q and r is zero. In embodiments, $R^3$, $R^4$, $R^9$, and $R^{10}$ are independently selected from hydrogen and —($C_1$-$C_8$)alkyl. In embodiments, $R^3$, $R^4$, $R^9$, and $R^{10}$ are independently hydrogen. In embodiments, $R^1$ and $R^2$ may be independently selected from hydrogen and —($C_1$-$C_8$)alkyl. In embodiments, $R^1$ and $R^2$ may be independently selected hydrogen. In embodiments, $R^1$, $R^2$, $R^3$, $R^4$, $R^9$ and $R^{10}$ are hydrogen. In embodiments, the compound of Formula I is the compound of Formula I is (S)-2-amino-5-((6-aminohexyl)amino)pentanoic acid, or a pharmaceutically acceptable salt thereof, or (S)-2-amino-5-((6-aminopentyl) amino)pentanoic acid, or a pharmaceutically acceptable salt thereof.

In embodiments, $R^1$ and $R^2$ are each hydrogen. In embodiments, $R^3$, $R^4$, $R^5$, $R^6$, $R^7$, and $R^8$ are each hydrogen. In embodiments, $R^9$, $R^{10}$, $R^{11}$, $R^{12}$, $R^{13}$, and $R^{14}$ are each hydrogen. In embodiments, $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ are each hydrogen. In embodiments, (m+n+o) is 3. In embodiments, (m+n+o) is 4. In embodiments, (m+n+o) is 5. In embodiments, (m+n+o) is 6. In embodiments, (p+q+r) is 3. In embodiments, (p+q+r) is 4. In embodiments, (p+q+r) is 5. In embodiments, (p+q+r) is 6.

In embodiments, a pharmaceutically acceptable salt of a compound of Formula I is used in the methods described herein. Exemplary pharmaceutically acceptable salts are described herein. In embodiments, a pharmaceutically acceptable salt is a hydrochloride salt of a compound of Formula I (e.g., a monohydrochloride, a dihydrochloride, or a trihydrochloride salt of a compound of Formula I).

In embodiments, a compound of Formula I is (S)-2-amino-6-((3-aminopropyl)amino)hexanoic acid,

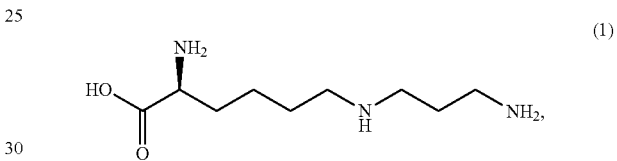

or a pharmaceutically acceptable salt thereof. In embodiments, a compound of Formula (I) is (S)-2-amino-6-((3-aminopropyl)amino)hexanoic acid dihydrochloride,

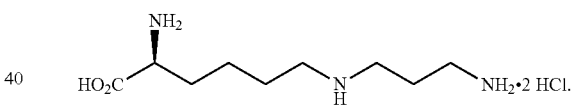

In embodiments, a compound of Formula I is (S)-2-amino-5-((6-aminohexyl)amino)pentanoic acid,

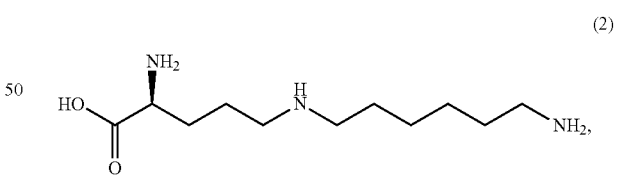

or a pharmaceutically acceptable salt thereof. In embodiments, a compound of Formula I is (S)-2-amino-5-((6-aminohexyl)amino)pentanoic acid trihydrochloride,

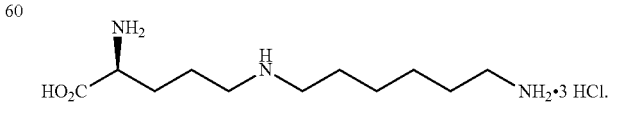

In embodiments, a compound of Formula I is (S)-2-amino-5-((5-aminopentyl)amino)pentanoic acid,

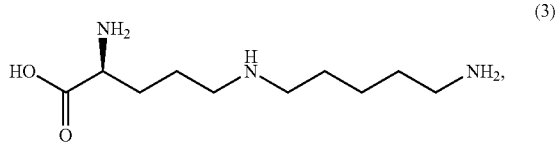 [SMILES: NCCCCCNCCC[C@H](N)C(=O)O]

(3)

or a pharmaceutically acceptable salt thereof. In embodiments, a compound of Formula I is (S) amino-5-((5-aminopentyl)amino)pentanoic acid trihydrochloride,

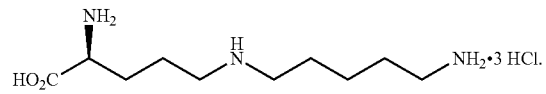

SYNTHESIS OF COMPOUNDS

Compounds of Formula I may be prepared according methods known in the art. Exemplary syntheses are described herein.

Compound (1)

An exemplary method of preparing the dihydrochloride salt of the compound (S)-2-amino-6-((3-aminopropyl)amino)hexanoic acid (Compound (1), dihydrochloride), a compound of Formula I, is as follows.

A. Preparation of tert-butyl-(S)-(2-oxoazepan-3-yl)carbamate

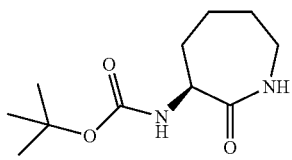 [SMILES: CC(C)(C)OC(=O)N[C@H]1CCCCNC1=O]

Di-tert-butyl-dicarbonate (733 μL, 3.189 mmol) was added to a suspension of L-(−)-α-amino-ε-caprolactam hydrochloride (500 mg, 3.037 mmol) and triethylamine (847 μL, 6.074 mmol) in anhydrous tetrahydrofuran (4 mL). The resulting suspension was stirred at room temperature overnight and concentrated down. The residual white solid was partitioned between ethyl acetate and water. The aqueous layer was removed. The organic layer was washed twice with 1N aqueous hydrochloric acid, twice with saturated aqueous sodium bicarbonate, once with brine, dried over anhydrous sodium sulfate and concentrated. Pure titled compound (tert-butyl-(S)-(2-oxoazepan-3-yl)carbamate) was obtained as a white solid. $^1$H NMR (400 MHz, CD$_3$OD) δ 6.45 (bd, J=5.8 Hz, 1H), 4.18-4.30 (m, 1H), 3.17-3.30 (m, 2H), 1.70-2.03 (m, 4H), 1.48-1.57 (m, 1H), 1.45 (s, 9H), 1.28-1.42 (m, 1H); MS (ESI): m/z 250.8 (M+Na)$^+$.

B. Preparation of tert-butyl-(S)-(1-(3-((tert-butoxycarbonyl)amino)propyl)-2-oxoazepan-3-yl)carbamate

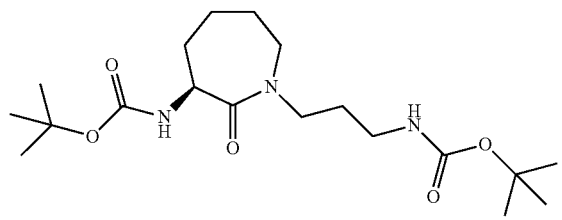 [SMILES: CC(C)(C)OC(=O)NCCCN1CCCC[C@H](NC(=O)OC(C)(C)C)C1=O]

Sodium bis(trimethylsilyl)amide (2.524 mmol; 2.5 mL of a 1.0 M solution in tetrahydrofuran) was added to a solution of tert-butyl (S)-(2-oxoazepan-3-yl)carbamate (288 mg, 1.262 mmol) in anhydrous tetrahydrofuran (12 mL).

The resulting suspension was stirred at room temperature for thirty minutes. 3-(Boc-amino)propyl bromide (2.524 mmol; 470 μl) was added all at once and the reaction was stirred at room temperature for 28 hours.

The reaction mixture was concentrated on a rotary evaporator and the residue is partitioned between ethyl acetate and water. The aqueous layer is removed. The organic layer was washed with brine, dried over anhydrous sodium sulfate and concentrated. The crude product was purified by column chromatography on silica gel using a gradient solvent system of 0 to 100% of ethyl acetate in hexanes to afford the titled compound (tert-butyl-(S)-(1-(3-((tert-butoxycarbonyl)amino)propyl)-2-oxoazepan-3-yl)carbamate) as a colorless oil. $^1$H NMR (400 MHz, CDCl$_3$) δ 5.96 (bd, J=5.0 Hz, 1H), 5.32 (bs, 1H), 4.36 (m, 1H), 3.45-3.62 (m, 2H), 3.33-3.41 (m, 1H), 3.08-3.22 (m, 2H), 2.97-3.06 (m, 1H), 2.02-2.09 (m, 1H), 1.92-2.00 (m, 1H), 1.76-1.87 (m, 2H), 1.61-1.70 (m, 2H), 1.40-1.50 (m, 19H), 1.31-1.38 (m, 1H); MS (ESI): m/z 407.8 (M+Na)$^+$.

C. Preparation of (S)-2-Amino-6-((3-aminopropyl)amino)hexanoic acid dihydrochloride (Compound (1), dihydrochloride)

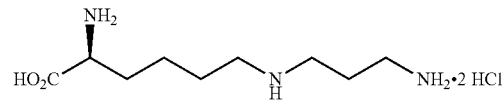

Tert-butyl-(S)-(1-(3-((tert-butoxycarbonyl)amino)propyl)-2-oxoazepan yl)carbamate (100 mg, 0.2596 mmol) was dissolved in 12 N aqueous hydrochloric acid (4 mL). The resulting solution was stirred at room temperature until all of the bubbling had ceased. The solution was transferred to a microwave reaction vial and heated at 160° C. for ninety minutes. Upon concentration, pure titled compound ((S)-2-Amino-6-((3-aminopropyl)amino)hexanoic acid dihydrochloride) was afforded as a light yellowish tan solid. $^1$H NMR (400 MHz, D$_2$O) δ 4.00 (t, J=6.3 Hz, 1H), 3.08-3.20 (m, 6H), 1.90-2.15 (m, 4H), 1.72-1.83 (m, 2H), 1.43-1.62 (m, 2H); MS (ESI): m/z 203.9 (M+H)$^+$.

Solubility, liver microsome stability, and solution stability of (S)-2-amino-6-((3-aminopropyl)amino)hexanoic acid ("APL") has been determined. See WO 2018/049019 and US Publication 2019/0192462.

Compound (2)

An exemplary method of preparing compound (S)-2-amino-5-((6-aminohexyl)amino)pentanoic acid trihydrochloride (Compound (2), trihydrochloride), a compound of Formula I, is as follows.

A. Preparation of tert-butyl (6-oxohexyl)carbamate

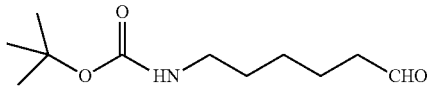

Anhydrous dimethyl sulfoxide (83 μL) was added dropwise to a stirred solution of oxalyl chloride (50 μL) in anhydrous dichloromethane (2 mL) at −78° C. After stirring for 15 minutes, a solution of 6-(tert-butoxy-carbonylamino)-1-hexanol (115 mg, 0.53 mmol) in anhydrous dichloromethane (1 mL) was added dropwise. The resulting mixture was stirred at −78° C. for 45 minutes. Triethylamine (368 μL) was added and the reaction was allowed to warm to room temperature. This solution was concentrated on a rotary evaporator to afford the titled compound (tert-butyl (6-oxohexyl)carbamate) as an off-white solid (86 mg, 75% yield) which is used without further purification.

B. Preparation of (S)-2-(((benzyloxy)carbonyl)amino)-5-((6-((tert-butoxycarbonyl)amino)hexyl)amino)-pentanoic acid

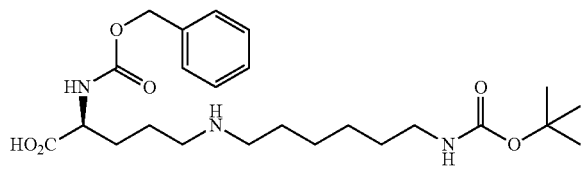 [SMILES: CC(C)(C)OC(=O)NCCCCCCNCCC[C@H](NC(=O)OCc1ccccc1)C(=O)O]

To a stirred suspension of N-alpha-benzyloxycarbonyl-L-ornithine 94 mg, (0.352 mmol) in anhydrous methanol (2 mL) containing acetic acid (100 μL) was added a solution of tert-butyl (6-oxohexyl)carbamate (114 mg, 0.528 mmol) in anhydrous methanol (1.9 mL). The resulting mixture was stirred at room temperature for 30 minutes. Sodium cyanoborohydride (66 mg, 1.057 mmol) was then added and the reaction was stirred at room temperature overnight. After concentration on a rotary evaporator, the residue was partitioned between ethyl acetate and 1M aqueous potassium bisulfate. The aqueous layer was removed. The organic phase was washed with water and brine, dried over anhydrous sodium sulfate and concentrated on a rotary evaporator. The resulting residue was purified by reversed phase chromatography (C18 column) using a gradient of 10 to 100% acetonitrile in water with 0.1% formic acid modifier. The titled compound ((S)-2-(((benzyloxy)carbonyl)amino)-5-((6-((tert-butoxycarbonyl)amino)hexyl)amino)-pentanoic acid) (87 mg, 53% yield) was obtained as a pale yellow oil. $^1$H NMR (400 MHz, D$_2$O) δ 3.94 (t, J=5.92 Hz, 0.5H), 3.63 (m, 0.5H), 2.99-3.13 (m, 6H), 1.65-2.04 (m, 8H), 1.43 (m, 4H); MS (ESI): m/z 466.2 [(M+H)$^+$].

C. Preparation of (S)-2-Amino-5-((6-aminohexyl)amino)pentanoic acid trihydrochloride

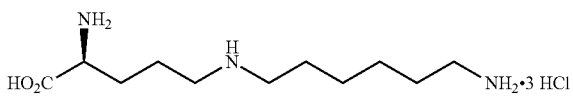

A solution of (S)-2-(((benzyloxy)carbonyl)amino)-5-((6-((tert-butoxycarbonyl)amino)hexyl)amino)pentanoic acid (18 mg, 0.039 mmol)) in 6N aqueous hydrochloric acid (4 mL) was refluxed for two hours. This solution was concentrated on a rotary evaporator to afford the titled compound ((S)-2-Amino-5-((6-aminohexyl)amino)pentanoic acid trihydrochloride) (12 mg, 90% yield) as a pale yellow oil. $^1$H NMR (400 MHz, D$_2$O) δ 4.27 (m, 0.5H), 3.95 (m, 0.5H), 3.33-3.48 (m, 6H), 2.00-2.37 (m, 8H), 1.77 (m, 4H); MS (ESI): m/z 232.2 [(M+H)$^+$].

Compound (3)

An exemplary method of preparing compound (S)-2-amino-5-((5-aminopentyl)amino)pentanoic acid trihydrochloride (Compound (3), trihydrochloride), a compound of Formula I, is as follows

A. Preparation of tert-butyl (5-oxopentyl)carbamate

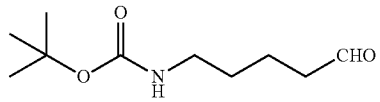

Anhydrous dimethyl sulfoxide (58 μL) was added dropwise to a stirred solution of oxalyl chloride (35 μL) in anhydrous dichloromethane (1.5 mL) at −78° C. After stirring for 15 minutes, a solution of 6-(tert-butoxy-carbonylamino)-1-pentanol (75 mg, 0.37 mmol) in anhydrous dichloromethane (0.75 mL) was added dropwise. The resulting mixture was stirred at −78° C. for 45 minutes. Triethylamine (257 μL) was added and the reaction was allowed to warm to room temperature. This solution was concentrated on a rotary evaporator to afford the titled compound (tert-butyl (5-oxopentyl)carbamate) as an off-white solid (52 mg, 70% yield) which was used without further purification.

B. Preparation of (S)-2-(((benzyloxy)carbonyl)amino)-5-((5-((tert-butoxycarbonyl)amino)pentyl)amino)-pentanoic acid

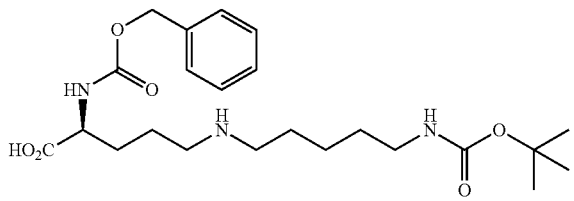 [SMILES: CC(C)(C)OC(=O)NCCCCCNCCC[C@H](NC(=O)OCc1ccccc1)C(=O)O]

To a stirred suspension of N-alpha-benzyloxycarbonyl-L-ornithine 35 mg, (0.13 mmol) in anhydrous methanol (1 mL)

containing acetic acid (38 µL) was added a solution of tert-butyl (5-oxopentyl)carbamate (40 mg, 0.20 mmol) in anhydrous methanol (1.0 mL). The resulting mixture was stirred at room temperature for 30 minutes. Sodium cyanoborohydride (25 mg, 0.40 mmol) was then added and the reaction is stirred at room temperature overnight. After concentration on a rotary evaporator, the residue was partitioned between ethyl acetate and 1M aqueous potassium bisulfate. The aqueous layer was removed. The organic phase was washed with water and brine, dried over anhydrous sodium sulfate and concentrated on a rotary evaporator. The resulting residue was purified by reversed phase chromatography ($C_{18}$ column) using a gradient of 10 to 100% acetonitrile in water with 0.1% formic acid modifier. The titled compound ((S)-2-(((benzyloxy)carbonyl)amino)-5-((5-((tert-butoxycarbonyl)amino)pentyl)amino)-pentanoic acid) (34 mg, 58% yield) was obtained as a colorless oil. $^1$H NMR (400 MHz, $CD_3OD$) δ 7.26-7.38 (m, 5H), 5.08 (s, 2H), 4.03 (m, 1H), 2.90-3.07 (m, 6H), 1.87 (m, 1H), 1.65-1.79 (m, 5H), 1.34-1.54 (m, 13H); MS (ESI): m/z 452.30 [(M+H)$^+$].

C. Preparation of (S)-2-amino-5-((5-aminopentyl)amino)pentanoic acid trihydrochloride

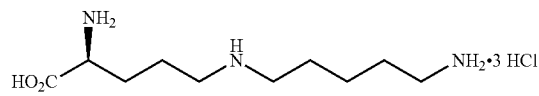

A solution of (S)-2-(((benzyloxy)carbonyl)amino)-5-((5-((tert-butoxycarbonyl)amino)pentyl)amino)pentanoic acid (20 mg, 0.044 mmol)) in 6N aqueous hydrochloric acid (4 mL) was refluxed for two hours. This solution is concentrated on a rotary evaporator to afford the titled compound ((S)-2-amino-5-((5-aminopentyl)amino)pentanoic acid trihydrochloride) (12 mg, 88% yield) as a pale yellow oil. $^1$H NMR (400 MHz, $CD_3OD$) δ 4.06 (t, J=5.36 Hz, 1H), 3.06 (m, 4H), 2.96 (t, J=7.52 Hz, 2H), 1.88-2.10 (m, 4H), 1.68-1.83 (m, 4H), 1.47-1.55 (m, 2H); MS (ESI): m/z 218.2 [(M+H)$^+$].

It will be appreciated by one skilled in the art that the processes described in Schemes 1-16 of WO 2018/049019 and US Publication 2019/0192462 are not the exclusive means by which compounds of Formula I may be synthesized and that a repertoire of synthetic organic reactions is available to be potentially employed in synthesizing compounds of the disclosure. The person skilled in the art knows how to select and implement appropriate synthetic routes. Suitable synthetic methods may be identified by reference to the literature, including reference sources such as *Comprehensive Organic Synthesis*, Ed. B. M. Trost and I. Fleming (Pergamon Press, 1991), *Comprehensive Organic Functional Group Transformations*, Ed. A. R. Katritzky, O. Meth-Cohn, and C. W. Rees (Pergamon Press, 1996), *Comprehensive Organic Functional Group Transformations II*, Ed. A. R. Katritzky and R. J. K. Taylor (Editor) (Elsevier, $2^{nd}$ Edition, 2004), *Comprehensive Heterocyclic Chemistry*, Ed. A. R. Katritzky and C. W. Rees (Pergamon Press, 1984), and *Comprehensive Heterocyclic Chemistry II*, Ed. A. R. Katritzky, C. W. Rees, and E. F. V. Scriven (Pergamon Press, 1996).

The compounds of Formula I and intermediates may be isolated from their reaction mixtures and purified by standard techniques such as filtration, liquid-liquid extraction, solid phase extraction, distillation, recrystallization or chromatography.

It will be understood that when compounds of Formula I contain one or more chiral centers, the compounds may exist in, and may be isolated as pure enantiomeric or diastereomeric forms or as racemic mixtures. The present disclosure therefore includes any possible enantiomers, diastereomers, racemates or mixtures thereof of the compounds of the disclosure which are biologically active in the treatment of NASH.

A chiral center occurs in the α-carbon of the α-amino acid functionality of the compounds of Formula I. The compounds of Formula I are characterized by the (S) absolute configuration about the α-carbon of the contained α-amino acid functionality, according to the Cahn-Ingold-Prelog rules,

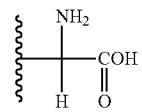

as exemplified by the compound (S)-2-amino-6-((3-aminopropyl)amino)hexanoic acid (Compound (1)), a compound of Formula I:

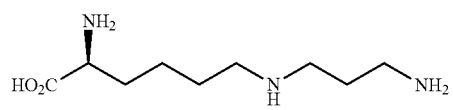

(S)-2-amino-6-((3-aminopropyl)amino)hexanoic acid

According to embodiments, a compound of Formula I is an isolated (S) optical isomer with respect to the configuration about the α-carbon of the contained α-amino acid functionality. By an "isolated optical isomer" means a compound which has been substantially purified from the corresponding optical isomer(s) of the same formula. In embodiments, the isolated isomer is at least about 80%, at least 85% pure, at least 90% pure, at least 95% pure, at least 98% pure, at least about 99% pure, by weight, the balance being made up of the corresponding (R) enantiomer. In embodiments, the isolated (S) enantiomer is free of the corresponding (R) enantiomer, except for trace amounts of the (R) enantiomer.

Pharmaceutically Acceptable Salts

The compounds of Formula I may take the form of salts when appropriately substituted with groups or atoms capable of forming salts. Such groups and atoms are well known to those of ordinary skill in the art of organic chemistry. The term "salts" embraces addition salts of free acids or free bases which are compounds of the disclosure. The term "pharmaceutically acceptable salt" refers to salts which possess toxicity profiles within a range that affords utility in pharmaceutical applications. Pharmaceutically unacceptable salts may nonetheless possess properties such as high crystallinity, which have utility in the practice of the present disclosure, such as for example utility in process of synthesis, purification or formulation of compounds of the disclosure.

Suitable pharmaceutically acceptable acid addition salts may be prepared from an inorganic acid or from an organic acid. Examples of inorganic acids include hydrochloric, hydrobromic, hydriodic, nitric, carbonic, sulfuric, and phosphoric acids. Appropriate organic acids may be selected from aliphatic, cycloaliphatic, aromatic, aralphatic, heterocyclic, carboxylic and sulfonic classes of organic acids, examples of which include formic, acetic, pivalic, propionic, furoic, mucic, isethionic, succinic, glycolic, gluconic, lactic, malic, tartaric, citric, ascorbic, glucuronic, maleic, fumaric, pyruvic, aspartic, glutamic, benzoic, anthranilic, 4-hydroxybenzoic, phenylacetic, mandelic, embonic (pamoic), methanesulfonic, ethanesulfonic, benzenesulfonic, pantothenic, trifluoromethanesulfonic, 2-hydroxyethanesulfonic, p-toluenesulfonic, sulfanilic, cyclohexylaminosulfonic, stearic, alginic, β-hydroxybutyric, salicylic, galactaric, camphorosulfonic, and galacturonic acid. Examples of pharmaceutically unacceptable acid addition salts include, for example, perchlorates and tetrafluoroborates.

In embodiments, a suitable pharmaceutically acceptable salt is a hydrochloride salt of a compound described herein (e.g., a hydrochloride salt of any one of Compounds (1), (2), and (3)). In embodiments, a hydrochloride salt is a monochloride salt. In embodiments, a hydrochloride salt is a dihydrochloride salt. In embodiments, a hydrochloride salt is a trihydrochloride salt.

Suitable pharmaceutically acceptable base addition salts of compounds of the disclosure include, for example, metallic salts including alkali metal, alkaline earth metal and transition metal salts such as, for example, calcium, magnesium, potassium, sodium and zinc salts. Pharmaceutically acceptable base addition salts also include organic salts made from basic amines such as, for example, N,N'-dibenzylethylenediamine, chloroprocaine, choline, diethanolamine, ethylenediamine, tromethamine, meglumine (N-methylglucamine) and procaine. Examples of pharmaceutically unacceptable base addition salts include lithium salts and cyanate salts.

All of these salts may be prepared by conventional means from the corresponding compound according to Formula I by reacting, for example, the appropriate acid or base with the compound according to Formula I. Salts may be in crystalline form, and prepared by crystallization of the salt from a suitable solvent. The person skilled in the art will know how to prepare and select suitable salt forms for example, as described in *Handbook of Pharmaceutical Salts: Properties, Selection, and Use* by P. H. Stahl and C. G. Wermuth (Wiley-VCH 2002).

Therapeutic Methods
Non-Alcoholic Steatohepatitis (NASH)

In one aspect, the invention features a method for treating non-alcoholic steatohepatitis (NASH), the method comprising administering to the subject in need thereof an effective amount of a compound according to Formula I, or a pharmaceutically acceptable salt thereof. In another aspect, the invention features compounds according to Formula I, or a pharmaceutically acceptable salt thereof, for use in treating NASH in a subject. In another aspect, the invention features compounds of Formula I, or a pharmaceutically acceptable salt thereof, for preparation of a medicament for treatment of NASH.

Non-alcoholic fatty liver disease (NAFLD) has become one of the most prominent forms of chronic liver disease worldwide, mirroring the obesity epidemic. Hepatic steatosis or "fatty liver" is the accumulation of fat in the liver. Separate from NAFLD, non-alcoholic steatohepatitis (NASH) is a disorder characterized by substantial health risks. In addition to having excess fat in the liver, NASH can be characterized by histologic evidence of hepatic inflammation and hepatocyte injury (ballooning), with or without fibrosis. Subjects diagnosed with NASH are at significantly increased risk of morbidity and mortality, and there is a continuing need for therapeutic agents for the treatment of NASH.

More specifically, NASH can be characterized by increased risk of cardiovascular and liver-related mortality. NASH can lead to cirrhosis, in which the liver is permanently damaged and scarred. Cirrhosis results in fluid retention, muscle wasting, bleeding from the intestines, and liver failure. Liver transplantation is the only treatment for advanced cirrhosis with liver failure. Transplantation is increasingly performed in people with NASH. NASH is currently the number two reason for liver transplants, and it will very likely be number one by the end of the decade as new antiviral drugs control hepatitis C, which is presently the number one cause of liver failure.

In embodiments, NASH can be diagnosed by liver biopsy (e.g., histological evidence of steatosis, inflammation, and hepatocyte ballooning, for example in the absence of other causes of liver disease or substantial alcohol consumption). For example, the NAFLD Activity Score (NAS) can be useful in identifying patients with NASH. See, Kleiner et al, "Design and Validation of a Histological Scoring System for Nonalcoholic Fatty Liver Disease", *Hepatology*, 41(6): 1313-1321 (2005).

NAS is the sum of separate scores for steatosis (0-3), hepatocellular ballooning (0-2), and lobular inflammation (0-3), with a maximal score of 8. A NAS score can be generated upon biopsy according the criteria set forth in Kleiner et al., supra. See also Table 1.

TABLE 1

Components of NAFLD Activity Score (NAS)

| Component | Score | Description |
|---|---|---|
| Steatosis[1] | 0 | <5% |
| | 1 | 5-33% |
| | 2 | >33-66% |
| | 3 | >66% |
| Lobular Inflammation[2] | 0 | No foci |
| | 1 | <2 foci/200x |
| | 2 | 2-4 foci/200x |
| | 3 | >4 foci/200x |
| Hepatocyte Ballooning | 0 | None |
| | 1 | Few balloon cells[3] |
| | 2 | Many balloon cells/prominent ballooning[4] |

[1]Steatosis score reflects amount of surface area involved by steatosis.
[2]Excludes acidophil bodies and portal inflammation
[3]Rare but definite ballooned hepatocytes or diagnostically borderline cases
[4]May occur with Mallory's hyalin In embodiments, a subject is selected based on a liver biopsy (e.g., a liver biopsy used to determine a NAS score).

In embodiments, a subject is selected based on a NAS score. In embodiments, the presence of NASH is established by a NAS score of 4 or more (i.e., a NAS score that is ≥4). In embodiments, the presence of NASH may be established by a liver biopsy revealing a NAS score of 5 or more (i.e., a NAS score that is ≥5).

In embodiments, a subject is selected based on a NAS score determined prior to treatment.

In embodiments, the presence of NASH is established by a NAS score prior to treatment of 4 or more (i.e., a NAS score that is ≥4). In embodiments, the presence of NASH may be established by a liver biopsy revealing a NAS score prior to treatment of 5 or more (i.e., a NAS score that is ≥5).

In embodiments, NASH can be characterized by a NAFLD Activity Score (NAS) of 5 or more, where NAS is the sum of separate scores for steatosis (range: 0-3), hepatocellular ballooning (range: 0-2), and lobular inflammation (range: 0-3). See Kleiner et al., supra. Steatosis is the abnormal retention of lipids within the liver. The steatosis score represents the percent of hepatocytes containing fat droplets (steatosis) as 0 (<5%), 1 (5-33%), 2 (33-66%), and 3 (≥66%). Patients treated for NASH according to the present disclosure can have a NAS steatosis score of 1, 2 or 3. Hepatocyte ballooning is a type of cell death visually characterized by hypertrophy and localization of cellular nuclei at or near the center of the cell. In embodiments, hepatocyte ballooning is scored as 0 (none), 1 (few), or 2 (many cells with prominent ballooning). In embodiments, lobular inflammation is scored according to the number of foci of inflammation: 0 (no foci), 1(<2 foci/200× field), and 2 (2-4 foci/200× field). In embodiments, a subject has a lobular inflammation scores of 0, 1, 2 or 3, and a ballooning score of 0, 1 or 2, provided that the sum of the lobular inflammation score and the ballooning score is at least 2.

In embodiments, methods and uses described herein comprise an improvement in NAS score. In embodiments, the improvement occurs without worsening of fibrosis.

In embodiments, administering of the compound of Formula I (e.g., any one of Compounds (1), (2), and (3)), or any pharmaceutically acceptable salt thereof, results in a NAFLD Activity Score (NAS) of <4.

In embodiments, methods and uses described herein result in a decrease of at least one (≥1) in the subject's NAS score.

In embodiments, methods and uses described herein result in a decrease of at least two (≥2) in the subject's NAS score.

In embodiments, methods and uses described herein result in a decrease of at least three (≥3) in the subject's NAS score.

In embodiments, methods and uses described herein result in a decrease of one (1) to three (3) in the subject's liver steatosis score.

In embodiments, methods and uses described herein result in a decrease of one (1) or two (2) in the subject's hepatocellular ballooning score.

In embodiments, methods and uses described herein result in a decrease of one (1) to three (3) in the subject's lobular inflammation score.

In embodiments, a subject has a steatosis score of 1, 2, or 3.

In embodiments, steatosis comprises macrovesicular steatosis. In embodiments, steatosis comprises microvesicular steatosis. In embodiments, steatosis comprises macrovesicular and microvesicular steatosis.

In embodiments, methods and uses described herein result in resolution of steatohepatitis without worsening of fibrosis in a patient in need thereof. In embodiments, resolution comprises absence of hepatocellular ballooning (e.g., a ballooning score of 0); absent or mild inflammation (e.g., a ballooning score of 0-1); and/or with steatosis present or absent (e.g., a steatosis score of 0-3).

In embodiments, NASH is steatohepatitis characterized by at least one of lobular inflammation and hepatocyte ballooning. In embodiments, NASH occurs in the absence of other causes of liver disease and/or substantial alcohol consumption.

In embodiments, a subject has liver inflammation. In embodiments, liver inflammation is lobular inflammation.

In embodiments, administering of the compound of Formula I (e.g., any one of Compounds (1), (2), and (3)), or a pharmaceutically acceptable salt thereof results in a decrease in liver inflammation.

In embodiments, administering of the compound of Formula I (e.g., any one of Compounds (1), (2), and (3)), or a pharmaceutically acceptable salt thereof results in a liver inflammation score of 0 or 1 (e.g., as described herein).

In embodiments, the liver of the subject is characterized by hepatocellular ballooning.

In embodiments, administering of the compound of Formula I (e.g., any one of Compounds (1), (2), and (3)), or a pharmaceutically acceptable salt thereof results in a decrease in hepatocellular ballooning.

In embodiments, administering of the compound of Formula I (e.g., any one of Compounds (1), (2), and (3)), or a pharmaceutically acceptable salt thereof results in ballooning score of 0.

In embodiments, treatment commences independently of determining a NAS score.

In embodiments, a subject is selected based on surrogate markers which parallel the histological evaluation of a NAS score (e.g., biomarkers).

In embodiments, methods and uses described herein result in an at least a two-point improvement in NAS without worsening of fibrosis in a patient in need thereof.

In embodiments, a subject has liver fibrosis.

In embodiments, fibrosis scored/staged with values of 0-4 (Table 2).

TABLE 2

Fibrosis Scoring/Staging

| Stage | Score | Description |
|---|---|---|
| 0 | 0 | No fibrosis |
| 1* | 1A | mild, zone 3, perisinusoidal fibrosis |
|  | 1B | moderate zone 3, perisinusoidal fibrosis |
|  | 1C | portal/periportal fibrosis |
| 2 | 2 | perisinusoidal and portal/periportal |
| 3 | 3 | bridging fibrosis |
| 4 | 4 | cirrhosis |

*perisinusoidal or periportal fibrosis

In embodiments, a subject has non-cirrhotic NASH.

In embodiments, a subject has cirrhotic NASH.

In embodiments, a subject has a fibrosis stage score of 0-3. In embodiments, a subject has a fibrosis stage score of 0. In embodiments, a subject has a fibrosis stage score of 1. In embodiments, a subject has a fibrosis stage score of 2. In embodiments, a subject has a fibrosis stage score of 3. In embodiments, a subject has a fibrosis stage score of 4 (cirrhosis). In embodiments, after-treatment patients can have a fibrosis stage score that is at least no worse than the baseline score before treatment, and alternatively can have a reduction in the fibrosis stage score of at least one level, alternatively at least two or three levels.

In embodiments, methods and uses described herein result in no increase in the subject's liver fibrosis score (stabilization of liver fibrosis in the subject).

In embodiments, methods and uses described herein result in a decrease of at least one (≥1) in the subject's liver fibrosis score (reversal of liver fibrosis in the subject).

In embodiments, liver fibrosis is characterized using an enhanced liver fibrosis test (ELF) score. In embodiments, liver fibrosis is characterized as an ELF score of less than 7.7. In embodiments, liver fibrosis is characterized by an ELF score of greater than or equal to 7.7 and less than 9.8. In embodiments, liver fibrosis is characterized by an ELF score of greater than 9.8.

In embodiments, methods and uses described herein result in maintenance (no worsening) of fibrosis stage in a patient in need thereof.

In embodiments, methods and uses described herein result in fibrosis regression in a patient in need thereof.

In embodiments, methods and uses described herein result in a decrease in liver hypertrophy in the subject.

In embodiments, methods and uses described herein result in a decrease in a subject's liver collagen levels.

In embodiments, methods and uses described herein result in a decrease in a subject's hepatic tissue alpha smooth muscle actin (α-SMA) levels.

In embodiments, methods and uses described herein result in a decrease in a subject's hepatocyte apoptosis levels.

In embodiments, methods and uses described herein result in a decrease in a subject's hyaluronic acid levels.

In embodiments, methods and uses described herein result in a decrease in a subject's tissue inhibitors of metalloproteinases (TIMP-1) levels.

In embodiments, methods and uses described herein result in a decrease in a subject's procollagen type III terminal peptide (PIIINP) levels.

In embodiments, methods and uses described herein result in a decrease in a subject's soluble Fas ligand levels.

In embodiments, methods and uses described herein result in a decrease in a subject's leptin levels.

In embodiments, methods and uses described herein result in a decrease in a subject's aspartate aminotransferase (AST) to platelet index (APRI).

In embodiments, methods and uses described herein result in a decrease in a subject's fibrosis 4 (FIB-4) score.

In embodiments, methods and uses described herein result in a decrease in a subject's liver stiffness.

In embodiments, methods and uses described herein result in an increase in a subject's adiponectin levels.

Serum Markers and Biomarkers

In embodiments, any of the methods and uses described herein result in changes of serum markers (e.g., serum markers of liver pathologies such as liver fibrosis or NASH) in a patient in need thereof. Accordingly, in embodiments, a patient is selected based on a particular expression level of a serum marker (including any described herein). For example, methods described herein can be particularly beneficial to a patient having a particular (e.g., a threshold level) of a serum marker (e.g., any described herein). Further, methods described herein can result in favorable changes in a serum marker (e.g., modulate the level of any serum marker described herein). In embodiments, methods described herein can result in decreases of elevated serum markers (e.g., any described herein).

For example, non-invasive measures of fibrosis to monitor treatment efficacy can be useful for avoiding the need for repeated liver biopsy (e.g., to identify patients that can benefit from methods described herein, including those having any liver pathology described herein such as NASH). In embodiments, a serum marker is FIB-4. In embodiments, a serum marker is APRI. APRI and FIB-4 scores are calculated by the following published formulas (Kim et al., Hepatology 2013, 57: 1357), wherein "PLT count" is the platelet count; "AST" is aspartate transaminase, and the upper limit of normal is 40 IU/mL; and "ALT" is alanine aminotransferase:

$$APRI = ([AST/\text{upper limit of normal}]/\text{PLT count}[109/L])$$

$$FIB\text{-}4 = (\text{age [years]} \times AST\text{ [IU/L]})/(PLT\text{ [109/L]} \times (ALT\text{ [IU/L]})1/2).$$

Accordingly, exemplary serum markers include enzymes such as alanine aminotransferase (ALT), aspartate aminotransferase (AST), alkaline phosphatase (ALP), or γ-glutamyl transferase (GGT), or any combination thereof. In embodiments, a patient has at least one elevated liver enzyme.

Still other exemplary serum markers include: total cholesterol, high-density lipoprotein (HDL)-cholesterol, triglycerides, bilirubin, albumin, C-peptide, apolipoprotein A1, apolipoprotein B, leptin, adiponectin, free fatty acids, ghrelin and tumor necrosis factor-alpha (TNF-α).

In embodiments, a subject has elevated hepatic alanine aminotransferase (ALT) levels. In embodiments, methods and uses described herein result in decreased hepatic alanine aminotransferase (ALT) levels. In embodiments, a subject has ALT levels that fall within normal levels (e.g., about 10-40 IU/L). In embodiments, a subject has ALT levels that are greater than about 40 IU/L. In embodiments, ALT is no greater than about 30 IU/L (e.g., for a male patient). In embodiments, ALT is greater than about 30 IU/L (e.g., for a male patient). In embodiments, ALT is no greater than about 19 IU/L (e.g., for a female patient). In embodiments ALT is greater than about 19 IU/L (e.g., for a female patient).

In embodiments, a subject has elevated hepatic aspartate aminotransferase (AST) levels. In embodiments, a subject has AST levels that fall within normal levels (e.g., about 10-35 IU/L). In embodiments, a subject has AST levels that are greater than about 30 IU/L. In embodiments, a subject has AST levels that are greater than about 35 IU/L. In embodiments, methods and uses described herein result in decreased hepatic aspartate aminotransferase (AST) levels.

In embodiments, the ratio of aspartate aminotransferase (AST) and alanine aminotransferase (AST) is determined. In embodiments, a patient has a ratio of AST/ALT that is greater than 1. In embodiments, a patient has a ratio of AST/ALT that is less than 1.

In embodiments, methods and uses described herein result in a decrease in a subject's aspartate aminotransferase (AST) to alanine aminotransferase (ALT) ratio.

In embodiments, methods and uses described herein result in a change in a subject's ratio of aspartate aminotransferase (AST) and alanine aminotransferase (ALT) ratio such that the ratio is closer to 1.

In embodiments, a subject has elevated alkaline phosphatase (ALP) levels. In embodiments, a subject has ALP levels that fall within a normal range (e.g., about 20-140 or about 37-116 IU/L). In embodiments, a subject has ALP levels that are greater than about 120 IU/L or about 140 IU/L. In embodiments, a subject has ALP levels that are greater than about 150 IU/L. In embodiments, methods and uses described herein result in decreased alkaline phosphatase (ALP) levels.

In embodiments, a subject has elevated γ-glutamyl transferase (GGT) levels. In embodiments, a subject has GGT levels that fall within a normal range (e.g., about 5-30 IU/L or about 9-48 IU/L). In embodiments, a subject has GGT In embodiments, a subject has elevated GGT levels that are at least about 50 IU/L. GGT levels that are up to about 90 IU/L or about 100 IU/L. In embodiments, methods and uses described herein result in decreased GGT levels.

In embodiments, a subject has elevated triglyceride levels. In embodiments, methods and uses described herein result in decreased triglyceride levels.

In embodiments, a subject has elevated non-esterified fatty acid (NEFA) levels. In embodiments, methods and uses described herein result in decreased non-esterified fatty acid (NEFA) levels.

In embodiments, a subject has elevated cholesterol levels. In embodiments, methods and uses described herein result in decreased cholesterol levels.

In embodiments, a subject has depressed levels of HDL-cholesterol.

Liver Inflammation

In one aspect, the invention features a method for treating (e.g., reducing) liver inflammation, the method comprising administering to the subject in need thereof an effective amount of a compound according to Formula I, or a pharmaceutically acceptable salt thereof.

In embodiments, liver inflammation is lobular inflammation.

In embodiments, administering of the compound of Formula I (e.g., any one of Compounds (1), (2), and (3)) or a pharmaceutically acceptable salt thereof results in a liver inflammation score of 0 or 1.

In embodiments, a subject has non-alcoholic steatohepatitis (NASH).

In embodiments, a compound of Formula I is (S)-2-amino-6-((3-aminopropyl)amino)hexanoic acid (Compound (1)), or a pharmaceutically acceptable salt thereof. In embodiments, a compound of Formula (I) is (S)-2-amino-6-((3-aminopropyl)amino)hexanoic acid dihydrochloride (Compound (1), dihydrochloride).

In embodiments, a compound of Formula I is (S)-2-amino-5-((6-aminohexyl)amino)pentanoic acid (Compound (2)), or a pharmaceutically acceptable salt thereof. In embodiments, a compound of Formula I is (S)-2-amino-5-((6-aminohexyl)amino)pentanoic acid trihydrochloride (Compound (2), trihydrochloride).

In embodiments, a compound of Formula I is (S)-2-amino-5-((5-aminopentyl)amino)pentanoic acid (Compound (3)), or a pharmaceutically acceptable salt thereof. In embodiments, a compound of Formula I is (S)-2-amino-5-((5-aminopentyl)amino)pentanoic acid trihydrochloride (Compound (3), trihydrochloride).

Hepatocellular Ballooning

In one aspect, the invention features a method for treating (e.g., reducing) hepatocellular ballooning, the method comprising administering to the subject in need thereof an effective amount of a compound according to Formula I, or a pharmaceutically acceptable salt thereof.

Hepatocyte ballooning is a type of cell death visually characterized by hypertrophy and localization of cellular nuclei at or near the center of the cell.

In embodiments, administering of the compound of Formula I (e.g., any one of Compounds (1), (2), and (3)), or a pharmaceutically acceptable salt thereof results in a ballooning score of 0.

In embodiments, a subject has non-alcoholic steatohepatitis (NASH).

In embodiments, a compound of Formula I is (S)-2-amino-6-((3-aminopropyl)amino)hexanoic acid (Compound (1)), or a pharmaceutically acceptable salt thereof. In embodiments, a compound of Formula (I) is (S)-2-amino-6-((3-aminopropyl)amino)hexanoic acid dihydrochloride (Compound (1), dihydrochloride).

In embodiments, a compound of Formula I is (S)-2-amino-5-((6-aminohexyl)amino)pentanoic acid (Compound (2)), or a pharmaceutically acceptable salt thereof. In embodiments, a compound of Formula I is (S)-2-amino-5-((6-aminohexyl)amino)pentanoic acid trihydrochloride (Compound (2), trihydrochloride).

In embodiments, a compound of Formula I is (S)-2-amino-5-((5-aminopentyl)amino)pentanoic acid (Compound (3)), or a pharmaceutically acceptable salt thereof. In embodiments, a compound of Formula I is (S)-2-amino-5-((5-aminopentyl)amino)pentanoic acid trihydrochloride (Compound (3), trihydrochloride).

Liver Fibrosis (Including Cirrhosis)

In one aspect, the invention features a method for treating liver fibrosis, the method comprising administering to the subject in need thereof an effective amount of a compound according to Formula I, or a pharmaceutically acceptable salt thereof.

In embodiments, a subject has stage 2, stage 3, or stage 4 liver fibrosis.

In embodiments, a subject has cirrhosis (stage 4 liver fibrosis).

In embodiments, a subject has a fibrosis stage score of ≥1.

In embodiments, a subject has a fibrosis stage score of 0-3.

In embodiments, a subject has a fibrosis stage score of 0. In embodiments, a subject has a fibrosis stage score of 1. In embodiments, a subject has a fibrosis stage score of 2. In embodiments, a subject has a fibrosis stage score of 3. In embodiments, a subject has a fibrosis stage score of 4 (cirrhosis).

In embodiments, after treatment patients can have a fibrosis stage score that is at least no worse than the baseline score before treatment, and alternatively can have a reduction in the fibrosis stage score of at least one level, alternatively at least two or three levels.

In embodiments, administering of the compound of Formula I (e.g., any one of Compounds (1), (2), and (3)), or a pharmaceutically acceptable salt thereof results in stabilization of liver fibrosis in the subject.

In embodiments, administering of the compound of Formula I (e.g., any one of Compounds (1), (2), and (3)), or a pharmaceutically acceptable salt thereof results in reversal of liver fibrosis in the subject.

In embodiments, a subject has non-alcoholic steatohepatitis (NASH).

In embodiments, a compound of Formula I is (S)-2-amino-6-((3-aminopropyl)amino)hexanoic acid (Compound (1)), or a pharmaceutically acceptable salt thereof. In embodiments, a compound of Formula (I) is (S)-2-amino-6-((3-aminopropyl)amino)hexanoic acid dihydrochloride (Compound (1), dihydrochloride).

In embodiments, a compound of Formula I is (S)-2-amino-5-((6-aminohexyl)amino)pentanoic acid (Compound (2)), or a pharmaceutically acceptable salt thereof. In embodiments, a compound of Formula I is (S)-2-amino-5-((6-aminohexyl)amino)pentanoic acid trihydrochloride (Compound (2), trihydrochloride).

In embodiments, a compound of Formula I is (S)-2-amino-5-((5-aminopentyl)amino)pentanoic acid (Compound (3)), or a pharmaceutically acceptable salt thereof. In embodiments, a compound of Formula I is (S)-2-amino-5-((5-aminopentyl)amino)pentanoic acid trihydrochloride (Compound (3), trihydrochloride).

Steatosis

In one aspect, the invention features a method for treating steatosis, the method comprising administering to the subject in need thereof an effective amount of a compound according to Formula I, or a pharmaceutically acceptable salt thereof.

In embodiments, administering of the compound of Formula I or a pharmaceutically acceptable salt thereof results in a decrease of steatosis in the subject.

In embodiments, steatosis comprises macrovesicular steatosis. In embodiments, steatosis comprises microvesicular steatosis. In embodiments, steatosis comprises macrovesicular and microvesicular steatosis.

In embodiments, a subject has non-alcoholic steatohepatitis (NASH).

In embodiments, a compound of Formula I is (S)-2-amino-6-((3-aminopropyl)amino)hexanoic acid (Compound (1)), or a pharmaceutically acceptable salt thereof. In embodiments, a compound of Formula (I) is (S)-2-amino-6-((3-aminopropyl)amino)hexanoic acid dihydrochloride (Compound (1), dihydrochloride).

In embodiments, a compound of Formula I is (S)-2-amino-5-((6-aminohexyl)amino)pentanoic acid (Compound (2)), or a pharmaceutically acceptable salt thereof. In embodiments, a compound of Formula I is (S)-2-amino-5-((6-aminohexyl)amino)pentanoic acid trihydrochloride (Compound (2), trihydrochloride).

In embodiments, a compound of Formula I is (S)-2-amino-5-((5-aminopentyl)amino)pentanoic acid (Compound (3)), or a pharmaceutically acceptable salt thereof. In embodiments, a compound of Formula I is (S)-2-amino-5-((5-aminopentyl)amino)pentanoic acid trihydrochloride (Compound (3), trihydrochloride).

Co-Morbid Conditions

Methods described herein can be useful in treating subjects having co-morbid conditions.

In embodiments, a subject is pre-diabetic.

In embodiments, a subject is diabetic. In embodiments, a subject has type 2 diabetes.

In embodiments, a subject is not diabetic. In embodiments, a subject does not have type 2 diabetes.

In embodiments, a subject is obese. In embodiments, a subject is not obese. In embodiments, a subject has a body mass index (BMI) of greater than 30. In embodiments, a subject has a BMI of less than 30. In embodiments, a subject has a BMI of less than 25.

In embodiments, a subject has dyslipidemia. In embodiments, a subject does not have dysliperidemia.

In embodiments, a subject has hypertension. In embodiments, a subject does not have hypertension.

In embodiments, a subject is insulin resistant. In embodiments, a subject is not insulin resistant.

In embodiments, a subject has a cardiovascular disease. In embodiments, a subject is at risk for cardiovascular disease. In embodiments, a subject does not have cardiovascular disease.

Pharmaceutical Compositions

In another aspect, the invention features a pharmaceutical composition comprising a compound according to Formula I (e.g., any of Compounds (1), (2), and (3)), or a pharmaceutically acceptable salt thereof; and a pharmaceutically acceptable carrier. "Pharmaceutically acceptable carrier" means any carrier, diluent or excipient which is compatible with the other ingredients of the formulation and not deleterious to the recipient.

In embodiments of methods and uses described herein, compounds may be administered in the form of a pharmaceutical composition, in combination with a pharmaceutically acceptable carrier.

The active agent may be formulated into dosage forms according to standard practices in the field of pharmaceutical preparations. See Alphonso Gennaro, ed., Remington's Pharmaceutical Sciences, 18th Edition (1990), Mack Publishing Co., Easton, PA. Suitable dosage forms may comprise, for example, tablets, capsules, solutions, parenteral solutions, troches, suppositories, or suspensions.

The compounds of Formula I may be administered in a convenient manner. Suitable topical routes include oral, rectal, inhaled (including nasal), topical (including buccal and sublingual), transdermal and vaginal, e.g., across the epidermis. The compound of Formula I can also be used for parenteral administration (including subcutaneous, intravenous, intramuscular, intradermal, intraarterial, intrathecal and epidural), and the like. It will be appreciated that a selected route may vary with for example the condition of the recipient.

For parenteral administration, the active agent may be mixed with a suitable carrier or diluent such as water, an oil (particularly a vegetable oil), ethanol, saline solution, aqueous dextrose (glucose) and related sugar solutions, glycerol, or a glycol such as propylene glycol or polyethylene glycol. Solutions for parenteral administration can contain a water soluble salt of the active agent. Stabilizing agents, antioxidant agents and preservatives may also be added. Suitable antioxidant agents include sulfite, ascorbic acid, citric acid and its salts, and sodium EDTA. Suitable preservatives include benzalkonium chloride, methyl- or propyl-paraben, and chlorbutanol. The composition for parenteral administration may take the form of an aqueous or non-aqueous solution, dispersion, suspension or emulsion.

In embodiments, a compound of Formula I (e.g., any one of Compounds (1), (2), and (3)), or any pharmaceutically acceptable salt thereof, is orally administered to a subject.

For oral administration, the active agent may be combined with one or more solid inactive ingredients for the preparation of tablets, capsules, pills, powders, granules or other suitable oral dosage forms. For example, the active agent may be combined with at least one excipient such as fillers, binders, humectants, disintegrating agents, solution retarders, absorption accelerators, wetting agents absorbents or lubricating agents. According to one tablet embodiment, the active agent may be combined with carboxymethylcellulose (CMC) calcium, magnesium stearate, mannitol and starch, and then formed into tablets by conventional tableting methods.

The pharmaceutical compositions of the present disclosure may also be formulated so as to provide slow or controlled release of the active ingredient therein using, for example, hydropropylmethyl cellulose in varying proportions to provide the desired release profile, other polymer matrices, gels, permeable membranes, osmotic systems, multilayer coatings, microparticles, liposomes and/or microspheres.

In general, a controlled-release preparation is a pharmaceutical composition capable of releasing the active ingredient at the required rate to maintain constant pharmacological activity for a desirable period of time. Such dosage forms provide a supply of a drug to the body during a predetermined period of time and thus maintain drug levels in the therapeutic range for longer periods of time than conventional non-controlled formulations.

U.S. Pat. No. 5,674,533 discloses controlled-release pharmaceutical compositions in liquid dosage forms for the administration of moguisteine, a potent peripheral antitussive. U.S. Pat. No. 5,059,595 describes the controlled-release of active agents by the use of a gastro-resistant tablet for the therapy of organic mental disturbances. U.S. Pat. No. 5,591,767 describes a liquid reservoir transdermal patch for the controlled. U.S. Pat. No. 5,120,548 discloses a controlled-release drug delivery device comprised of swellable polymers. U.S. Pat. No. 5,073,543 describes controlled-release formulations containing a trophic factor entrapped by a ganglioside-liposome vehicle. U.S. Pat. No. 5,639,476 discloses a stable solid controlled-release formulation having a coating derived from an aqueous dispersion of a hydrophobic acrylic polymer. Biodegradable microparticles are known for use in controlled-release formulations. U.S. Pat. No. 5,733,566 describes the use of polymeric microparticles that release antiparasitic compositions.

The controlled-release of the active ingredient may be stimulated by various inducers, for example pH, temperature, enzymes, water, or other physiological conditions or compounds. Various mechanisms of drug release exist. For example, in one embodiment, the controlled-release component may swell and form porous openings large enough to release the active ingredient after administration to a patient. The term "controlled-release component" in the context of the present disclosure is defined herein as a compound or compounds, such as polymers, polymer matrices, gels, permeable membranes, liposomes and/or microspheres, that facilitate the controlled-release of the active ingredient in the pharmaceutical composition. In another embodiment, the controlled-release component is biodegradable, induced by exposure to the aqueous environment, pH, temperature, or enzymes in the body. In another embodiment, sol-gels may be used, wherein the active ingredient is incorporated into a sol-gel matrix that is a solid at room temperature. This matrix is implanted into a patient, e.g., a mammal, having a body temperature high enough to induce gel formation of the sol-gel matrix, thereby releasing the active ingredient into the patient.

The components used to formulate the pharmaceutical compositions are of high purity and are substantially free of potentially harmful contaminants (e.g., at least National Food grade, generally at least analytical grade, and more typically at least pharmaceutical grade). Particularly for human consumption, the composition can be manufactured or formulated under Good Manufacturing Practice standards as defined in the applicable regulations of the U.S. Food and Drug Administration. For example, suitable formulations may be sterile and/or substantially isotonic and/or in full compliance with all Good Manufacturing Practice regulations of the U.S. Food and Drug Administration.

Dosage and Dosage Regimens

A physician will determine the dosage of the active agent which will be most suitable and it will vary with the form of administration and the particular compound chosen, and furthermore, it will vary depending upon various factors, including but not limited to the patient under treatment and the age of the patient, the severity of the condition being treated, the rout of administration, and the like. A physician will generally wish to initiate treatment with small dosages substantially less than the optimum dose of the compound and increase the dosage by small increments until the optimum effect under the circumstances is reached. It will generally be found that when the composition is administered orally, larger quantities of the active agent will be required to produce the same effect as a smaller quantity given parenterally. The compounds are useful in the same manner as comparable therapeutic agents and the dosage level is of the same order of magnitude as is generally employed with these other therapeutic agents.

For example, a daily dosage is from about 2 mg/kg/day to about 1000 mg/kg/day, from about 10 mg/kg/day to about 1000 mg/kg/day or from about 10 mg/kg/day to about 100 mg/kg/day. In embodiments, a daily dosage is about 2 mg/kg/day to about 1000 mg/kg/day. In embodiments, a daily dosage is about 10 mg/kg/day to about 1000 mg/kg/day. In embodiments, a daily dosage is about 10 mg/kg/day to about 100 mg/kg/day.

In embodiments, a compound of Formula I (e.g., any one of Compounds (1), (2), and (3)), or any pharmaceutically acceptable salt thereof, is administered to a subject (e.g., a human) at a dose of about 2-1000, 10-1000 or 10-100 mg/kg per day. In embodiments, a dose is of about 10-1000 mg/kg per day. In embodiments, a dose is of about 10-100 mg/kg per day.

In embodiments, a compound of Formula I (e.g., any one of Compounds (1), (2), and (3)), or any pharmaceutically acceptable salt thereof, is administered to a subject (e.g., a human) at a total daily dose that is about 10 mg/kg or greater per day. In embodiments, a compound of Formula I (e.g., any one of Compounds (1), (2), and (3)), or any pharmaceutically acceptable salt thereof, is administered to a subject (e.g., a human) at a total daily dose that is about 2 mg/kg or greater per day.

In embodiments, a compound of Formula I (e.g., any one of Compounds (1), (2), and (3)), or any pharmaceutically acceptable salt thereof, is administered to a subject (e.g., a human) at a total daily dose that is about 100-5000, 500-5000 or 600-3000 mg per day. In embodiments, a total daily dose is about 500-5000 mg per day. In embodiments, a total daily dose is about 600-3000 mg per day.

The treatment may be carried out for as long a period as necessary, either in a single, uninterrupted session, or in discrete sessions. In embodiments, a subject receives treatment In embodiments, a compound of Formula I (e.g., any one of Compounds (1), (2), and (3)), or any pharmaceutically acceptable salt thereof, is administered to a subject (e.g., a human) for a time period that is at least about four, five, six, seven, eight, nine, ten, eleven, twelve, thirteen, fourteen, or sixteen weeks.

In embodiments, a compound of Formula I (e.g., any one of Compounds (1), (2), and (3)), or any pharmaceutically acceptable salt thereof, is administered to a subject (e.g., a human) for a time period that is at least fourteen weeks.

In embodiments, a compound of Formula I (e.g., any one of Compounds (1), (2), and (3)), or any pharmaceutically acceptable salt thereof, is administered to a subject (e.g., a human) for a time period that is at least about 4-6, 4-8, 4-10, 4-12, 4-14, or 4-16 weeks.

The practice of the disclosure is illustrated by the following non-limiting examples.

EXAMPLES

In the following examples, all protocols were approved by the Institutional Animal Care and Use Committee (IACUC). All measures were taken to ensure the welfare, safety, health and comfort of the animals and to minimize stress and pain. Procedures such as necropsy were performed using IACUC-approved protocols for euthanasia.

Example 1—APL and Glucose Tolerance in Rodent Models of NASH

This experiment was designed to determine the effect of (S)-2-amino-6-((3-aminopropyl)amino)hexanoic acid (APL) on impaired glucose tolerance (IGT) in art-recognized models of NASH. The following rodent models were employed: Zucker fa/fa obese rats and Zucker Fa/fa lean rats, and C57BL/6J mice. C57BL/6J mice are a diet-induced obesity (DIO) model; these mice exhibit high sensitivity to obesogenic diets, and are prone to developing diet-induced hepatic necroinflammation and fibrosis. See, e.g., Liang et al, 2014, *PLoS One*, 9(12): e115922; and London & George, 2007, *Clinics in Liver Disease*, 11(1): 55-74.

Zucker fa/fa obese rats and Zucker Fa/fa lean rats (7-week old male animals obtained from Charles Rivers Laboratories, Wilmington, MA, USA) were maintained in individual cages (1 rat per cage to encourage sedentary activity) and had free access to standard rodent chow (Cat #5053, obtained from Labdiet, Saint Louis, MO) and water (filtered and packed using a Hydrapak system) for 7 days until the start of the experiment. Zucker fa/fa obese rats were randomly assigned to two groups: 1) vehicle p.o.b.i.d. (oral administration, twice a day) for 78 days (n=7); and 2) 100 milligram per kilogram (mg/kg) body weight APL (p.o.b.i.d.) for 78 days (n=8). Zucker Fa/fa lean rats (n=4) were administered vehicle (p.o.b.i.d.) for 78 days. Phosphate-buffered saline (PBS), which is the solution used to dissolve APL, was used as vehicle solution. APL powder was dissolved under sterile conditions with PBS at a concentration of 100 mg/mL; volumes were adjusted for each animal accordingly to their body weight. Animals had free access to food and water, except during the glucose tolerance test (GTT) procedures.

C57BL/6J mice 5 week old male mice obtained from Jackson Laboratories, Bar Harbor, ME, USA) were maintained in cages (5 mice per cage) and had free access to standard rodent chow (Cat #5053, obtained from Labdiet, Saint Louis, MO) and water (filtered and packed using a Hydrapak system) for 5 days until the start of the experiment. The animals were then randomly assigned to five groups (n=5 for each group) receiving different diets and treatments as shown in Table A for 130 days. Each treatment was administered p.o.b.i.d. The APL dosage administered to each animal was 200 milligrams per kilogram of body weight divided in two dosages per day, via oral gavage and the pioglitazone dosage received each animal was 20 milligrams per kilogram of body weight divided in two dosages per day, via oral gavage. "HFD" is high fat/high fructose diet, which contains 58% fat, 25% carbohydrate and 17% protein. HFD was obtained from Research Diets, Inc. "Chow" refers to standard rodent chow (Cat #5053, obtained from Labdiet, Saint Louis, MO). Animals were fed ad libitum, except during the GTT experiments.

TABLE A

| Group | Food | Treatment (Drug or control) |
|---|---|---|
| 1 | Chow | Vehicle |
| 2 | Chow | APL |
| 3 | HFD | Vehicle |
| 4 | HFD | APL |
| 5 | HFD | pioglitazone |

Figure 2:
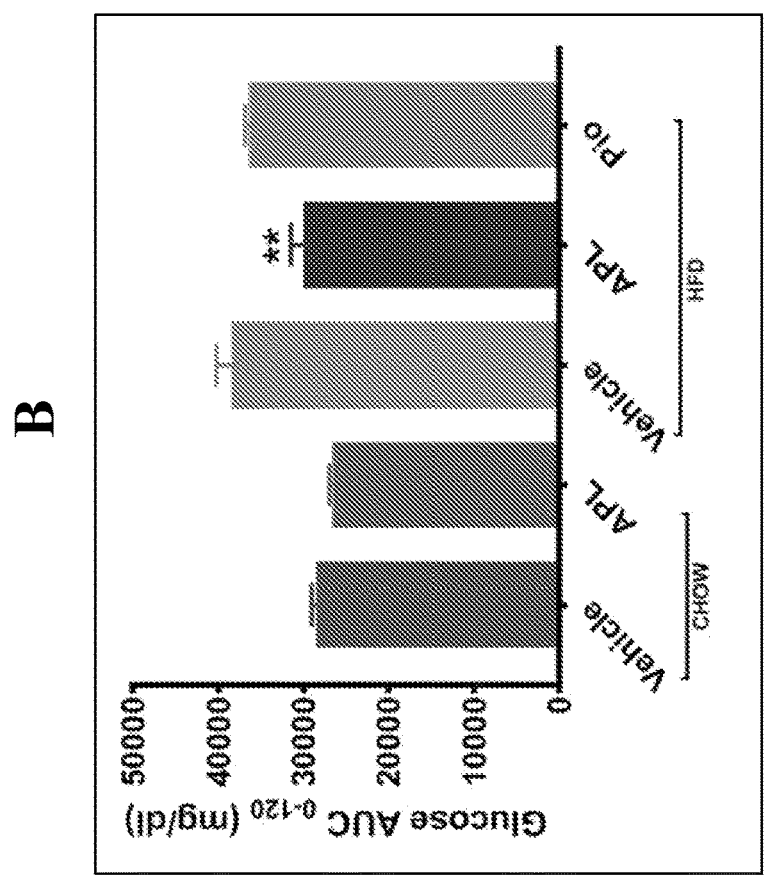
FIG. 2, comprising
Figure 2:
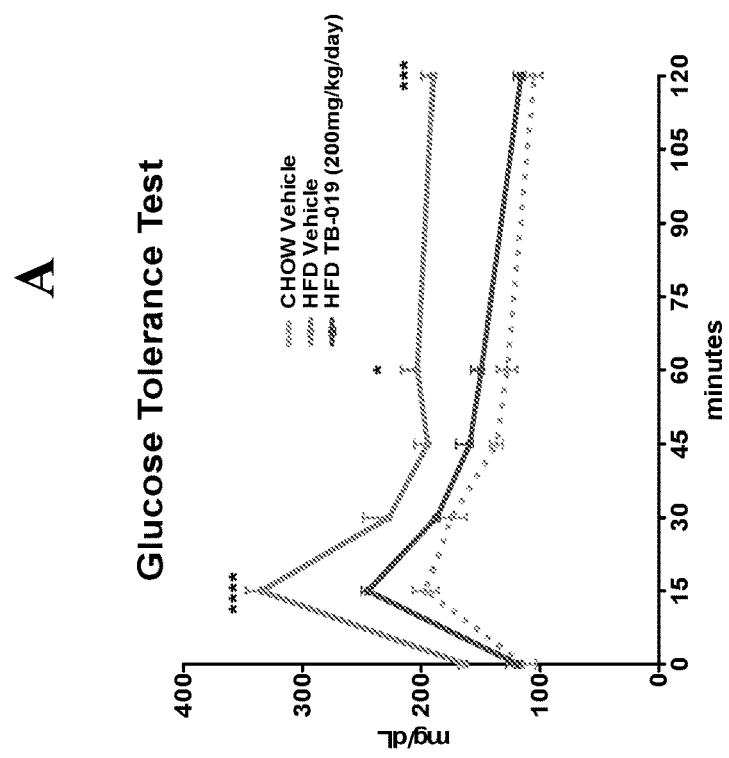

At the conclusion of the experimental time period (78 days for rats and 130 days for mice), the animals were subjected to a glucose tolerance test (GTT) as follows. Animals were fasted for 5 hours, weights, and their tails were clipped to measure fasting blood glucose levels. Immediately after, glucose (2 mg/g body weight) was administered orally. Glucose levels were measured at 0, 15, 30, 45, 60, and 120 minutes after glucose administration. Glucose was measured using the AlphaTRAK 2 glucometer from Abbott The areas under the curves (AUC) of the glucose tolerances test data were calculated. These data are shown in FIGS. 1 and 2. FIG. 1 depicts the rat data. The AUC of GTT was significantly higher in all obese rats treated with vehicle compared to control rats. The AUC of GTT for obese rats treated with APL was significantly lower than obese rats treated with vehicle ($p<0.01$). In the mice, GTT was performed at the beginning of week 18 (at 130 days). FIG. 2 depicts the mouse data. FIG. 2A depicts the GTT data over time. A significant statistical difference was observed between positive control and treated groups at 15-min (**$p<0.0001$), 60-min (*$p<0.05$), and 120-min (***$p<0.001$) time points. A significant statistical difference was also observed between negative control and positive control groups at 0-min and 30-min (*$p<0.05$), 45-min ($p<0.01$), and 15-min, 30-, 60 min-, and 120-min ($p<0.0001$) time points. There was no significant statistical difference between negative control group and treated group at any time point. FIG. 2B depicts the consolidated AUC data. Mice fed with HFD diet that were treated with vehicle solution have significantly higher AUC of GTT compared to both control mice (fed chow and treated with vehicle solution) and to mice fed with HFD and treated with APL ($p<0.01$).

Impaired glucose tolerance (IGT) and diabetes are significant comorbidities of NASH. These data indicate that APL ameliorates IGT to a statistically significant degree in both the rat NASH model and the mouse NASH model.

Example 2—APL and Hepatic Steatosis in High Fat/High Fructose Rodent NASH Model

As in Example 1, C57BL/6 mice (same sample of mice as in Example 1) were maintained in cages (5 mice per cage) and had free access to standard rodent chow (Cat #5053, obtained from Labdiet, Saint Louis, MO) and water (filtered and packed using a Hydrapak system) for 5 days. C57BL/6J mice were fed either CHOW or high fat/high fructose diet (HFD), and treated twice daily (b.i.d.) with oral administration (p.o.) of either vehicle or APL for 18 weeks. The APL dose was 200 milligram per kilogram (mg/kg) per day, administered as two 100 milligram per kilogram (mg/kg) body weight APL (p.o.b.i.d.). Animals were fed ad libitum. The animals were humanely euthanized, and the livers were removed for histological analysis. Liver samples in formalin were allowed to fix for 48 hours, and processed into FFPE blocks after fixations. Slides were stained with hematoxylin and eosin (H&E) and to immunostaining with BODIPY and DAPI to quantitate fat deposition and nuclei number using confocal microscopy. See, e.g., Rico et al, 2007, *J Cell Physiol*, 211(2):504-12; and Daemen et al, 2016, *Mol Metab*, 5(3) 153-63. The data are depicted in FIGS. 3, 4, and 5

Figure 3:
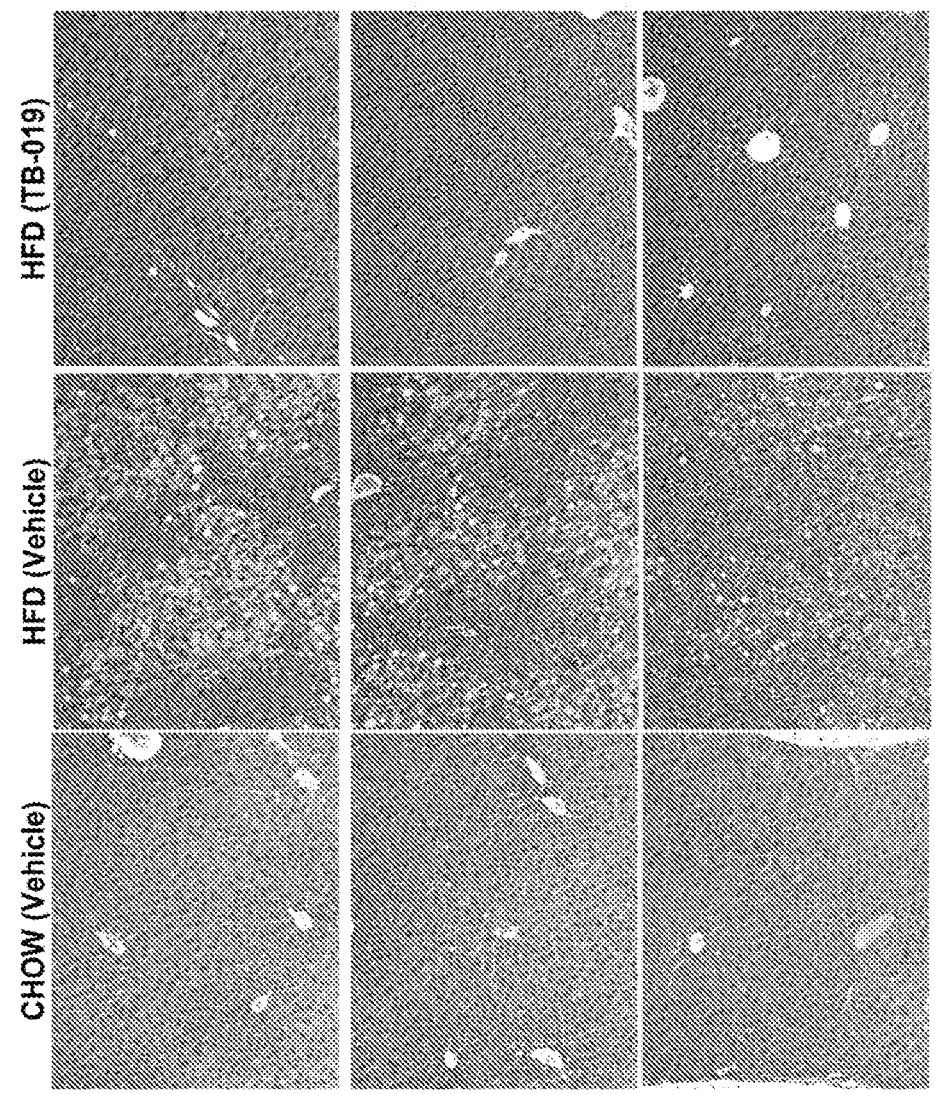
FIG. 3 depicts liver biopsies of C57BL/6J mice fed either CHOW and vehicle (negative control); HFD and vehicle (positive control); or HFD and APL (TB-019; treated) for 131 days, at 20× magnification. Sections were stained with hematoxylin & eosin (H&E). Section of the positive control group displayed sever hepatocyte fat accumulation, inflammatory infiltration and the pathognomic signs of steatohepatitis, and ballooning, especially at zone 3 of the liver. In contrast, the liver sections of the treated group displayed minimal or no ballooning induced by HFD. Thus APL (TB-019) was effective in reducing microscopic liver damage induced by diet.
Figure 4:
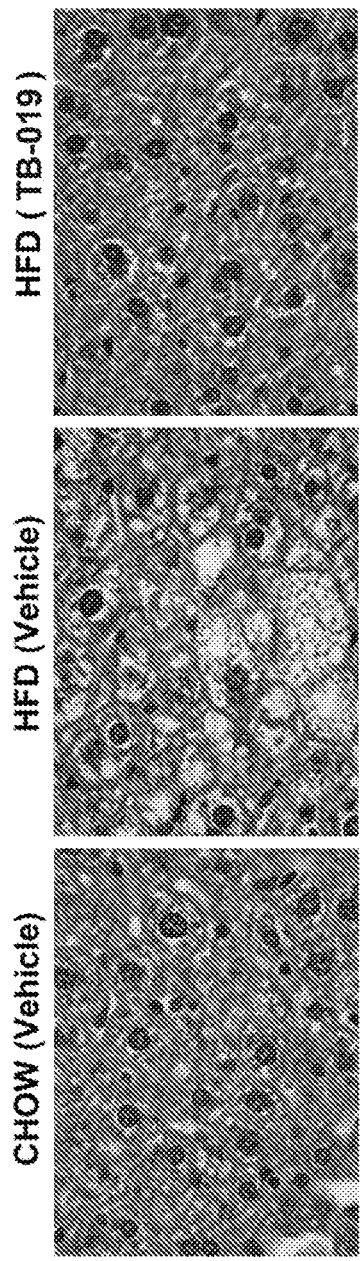
FIG. 4 depicts liver biopsies of C57BL/6J mice fed either CHOW and vehicle (negative control); HFD and vehicle (positive control); or HFD and APL (treated) for 131 days, at 100× magnification.
Figure 5:
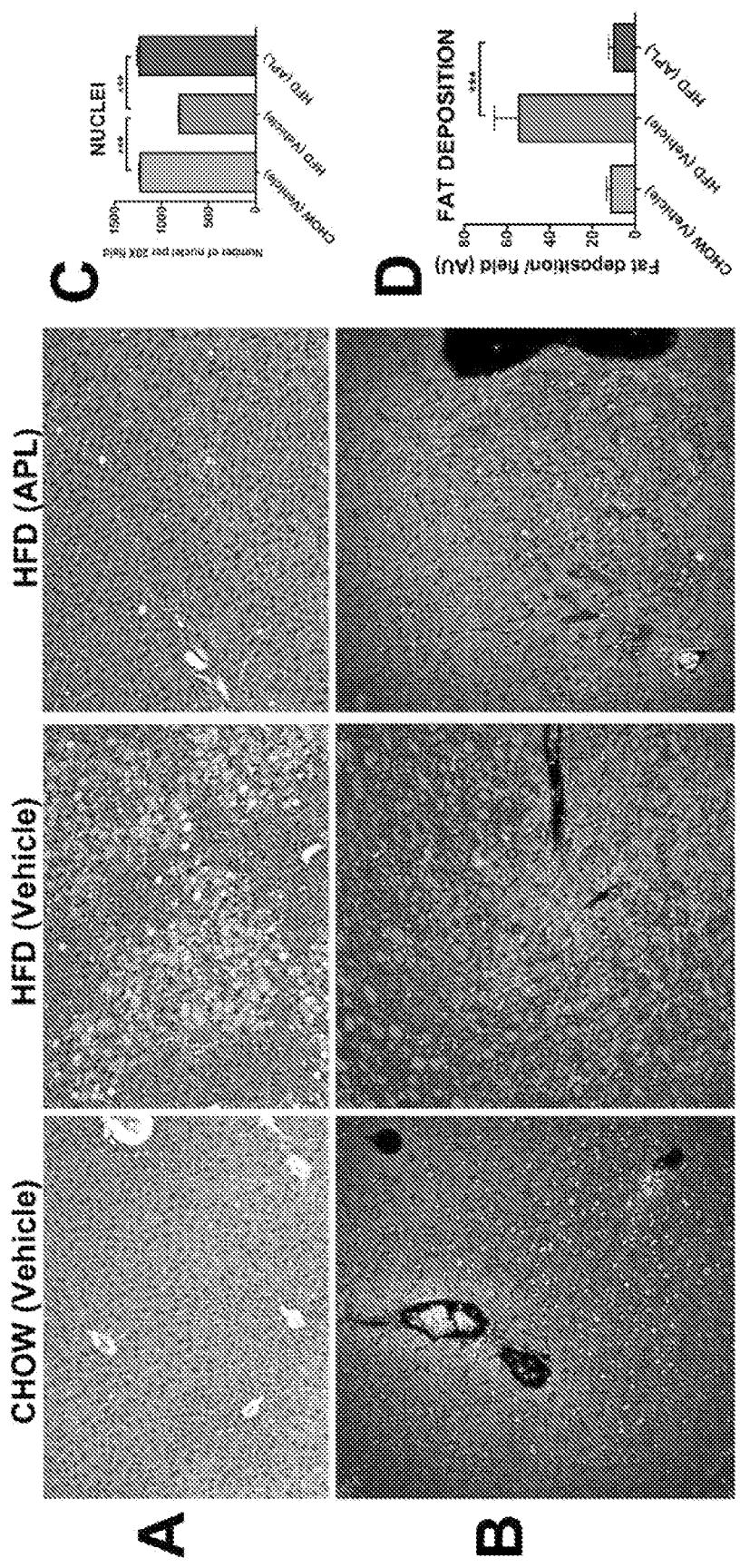
FIG. 5, comprising

FIGS. 3 and 4 depict liver samples stained with hematoxylin and eosin (H&E). FIG. 3 depicts liver samples at 20× magnification. The left most column depicts liver samples of mice fed CHOW (negative control); the center column depicts liver samples of mice fed HFD with vehicle (positive control); and the right most column depicts liver samples from mice fed HFD and treated with APL (treated). FIG. 4 depicts similar liver sections at 100×. The left most column depicts livers from the negative control group; the center column depicts liver from the positive control group; and the right most column depicts livers from the treated group.

Liver sections of animals treated with APL exhibited less severe hepatocyte fat accumulation, inflammatory infiltration, and hepatocyte ballooning. These data demonstrate that APL ameliorates the hallmark liver damage associated with NASH.

FIG. 5A is the representation of multiple images of hematoxylin & eosin (H&E) staining of liver sections from the C57BL/6J mice fed with either CHOW or high fat/high fructose diet (HFD), treated twice daily with either vehicle or APL. The left image in FIG. 5A illustrates the normal anatomical structure of the liver observed in the mice fed with CHOW diet. The normal anatomical structure was completely altered by fat accumulation (white large patches), showing the pathognomonic changes observed in non-alcoholic steatohepatitis (NASH) in the mice fed with HFD and treated with vehicle solution (FIG. 5A, middle image). In contrast, as shown in FIG. 5A, right image, mice fed with HFD and treated with APL retained the normal anatomy of the liver.

FIG. 5B is the illustration of multiple images of immunofluorescence staining with BODIPY and DAPI of liver sections from the same mice; and FIG. 5C is the quantitation of nuclei from the immunofluorescence slides stained with DAPI. Quantitation of nucleic counts was performed using Harmony® 4.6 High-Content Imaging and Analysis Software of Operetta CLS™ (PerkinElmer, Waltham, MA). HFD mice fed with HFD had a statistically significant fewer number of nuclei, when compared either to mice fed with CHOW or to mice fed with HFD and treated with APL (***$p<0.001$). These data demonstrate that APL ameliorates hepatocyte cell death (i.e., ballooning) pathognomic of NASH.

FIG. 5D is the plot of fat deposition assessed using confocal microscopy. Measurements were made in 20×-magnification fields. More than 21 fields from three different animals from each group were analyzed: Chow-vehicle (#fields=26), HFD-Vehicle (#fields=25) and HFD-APL (#fields=23). Indirect measurement using imageJ (Schneider et al., 2012, *Nature Methods* 9(7): 671-675) was used to calculate fat deposition. Fat deposition was increased 3-fold in HFD/vehicle-treated mice compared with CHOW control mice and with HFD/APL-treated mice (***$p<0.001$). These data demonstrate that APL reduces fat deposition in the liver and attenuates hepatic steatosis, both characteristics of NASH.

Hepatocyte ballooning and steatosis are pathognomic of NASH and indicative of the liver damage associates with the condition. These data demonstrate that APL significantly reduces these characteristics and is effective in treating NASH.

Example 3—APL and Non-Alcoholic Fatty Liver Disease Activity Score (NAS) in High Fat/High Fructose Rodent NASH Model C57BL/6J mice were maintained in cages (5 mice per cage) and had free access to standard rodent chow (Cat #5053, obtained from Labdiet, Saint Louis, MO) and water (filtered and packed using a Hydrapak system) for 5 days until the start of the experiment. The animals were then randomly assigned to three groups (n=5 for each group receiving different diets and treatments as shown in Table B for 130 days. Each treatment was administered p.o.b.i.d. The APL dosage was 200 mg/kg body weight. "HFD" is high fat/high fructose diet, as described in Example 1 "Chow" refers to standard rodent chow, as described in Example 1. Animals were fed ad libitum.

TABLE B

| Group | Food | Treatment (Drug or control) |
|---|---|---|
| 1 | Chow | Vehicle |
| 2 | HFD | Vehicle |
| 3 | HFD | APL |

Figure 6:
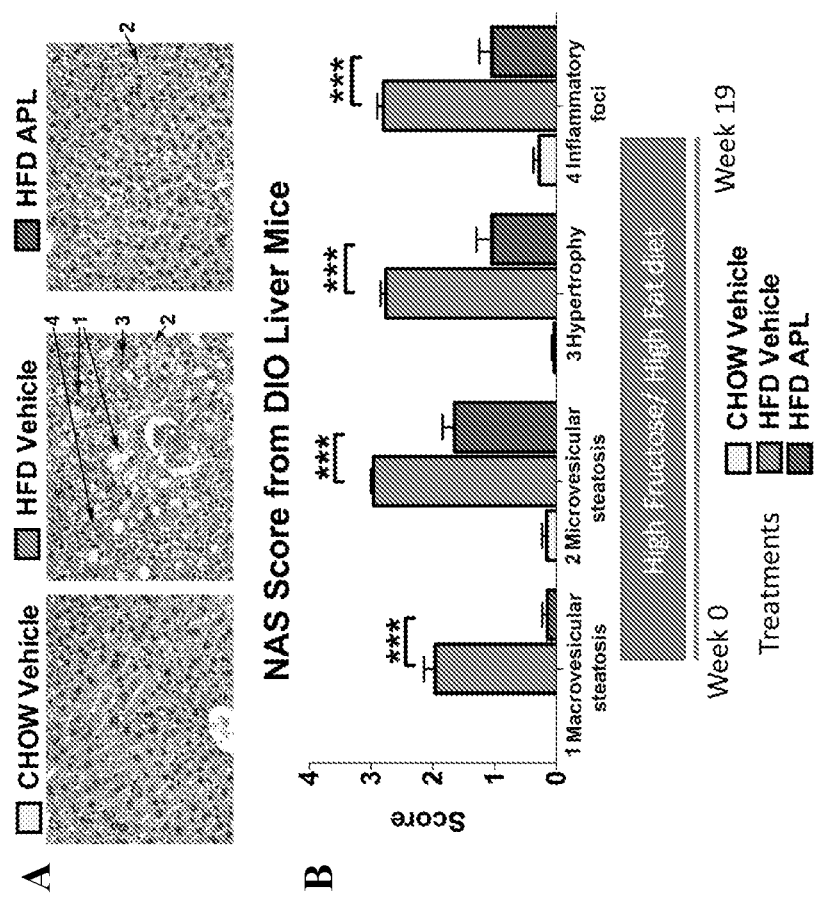
FIG. 6, comprising

At the conclusion of the test period, the animals were humanely euthanized, and the livers were removed for histological analysis. Liver samples in formalin were allowed to fix for 48 hours, and processed into FFPE blocks after fixations. Slides were stained with hematoxylin and eosin (H&E). FIG. 6A is the representation of multiple images of hematoxylin & eosin (H&E) staining of liver sections. These data demonstrate that APL attenuates the morphological changes in the liver pathognomic of NASH. The positive control group exhibited increased steatosis, both macrovesicular and microvesicular (arrows 1 and 2, respectively). Additionally, the positive control group exhibited advanced hypertrophy (i.e., ballooning) and inflammatory foci (arrows 3 and 4, respectively).

The liver samples were evaluated for liver fat (steatosis), inflammation, and hypertrophy in accordance the NAS scoring system. The NAS scoring is depicted in FIG. 6B. The NAS score for mice in the HFD/vehicle-treated mice is increased in all the pathological parameters, when compared with the CHOW/vehicle-treated mice: macrovesicular steatosis, microvesicular steatosis, hepatic hypertrophy and inflammatory foci. Notably, APL treatment showed statistically significant amelioration of all parameters (***$p<0.001$). Thus, APL attenuates hepatic steatosis, inflammation and hypertrophy in the liver, each pathognomic of liver damage and NASH.

Figure 7:
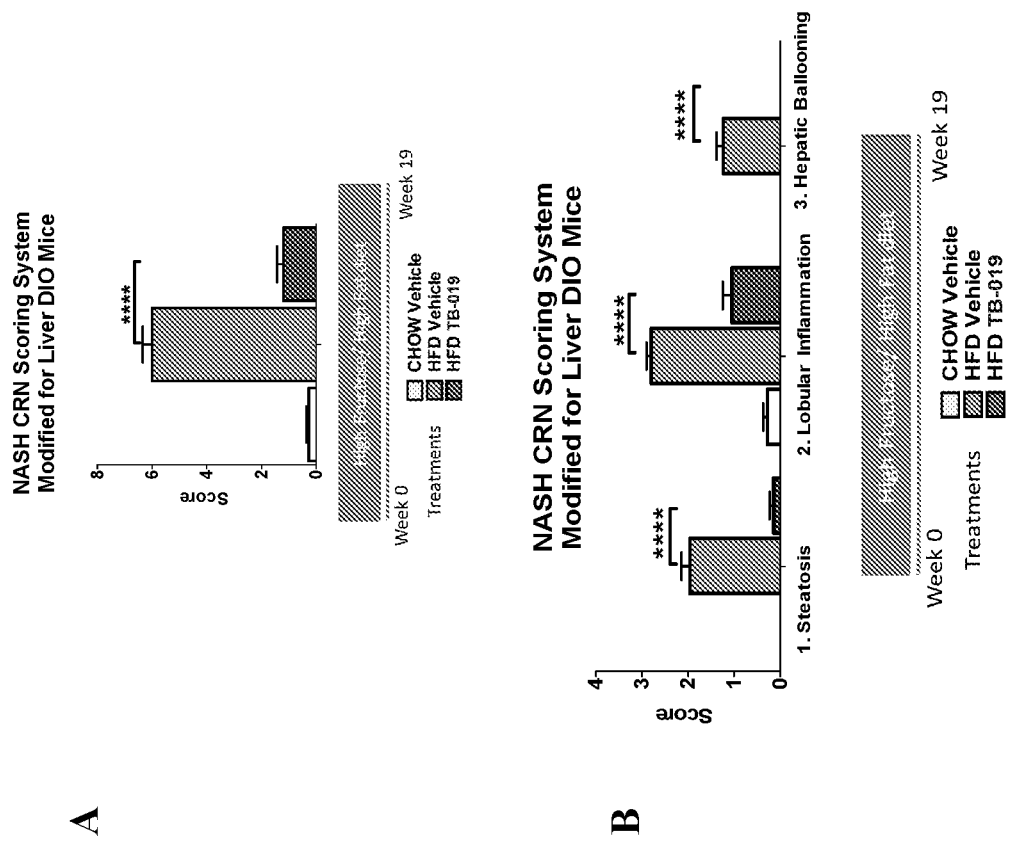
FIG. 7, comprising

FIG. 7 depicts additional NASH Activity Score (NAS) data in the DIO mouse model of NASH. FIG. 7A depicts the Total NAS for mice fed CHOW and administered vehicle, mice fed HFD and administered vehicle, and mice fed HFD and treated with APL (200 mg/kg/day, divided into 2 doses). These data demonstrate that treatment with APL significantly reduces NAS (**$p<0.0001$). FIG. 7B depicts the NAS component scores for steatosis, lobular inflammation, and hepatic ballooning. Again, these data demonstrate that treatment with APL significantly reduces each component of NAS, including steatosis, lobular inflammation, and hepatic ballooning (**$p<0.0001$). Thus APL attenuates each of the characteristics of NASH (hepatic steatosis, inflammation and hypertrophy in the liver), reduces total NAS, and is efficacious in treating NASH.

Example 4—APL and Hepatic Fibrosis in Rodent NASH Model

Zucker (fa/fa) obese rats and Zucker (Fa/fa) lean rats (7-week old male animals obtained from Charles Rivers Laboratories, Wilmington, MA, USA) were maintained in individual cages (1 rat per cage to encourage sedentary activity) and had free access to standard rodent chow (Cat #5053 obtained from Labdiet, Saint Louis, MO) and water for (filtered and packed using a Hydrapak system) for 7 days until the start of the experiment. Zucker (fa/fa) obese rats were randomly assigned to two groups: 1) vehicle p.o.b.i.d. (oral administration, twice a day) for 78 days; and 2) 100 milligram per kilogram (mg/kg) body weight APL (p.o.b.i.d.) for 78 days. Zucker (Fa/fa) lean rats served as control. The APL dosage was 100 mg/kg/day. Animals were fed ad libitum. The animals were humanely euthanized, and the livers were removed for histological analysis. Liver samples in formalin were allowed to fix for 48 hours, and processed into FFPE blocks after fixations. Slides were stained with hematoxylin and eosin (H&E) and Mason trichrome staining.

Figure 8:
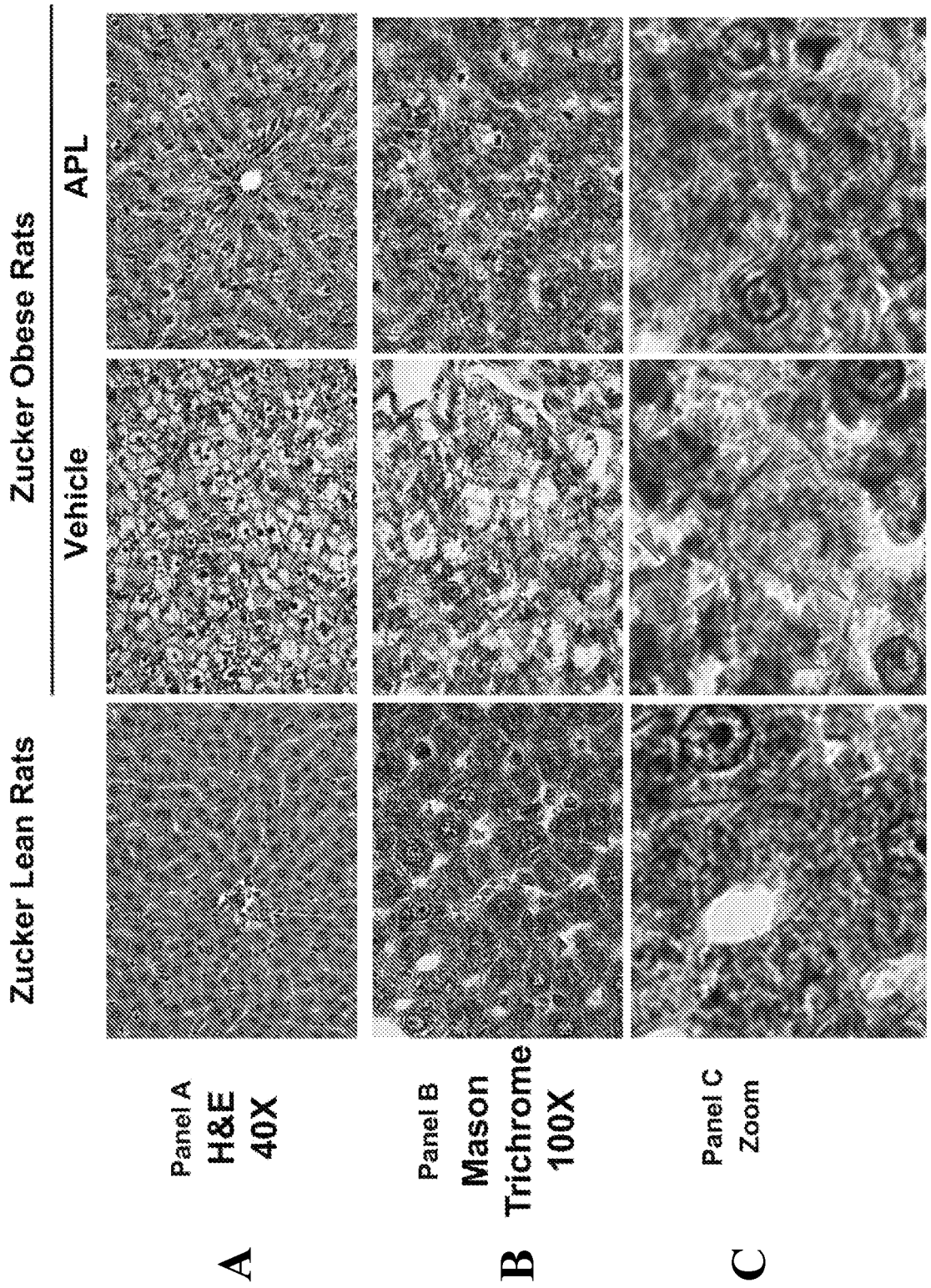
FIG. 8, comprising

The data are depicted in FIG. 8. FIG. 8A is an illustration of one of multiple photographs of hematoxylin and eosin staining liver sections from the Zucker rats. The left image is of liver from the control, Zucker (Fa/fa) lean rats, and shows normal morphology of the liver. The middle image is of liver from Zucker (fa/fa) obese rats treated with vehicle, and the right image is of liver from Zucker (fa/fa) obese rats treated with APL. The images clearly show the massive changes at the hepatic tissue due to fat accumulation in the Zucker (Fa/fa) obese rats treated with vehicle (middle image). In contrast, Zucker (Fa/fa) obese rats treated with APL preserve the normal morphology of the liver (right image).

FIG. 8B is the representation of the Mason trichrome's staining liver sections from the same Zucker rats in FIG. 8A. FIG. 8C is a magnification of one area of FIG. 8B. There are multiple blue staining collagen fibers stained evident in the magnification of the Zucker (Fa/fa) obese treated with vehicle (middle image), while there is minimum blue staining in the Zucker (Fa/fa) obese rats treated with APL (right image). Thus, APL attenuates the increase in liver collage fiber.

These data indicate that APL attenuates hepatic fibrosis, a characteristic of liver damage associated with advanced and/or sever NASH. Thus APL attenuates the development of liver fibrosis and is efficacious in treating NASH.

Example 5—APL and Hepatic Protein Carbonyls in Rodent (Rat) NASH Model

A large number of oxidative stress and antioxidant biomarkers have been studied for possible use in the assessment of the pathological state and progression of NASH, including 4-hydroxynonenal (4-HNE). See, e.g., Ore et al., 2019, *Medicina* (*Kaunas*) 55(2): 26. Oxidative stress can directly or indirectly induce irreversible damage to the proteins by formation of reactive carbonyl groups, mainly aldehydes and ketones. The most common reactive aldehyde in the process of indirect carbonylation is 4-HNE. APL has a high affinity for 4-HNE and can prevent detrimental effects of 4-HNE on proteins, and is efficacious in mitigating insulin resistance. See, WO 2018/049019 and U.S. Patent Application Publication 2019/0192462.

Figure 9:
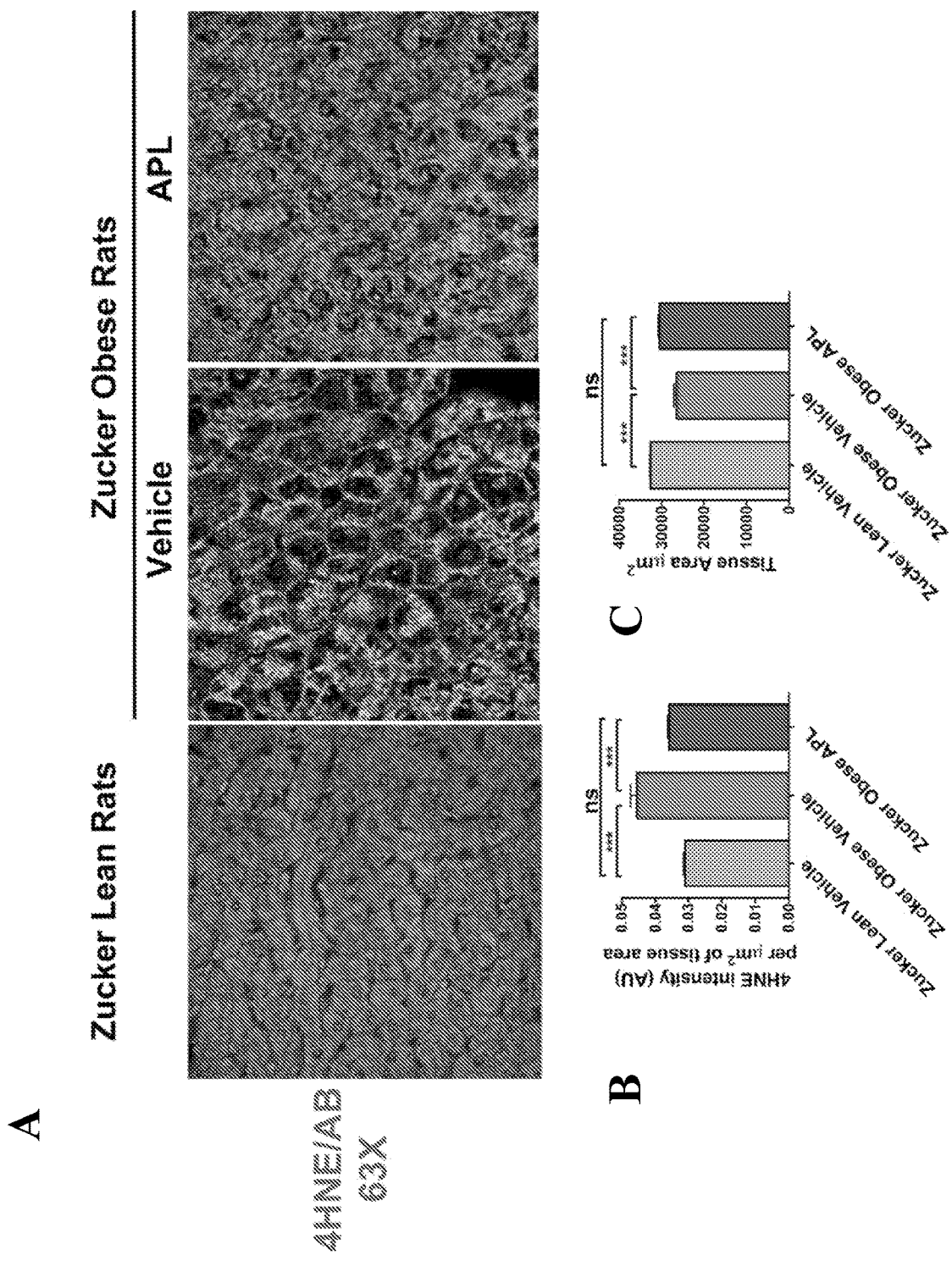
FIG. 9, comprising

Liver samples from the Zucker rats in Example 4 were stained with an anti-4HNE antibody from Abcam (catalog #ab46545) for immunofluorescent analysis of the presence of 4-HNE. The data are depicted in FIG. 9. FIG. 9A are representative images of 4-HNE immunofluorescence liver sections from Zucker (Fa/fa) lean rats, Zucker (fa/fa) obese rats administered vehicle, and Zucker (fa/fa) obese rats administered vehicle administered APL. FIG. 9B is a plot of the 4HNE immunofluorescence intensity per tissue area, and FIG. 9C is a plot of total tissue area. These data show that APL reduces protein carbonyls in liver of Zucker (Fa/fa) obese rats and maintains the total liver tissue area, to a statistically significant degree, compared to Zucker (Fa/fa) obese rats administered vehicle (***p<0.001). Cytotoxic lipid by products such as 4-HNE are known to be elevated in human NASH livers as compared to healthy livers. See e.g., Serviddio et al., Uncoupling protein-2 (UCP2) induces mitochondrial proton leak and increases susceptibility of non-alcoholic steatohepatitis (NASH) liver to ischaemia-reperfusion injury. *Gut.* 2008 July; 57(7):957-65. doi: 10.1136/gut.2007.147496. Epub 2008 Feb. 28. The data implies that 4-HNE plays a crucial role in the pathogenesis of NASH. Further, these data demonstrate that treatment with APL significantly reduces the presence of 4-HNE (***p<0.001). This reduction of 4-HNE and the amelioration of characteristics of NASH, such as steatosis, lobular inflammation, hepatocyte ballooning, and fibrosis, as disclosed herein, demonstrates that the reduction of 4-HNE is an important therapeutic approach to attenuate NASH.

Example 6—APL and Hepatic Protein Carbonyls in Rodent (Mouse) NASH Model

Figure 10:
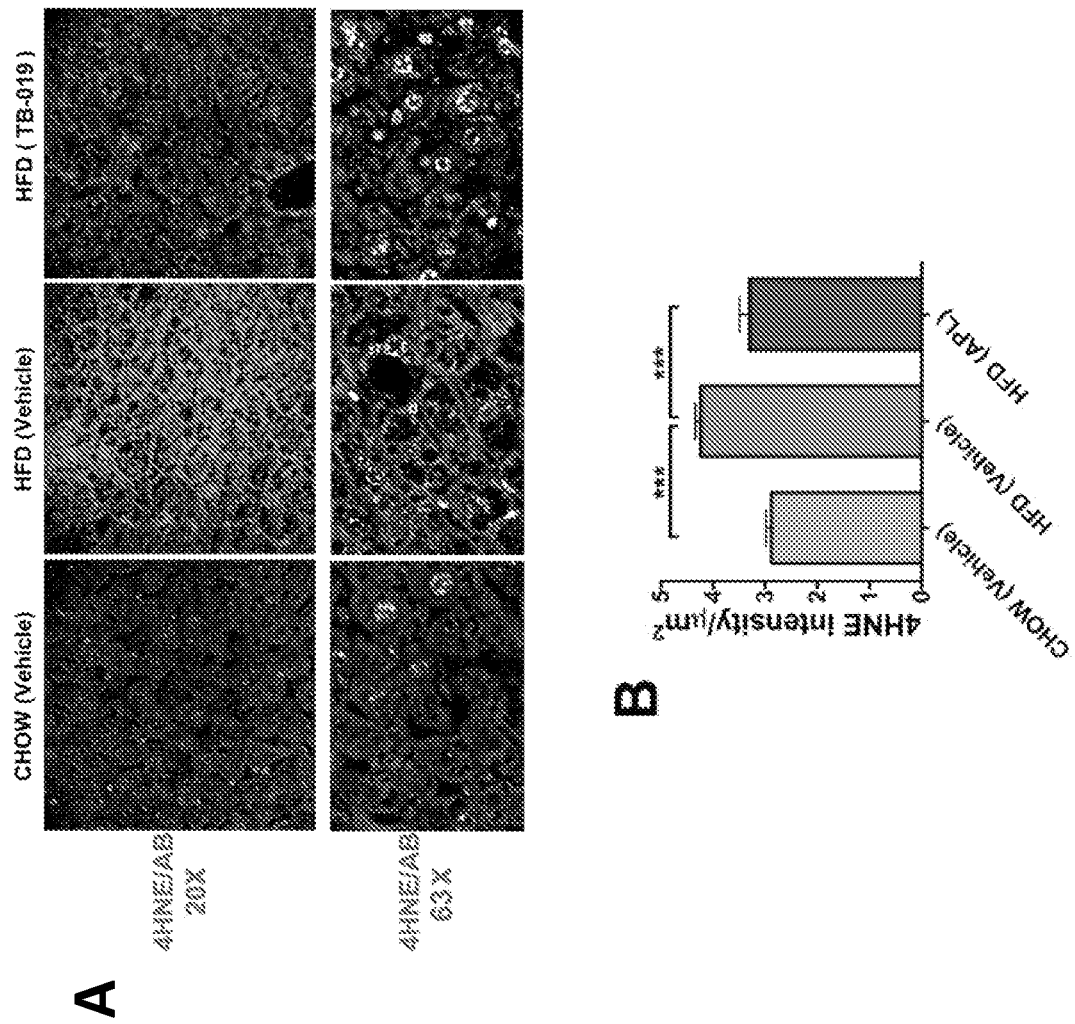
FIG. 10 comprising

Liver samples from C57BL/6J mice fed chow and treated with vehicle, C57BL/6J mice fed HFD and treated with vehicle, and C57BL/6J mice fed HFD and treated with APL, as described in Example 1, were prepared and stained with an anti-4HNE antibody from Abcam (catalog #ab46545) for immunofluorescent analysis of the presence of 4-HNE. The APL dosage, administration frequency, and duration of treatment were as described in Example 1 (APL dosage administered to each animal was 200 milligrams per kilogram of body weight divided in two dosages per day, via oral gavage; treatment duration of 130 days; animals fed ad libitum). The data are depicted in FIG. 10. FIG. 10A are representative images of 4-HNE immunofluorescence liver sections from C57BL/6J mice fed chow and treated with vehicle, C57BL/6J mice fed HFD and treated with either vehicle or APL (TB-019) at 20× or 63× magnification. FIG. 10B is a plot of the 4-HNE immunofluorescence intensity per tissue area. These data show that APL (TB-019) reduced protein carbonyls in liver of C57BL/6J mice fed HFD to a statistically significant degree, compared to C57BL/6J mice fed HFD and administered vehicle (***p<0.001). This reduction of protein carbonylation and the amelioration of characteristics of NASH, such as steatosis, lobular inflammation, hepatocyte ballooning, and fibrosis, as disclosed herein, demonstrates that the reduction of 4-HNE is an important therapeutic approach to attenuate NASH.

The pathophysiologic mechanism of NASH involves an increase in free fatty acids in the hepatocytes, which then leads to an increase lipotoxic lipids including 4-hydroxynonenal (4-HNE). It is believed, without being held to theory, that the mechanism of APL's efficacy in treating NASH is based on APL's high affinity for 4-HNE which reduces or prevents the detrimental effects of 4-NHE in hepatocyte proteins, including carbonylation.

Example 7—APL and Liver Function Serum Biomarkers in Diet Induced Mouse Model

Figure 11:
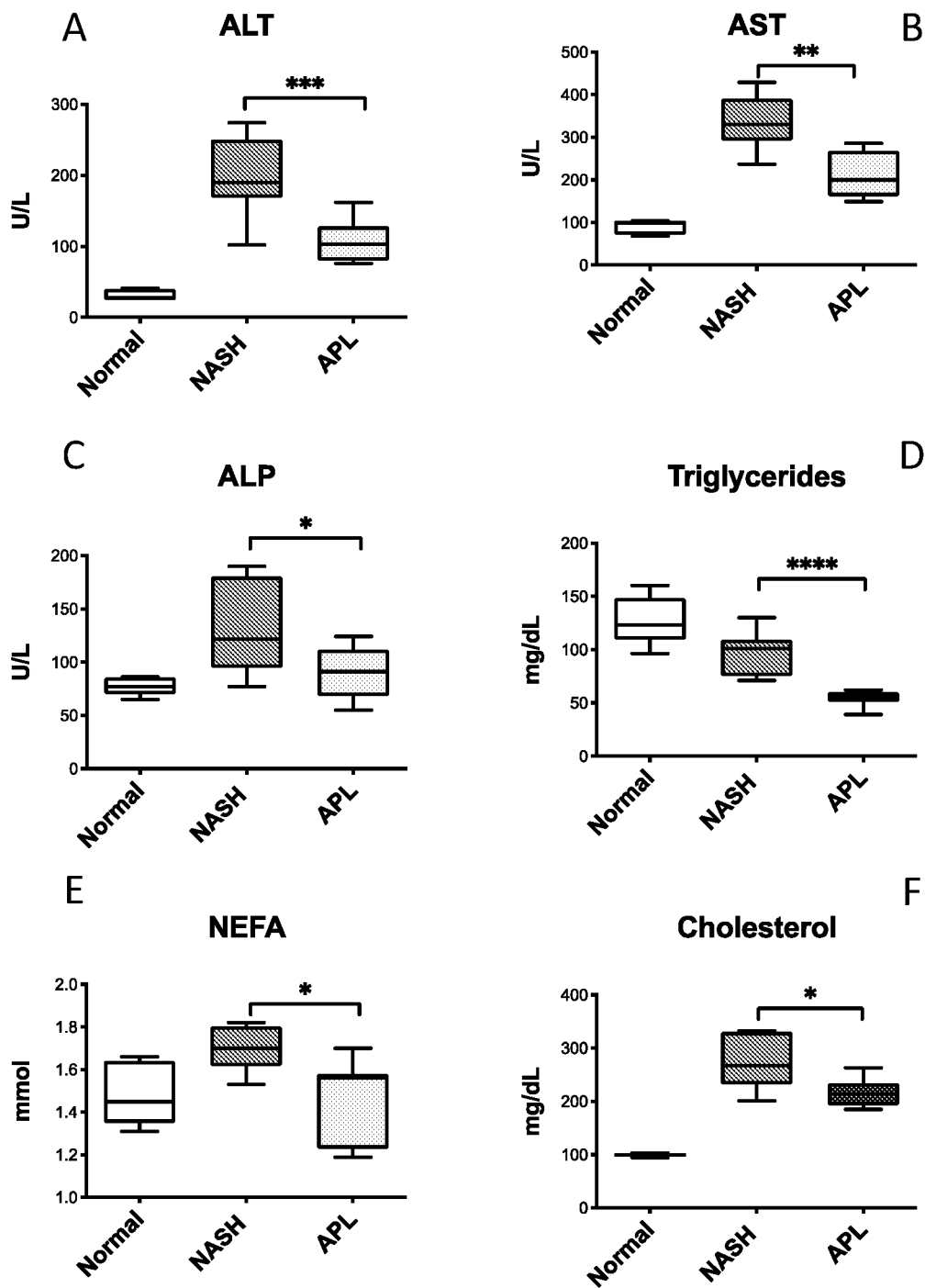
FIG. 11, comprising
Figure 12:
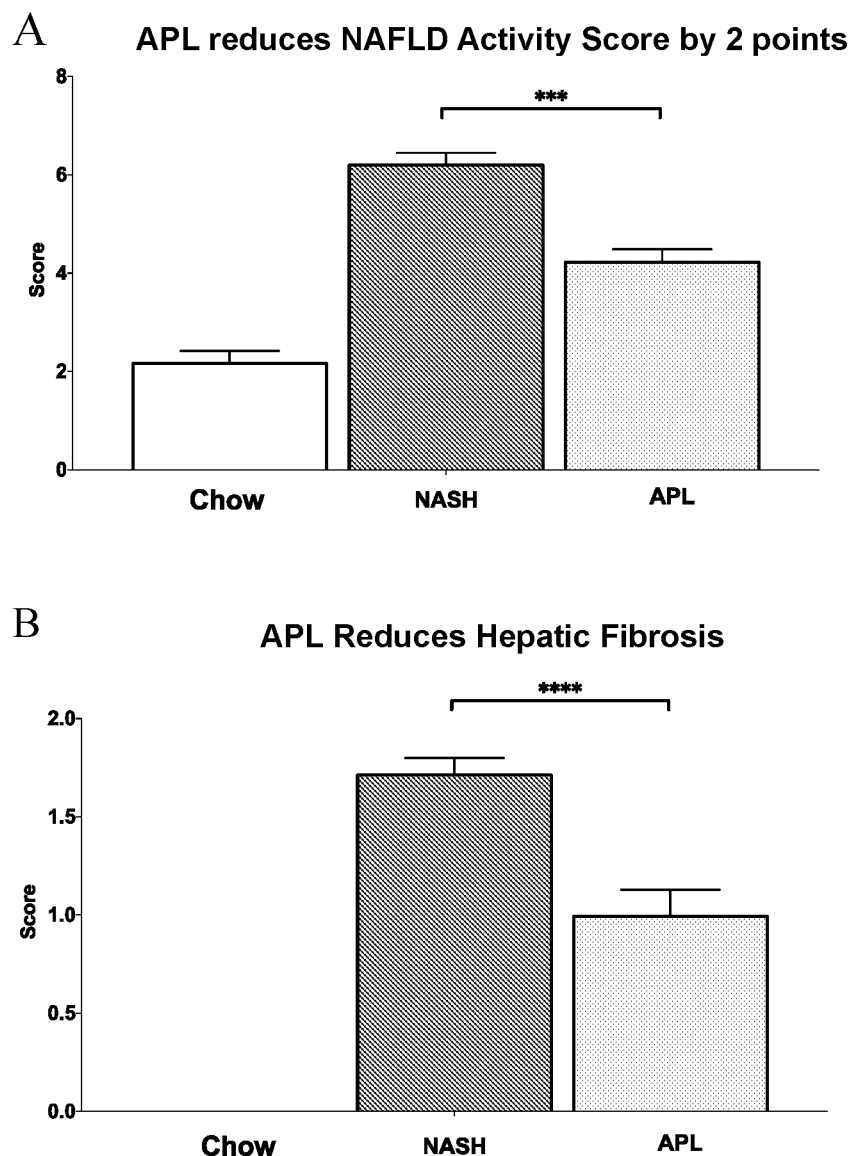
FIG. 12, comprising

C57BL/6 mice were maintained in cages and had free access to standard rodent chow (Cat #5053, obtained from Labdiet, Saint Louis, MO) and water. C57BL/6J mice were fed either CHOW (negative control) or amylin liver NASH (AMLN) diet (58% high fat, 25% carbohydrate, 2% cholesterol) for twenty (20) weeks. Beginning at twenty (20) weeks, animals fed AMLN diet were changed to HFD. At fifty (50) weeks, animals were treated twice daily (b.i.d.) with oral administration (p.o.) of either vehicle (positive control) or APL (treated). The APL dose was 50, 100, or 200 milligram per kilogram (mg/kg) per day, administered as two doses (i.e., 25 mg/kg twice a day, 50 mg/kg twice a day, or 100 mg/kg twice a day. At sixty-six (66) weeks, serum samples were collected and assayed for ALT, AST, APL, triglycerides, non-esterified fatty acids, and cholesterol. All treatment groups received 50 mg/kg/day except for the cholesterol test group which received 200 mg/kg/day. These results are summarized in FIG. 11. Animals treated with APL exhibited significant reduction in ALT, AST, ALP, triglycerides, nonesterified fatty acids, and cholesterol as compared to positive control group animals (*p<0.02; p=0.002; *p=0.0008, and **p<0.0001). Results for reduction of NAS and liver fibrosis are summarized in FIG. 12. Animal treated with APL exhibited significant reduction in NAS (*p<0.001) and liver fibrosis (****p<0.0001). This data demonstrates that APL attenuates NAS, serum liver function biomarkers, and fibrosis, and is thus efficacious in treating NASH.

The disclosures of each and every patent, patent application, GenBank record, and publication cited herein are hereby incorporated herein by reference in their entirety.

Although the present embodiments have been described in detail with reference to examples above, it is understood that various modifications can be made without departing from the spirit of these embodiments, and would be readily known to the skilled artisan. The appended claims are intended to be construed to include all such embodiments and equivalent variations.

What is claimed is:

1. A method for treating non-alcoholic steatohepatitis (NASH), said method comprising administering to a subject in need thereof a therapeutically effective amount of a compound according to Formula I,

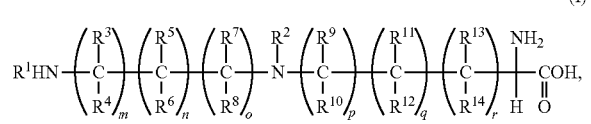

or a pharmaceutically acceptable salt thereof, wherein:
R$^1$ is selected from the group consisting of hydrogen, —(C$_1$-C$_8$)alkyl, —(C$_1$-C$_8$)alkenyl, —(C$_1$-C$_8$)alkynyl, unsubstituted or substituted -ara(C$_1$-C$_6$)alkyl, unsubstituted or substituted -heteroara(C$_1$-C$_6$)alkyl, where the substituents on said substituted ara(C$_1$-C$_6$)alkyl and substituted heteroara(C$_1$-C$_6$)alkyl are selected from the group consisting of halogen, —CN, —NO$_2$, —NH$_2$, —NH(C$_1$-C$_6$)alkyl, —N[(C$_1$-C$_6$)alkyl)]$_2$, —OH, halo (C$_1$-C$_6$)alkyl, —(C$_1$-C$_6$)alkoxy, halo(C$_1$-C$_6$)alkoxy, —SH, thio(C$_1$-C$_6$)alkyl, —SONH$_2$, —SO$_2$NH$_2$, —SO—(C$_1$-C$_6$)alkyl, —SO$_2$—(C$_1$-C$_6$)alkyl, —NHSO$_2$ (C$_1$-C$_6$)alkyl, and —NHSO$_2$NH$_2$;
R$^2$ is selected from the group consisting of hydrogen, —(C$_1$-C$_8$)alkyl, —(C$_1$-C$_8$)alkenyl, —(C$_1$-C$_8$)alkynyl, unsubstituted or substituted -ara(C$_1$-C$_6$)alkyl, unsubstituted or substituted -heteroara(C$_1$-C$_6$)alkyl, where the substituents on said substituted ara(C$_1$-C$_6$)alkyl and substituted heteroara(C$_1$-C$_6$)alkyl are selected from the group consisting of halogen, —CN, —NO$_2$, —NH$_2$, —OH, halo(C$_1$-C$_6$)alkyl, —(C$_1$-C$_6$)alkoxy, halo(C$_1$-C$_6$)alkoxy, —SH, thio(C$_1$-C$_6$)alkyl, —SONH$_2$, —SO$_2$NH$_2$, —SO—(C$_1$-C$_6$)alkyl, —SO$_2$—(C$_1$-C$_6$)alkyl, —NHSO$_2$ (C$_1$-C$_6$)alkyl, and —NHSO$_2$NH$_2$;
R$^3$, R$^4$, R$^7$, R$^8$, R$^9$, R$^{10}$, R$^{13}$ and R$^{14}$ are independently selected from the group consisting of hydrogen and —(C$_1$-C$_6$)alkyl;
R$^5$ and R$^6$ are independently selected from the group consisting of hydrogen, —(C$_1$-C$_6$)alkyl and —OH, provided that both R$^5$ and R$^6$ cannot be —OH;

R$^{11}$ and R$^{12}$ are independently selected from the group consisting of hydrogen, —(C$_1$-C$_6$)alkyl and —OH, provided that both R$^{11}$ and R$^{12}$ cannot be —OH;
m is 1, 2, 3 or 4;
n is 0, 1, 2, 3 or 4;
is 0, 1, 2, 3 or 4;
p is 1, 2, 3 or 4;
q is 0, 1, 2, 3 or 4; and
r is 0, 1, 2, 3 or 4.

2. The method of claim 1, wherein the compound is (S)-2-amino-6-((3-aminopropyl)amino)hexanoic acid,

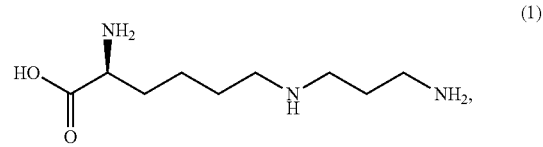 [SMILES: NCCCNCCCC[C@H](N)C(=O)O]

or a pharmaceutically acceptable salt thereof.

3. The method of claim 1, wherein the compound is (S)-2-amino-5-((6-aminohexyl)amino)pentanoic acid,

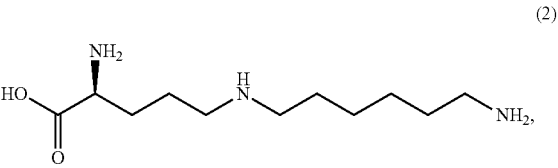 [SMILES: NCCCCCCNCCC[C@H](N)C(=O)O]

or
(S)-2-amino-5-((5-aminopentyl)amino)pentanoic acid,

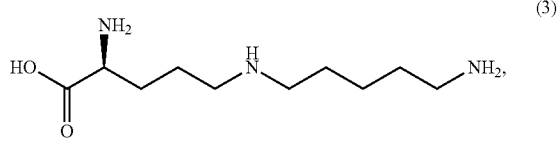 [SMILES: NCCCCCNCCC[C@H](N)C(=O)O]

or a pharmaceutically acceptable salt thereof.

4. The method of claim 1, wherein the subject has non-cirrhotic NASH, cirrhotic NASH, liver inflammation, a liver characterized by hepatocellular ballooning, elevated hepatic alanine aminotransferase (ALT) levels, elevated hepatic aspartate aminotransferase (AST) levels, or liver fibrosis.

5. A method for reducing liver inflammation, said method comprising administering to a subject in need thereof a therapeutically effective amount of a compound according to Formula I,

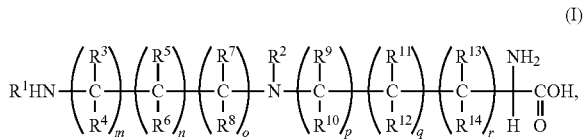

or a pharmaceutically acceptable salt thereof, wherein:
R$^1$ is selected from the group consisting of hydrogen, —(C$_1$-C$_8$)alkyl, —(C$_1$-C$_8$)alkenyl, —(C$_1$-C$_8$)alkynyl, unsubstituted or substituted -ara($C_1$-$C_6$)alkyl, unsubstituted or substituted -heteroara($C_1$-$C_6$)alkyl, where the substituents on said substituted ara($C_1$-$C_6$)alkyl and substituted heteroara($C_1$-$C_6$)alkyl are selected from the group consisting of halogen, —CN, —$NO_2$, —$NH_2$, —NH($C_1$-$C_6$)alkyl, —N[($C_1$-$C_6$)alkyl)]$_2$, —OH, halo($C_1$-$C_6$)alkyl, —($C_1$-$C_6$)alkoxy, halo($C_1$-$C_6$)alkoxy, —SH, thio($C_1$-$C_6$)alkyl, —$SONH_2$, —$SO_2NH_2$, —SO—($C_1$-$C_6$)alkyl, —$SO_2$—($C_1$-$C_6$)alkyl, —$NHSO_2$ ($C_1$-$C_6$)alkyl, and —$NHSO_2NH_2$;

$R^2$ is selected from the group consisting of hydrogen, —($C_1$-$C_8$)alkyl, —($C_1$-$C_8$)alkenyl, —($C_1$-$C_8$)alkynyl, unsubstituted or substituted -ara($C_1$-$C_6$)alkyl, unsubstituted or substituted -heteroara($C_1$-$C_6$)alkyl, where the substituents on said substituted ara($C_1$-$C_6$)alkyl and substituted heteroara($C_1$-$C_6$)alkyl are selected from the group consisting of halogen, —CN, —$NO_2$, —$NH_2$, —OH, halo($C_1$-$C_6$)alkyl, —($C_1$-$C_6$)alkoxy, halo($C_1$-$C_6$)alkoxy, —SH, thio($C_1$-$C_6$)alkyl, —$SONH_2$, —$SO_2NH_2$, —SO—($C_1$-$C_6$)alkyl, —$SO_2$—($C_1$-$C_6$)alkyl, —$NHSO_2$ ($C_1$-$C_6$)alkyl, and —$NHSO_2NH_2$;

$R^3$, $R^4$, $R^7$, $R^8$, $R^9$, $R^{10}$, $R^{13}$ and $R^{14}$ are independently selected from the group consisting of hydrogen and —($C_1$-$C_6$)alkyl;

$R^5$ and $R^6$ are independently selected from the group consisting of hydrogen, —($C_1$-$C_6$)alkyl and —OH, provided that both $R^5$ and $R^6$ cannot be —OH;

$R^{11}$ and $R^{12}$ are independently selected from the group consisting of hydrogen, —($C_1$-$C_6$)alkyl and —OH, provided that both $R^{11}$ and $R^{12}$ cannot be —OH;

m is 1, 2, 3 or 4;
n is 0, 1, 2, 3 or 4;
is 0, 1, 2, 3 or 4;
p is 1, 2, 3 or 4;
q is 0, 1, 2, 3 or 4; and
r is 0, 1, 2, 3 or 4.

6. The method of claim 5, wherein the compound is (S)-2-amino-6-((3-aminopropyl)amino)hexanoic acid,

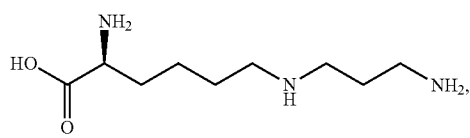
(1)

or a pharmaceutically acceptable salt thereof.

7. The method of claim 5, wherein the compound is (S)-2-amino-5-((6-aminohexyl)amino)pentanoic acid,

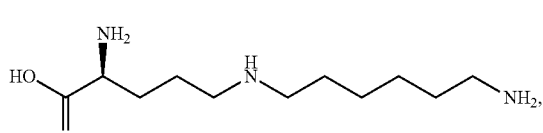
(2)

or
(S)-2-amino-5-((5-aminopentyl)amino)pentanoic acid,

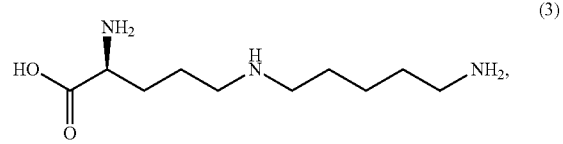 [SMILES: NCCCCCNCCC[C@H](N)C(=O)O]
(3)

or a pharmaceutically acceptable salt thereof.

8. The method of claim 5, wherein the liver inflammation is lobular inflammation.

9. A method for reducing hepatocellular ballooning, said method comprising administering to a subject in need thereof a therapeutically effective amount of a compound according to Formula I,

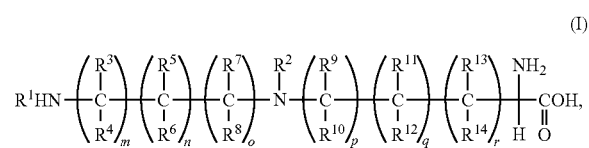
(I)

or a pharmaceutically acceptable salt thereof, wherein:

$R^1$ is selected from the group consisting of hydrogen, —($C_1$-$C_8$)alkyl, —($C_1$-$C_8$)alkenyl, —($C_1$-$C_8$)alkynyl, unsubstituted or substituted -ara($C_1$-$C_6$)alkyl, unsubstituted or substituted -heteroara($C_1$-$C_6$)alkyl, where the substituents on said substituted ara($C_1$-$C_6$)alkyl and substituted heteroara($C_1$-$C_6$)alkyl are selected from the group consisting of halogen, —CN, —$NO_2$, —$NH_2$, —NH($C_1$-$C_6$)alkyl, —N[($C_1$-$C_6$)alkyl)]$_2$, —OH, halo($C_1$-$C_6$)alkyl, —($C_1$-$C_6$)alkoxy, halo($C_1$-$C_6$)alkoxy, —SH, thio($C_1$-$C_6$)alkyl, —$SONH_2$, —$SO_2NH_2$, —SO—($C_1$-$C_6$)alkyl, —$SO_2$—($C_1$-$C_6$)alkyl, —$NHSO_2$ ($C_1$-$C_6$)alkyl, and —$NHSO_2NH_2$;

$R^2$ is selected from the group consisting of hydrogen, —($C_1$-$C_8$)alkyl, —($C_1$-$C_8$)alkenyl, —($C_1$-$C_8$)alkynyl, unsubstituted or substituted -ara($C_1$-$C_6$)alkyl, unsubstituted or substituted -heteroara($C_1$-$C_6$)alkyl, where the substituents on said substituted ara($C_1$-$C_6$)alkyl and substituted heteroara($C_1$-$C_6$)alkyl are selected from the group consisting of halogen, —CN, —$NO_2$, —$NH_2$, —OH, halo($C_1$-$C_6$)alkyl, —($C_1$-$C_6$)alkoxy, halo($C_1$-$C_6$)alkoxy, —SH, thio($C_1$-$C_6$)alkyl, —$SONH_2$, —$SO_2NH_2$, —SO—($C_1$-$C_6$)alkyl, —$SO_2$—($C_1$-$C_6$)alkyl, —$NHSO_2$ ($C_1$-$C_6$)alkyl, and —$NHSO_2NH_2$;

$R^3$, $R^4$, $R^7$, $R^8$, $R^9$, $R^{10}$, $R^{13}$ and $R^{14}$ are independently selected from the group consisting of hydrogen and —($C_1$-$C_6$)alkyl;

$R^5$ and $R^6$ are independently selected from the group consisting of hydrogen, —($C_1$-$C_6$)alkyl and —OH, provided that both $R^5$ and $R^6$ cannot be —OH;

$R^{11}$ and $R^{12}$ are independently selected from the group consisting of hydrogen, —($C_1$-$C_6$)alkyl and —OH, provided that both $R^{11}$ and $R^{12}$ cannot be —OH;

m is 1, 2, 3 or 4;
n is 0, 1, 2, 3 or 4;
is 0, 1, 2, 3 or 4;
p is 1, 2, 3 or 4;
q is 0, 1, 2, 3 or 4; and
r is 0, 1, 2, 3 or 4.

10. The method of claim 9, wherein the compound is (S)-2-amino-6-((3-aminopropyl)amino)hexanoic acid, (1)

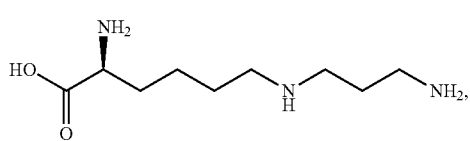

or a pharmaceutically acceptable salt thereof.

11. The method of claim 9, wherein the compound is (S)-2-amino-5-((6-aminohexyl)amino)pentanoic acid, (2)

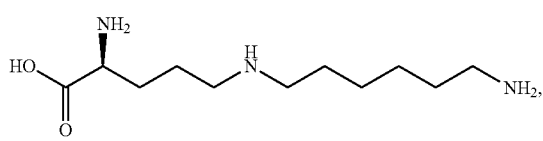

or
(S)-2-amino-5-((5-aminopentyl)amino)pentanoic acid, (3)

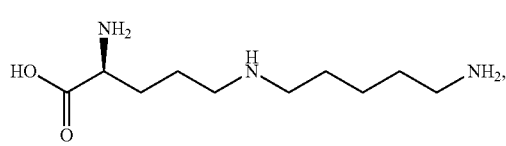

or a pharmaceutically acceptable salt thereof.

12. A method for treating liver fibrosis, said method comprising administering to a subject in need thereof a therapeutically effective amount of a compound according to Formula I, (I)

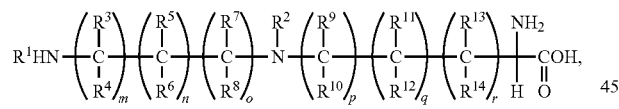

or a pharmaceutically acceptable salt thereof, wherein:
$R^1$ is selected from the group consisting of hydrogen, —(C$_1$-C$_8$)alkyl, —(C$_1$-C$_8$)alkenyl, —(C$_1$-C$_8$)alkynyl, unsubstituted or substituted -ara(C$_1$-C$_6$)alkyl, unsubstituted or substituted -heteroara(C$_1$-C$_6$)alkyl, where the substituents on said substituted ara(C$_1$-C$_6$)alkyl and substituted heteroara(C$_1$-C$_6$)alkyl are selected from the group consisting of halogen, —CN, —NO$_2$, —NH$_2$, —NH(C$_1$-C$_6$)alkyl, —N[(C$_1$-C$_6$)alkyl]$_2$, —OH, halo(C$_1$-C$_6$)alkyl, —(C$_1$-C$_6$)alkoxy, halo(C$_1$-C$_6$)alkoxy, —SH, thio(C$_1$-C$_6$)alkyl, —SONH$_2$, —SO$_2$NH$_2$, —SO—(C$_1$-C$_6$)alkyl, —SO$_2$—(C$_1$-C$_6$)alkyl, —NHSO$_2$ (C$_1$-C$_6$)alkyl, and —NHSO$_2$NH$_2$;
$R^2$ is selected from the group consisting of hydrogen, —(C$_1$-C$_8$)alkyl, —(C$_1$-C$_8$)alkenyl, —(C$_1$-C$_8$)alkynyl, unsubstituted or substituted -ara(C$_1$-C$_6$)alkyl, unsubstituted or substituted -heteroara(C$_1$-C$_6$)alkyl, where the substituents on said substituted ara(C$_1$-C$_6$)alkyl and substituted heteroara(C$_1$-C$_6$)alkyl are selected from the group consisting of halogen, —CN, —NO$_2$, —NH$_2$,
—OH, halo(C$_1$-C$_6$)alkyl, —(C$_1$-C$_6$)alkoxy, halo(C$_1$-C$_6$)alkoxy, —SH, thio(C$_1$-C$_6$)alkyl, —SONH$_2$, —SO$_2$NH$_2$, —SO—(C$_1$-C$_6$)alkyl, —SO$_2$—(C$_1$-C$_6$)alkyl, —NHSO$_2$ (C$_1$-C$_6$)alkyl, and —NHSO$_2$NH$_2$;
$R^3$, $R^4$, $R^7$, $R^8$, $R^9$, $R^{10}$, $R^{13}$ and $R^{14}$ are independently selected from the group consisting of hydrogen and —(C$_1$-C$_6$)alkyl;
$R^5$ and $R^6$ are independently selected from the group consisting of hydrogen, —(C$_1$-C$_6$)alkyl and —OH, provided that both $R^5$ and $R^6$ cannot be —OH;
$R^{11}$ and $R^{12}$ are independently selected from the group consisting of hydrogen, —(C$_1$-C$_6$)alkyl and —OH, provided that both $R^{11}$ and $R^{12}$ cannot be —OH;
m is 1, 2, 3 or 4;
n is 0, 1, 2, 3 or 4;
o is 0, 1, 2, 3 or 4;
p is 1, 2, 3 or 4;
q is 0, 1, 2, 3 or 4; and
r is 0, 1, 2, 3 or 4.

13. The method of claim 12, wherein the compound is (S)-2-amino-6-((3-aminopropyl)amino)hexanoic acid, (1)

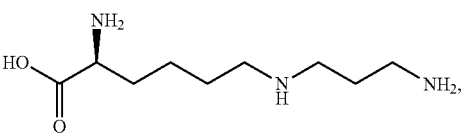

or a pharmaceutically acceptable salt thereof.

14. The method of claim 12, wherein the compound is (S)-2-amino-5-((6-aminohexyl)amino)pentanoic acid, (2)

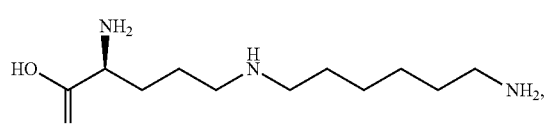

or
(S)-2-amino-5-((5-aminopentyl)amino)pentanoic acid, (3)

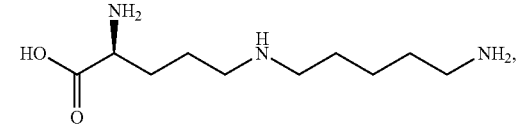

or a pharmaceutically acceptable salt thereof.

15. A method for treating steatosis, said method comprising administering to a subject in need thereof a therapeutically effective amount of a compound according to Formula I, (I)

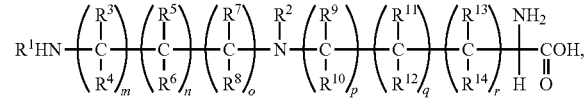

or a pharmaceutically acceptable salt thereof, wherein:

- R$^1$ is selected from the group consisting of hydrogen, —(C$_1$-C$_8$)alkyl, —(C$_1$-C$_8$)alkenyl, —(C$_1$-C$_8$)alkynyl, unsubstituted or substituted -ara(C$_1$-C$_6$)alkyl, unsubstituted or substituted -heteroara(C$_1$-C$_6$)alkyl, where the substituents on said substituted ara(C$_1$-C$_6$)alkyl and substituted heteroara(C$_1$-C$_6$)alkyl are selected from the group consisting of halogen, —CN, —NO$_2$, —NH$_2$, —NH(C$_1$-C$_6$)alkyl, —N[(C$_1$-C$_6$)alkyl)]$_2$, —OH, halo(C$_1$-C$_6$)alkyl, —(C$_1$-C$_6$)alkoxy, halo(C$_1$-C$_6$)alkoxy, —SH, thio(C$_1$-C$_6$)alkyl, —SONH$_2$, —SO$_2$NH$_2$, —SO—(C$_1$-C$_6$)alkyl, —SO$_2$—(C$_1$-C$_6$)alkyl, —NHSO$_2$ (C$_1$-C$_6$)alkyl, and —NHSO$_2$NH$_2$;
- R$^2$ is selected from the group consisting of hydrogen, —(C$_1$-C$_8$)alkyl, —(C$_1$-C$_8$)alkenyl, —(C$_1$-C$_8$)alkynyl, unsubstituted or substituted -ara(C$_1$-C$_6$)alkyl, unsubstituted or substituted -heteroara(C$_1$-C$_6$)alkyl, where the substituents on said substituted ara(C$_1$-C$_6$)alkyl and substituted heteroara(C$_1$-C$_6$)alkyl are selected from the group consisting of halogen, —CN, —NO$_2$, —NH$_2$, —OH, halo(C$_1$-C$_6$)alkyl, —(C$_1$-C$_6$)alkoxy, halo(C$_1$-C$_6$)alkoxy, —SH, thio(C$_1$-C$_6$)alkyl, —SONH$_2$, —SO$_2$NH$_2$, —SO—(C$_1$-C$_6$)alkyl, —SO$_2$—(C$_1$-C$_6$)alkyl, —NHSO$_2$ (C$_1$-C$_6$)alkyl, and —NHSO$_2$NH$_2$;
- R$^3$, R$^4$, R$^7$, R$^8$, R$^9$, R$^{10}$, R$^{13}$ and R$^{14}$ are independently selected from the group consisting of hydrogen and —(C$_1$-C$_6$)alkyl;
- R$^5$ and R$^6$ are independently selected from the group consisting of hydrogen, —(C$_1$-C$_6$)alkyl and —OH, provided that both R$^5$ and R$^6$ cannot be —OH;
- R$^{11}$ and R$^{12}$ are independently selected from the group consisting of hydrogen, —(C$_1$-C$_6$)alkyl and —OH, provided that both R$^{11}$ and R$^{12}$ cannot be —OH;
- m is 1, 2, 3 or 4;
- n is 0, 1, 2, 3 or 4;
- is 0, 1, 2, 3 or 4;
- p is 1, 2, 3 or 4;
- q is 0, 1, 2, 3 or 4; and
- r is 0, 1, 2, 3 or 4.

16. The method of claim 15, wherein the compound is (S)-2-amino-6-((3-aminopropyl)amino)hexanoic acid,

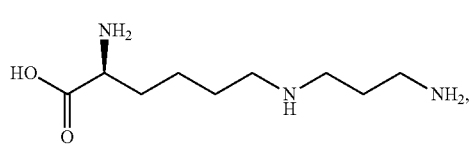

(1)

or a pharmaceutically acceptable salt thereof.

17. The method of claim 15, wherein the compound is (S)-2-amino-5-((6-aminohexyl)amino)pentanoic acid,

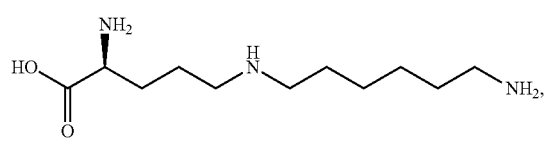

(2)

or (S)-2-amino-5-((5-aminopentyl)amino)pentanoic acid,

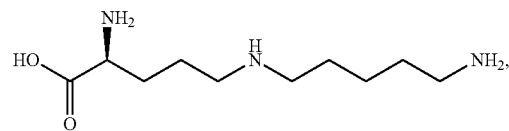

(3)

or a pharmaceutically acceptable salt thereof.

18. The method of claim 2, wherein the compound is a hydrochloride salt of (S)-2-amino-6-((3-aminopropyl)amino)hexanoic acid,

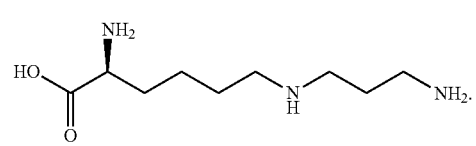

(1)

19. The method of claim 18, wherein the compound is a monohydrochloride salt, dihydrochloride salt, or trihydrochloride salt of (S)-2-amino-6-((3-aminopropyl)amino)hexanoic acid,

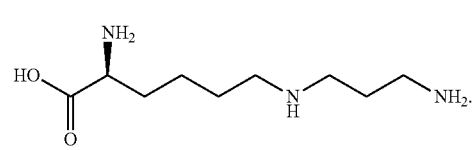

(1)

20. The method of claim 3, wherein the compound is a hydrochloride salt of (S)-2-amino-5-((6-aminohexyl)amino)pentanoic acid,

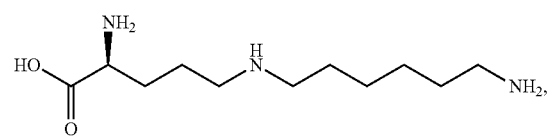

(2)

or (S)-2-amino-5-((5-aminopentyl)amino)pentanoic acid,

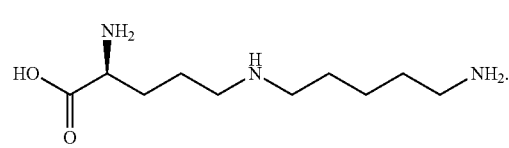

(3)

21. The method of claim 20, wherein the compound is a monohydrochloride salt, dihydrochloride salt, or trihydrochloride salt of (S)-2-amino-5-((6-aminohexyl)amino)pentanoic acid,

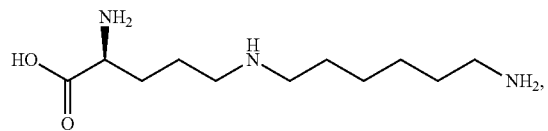

or (S)-2-amino-5-((5-aminopentyl)amino)pentanoic acid,

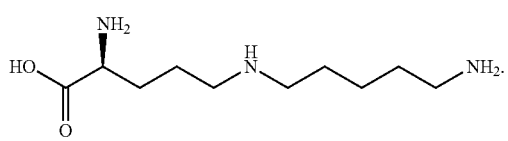

22. The method of claim 6, wherein the compound is a hydrochloride salt of (S)-2-amino-6-((3-aminopropyl)amino)hexanoic acid,

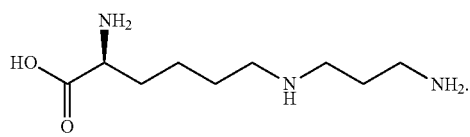

23. The method of claim 22, wherein the compound is a monohydrochloride salt, dihydrochloride salt, or trihydrochloride salt of (S)-2-amino-6-((3-aminopropyl)amino)hexanoic acid,

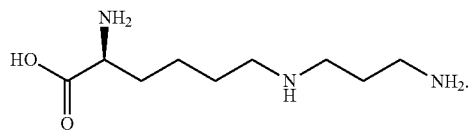

24. The method of claim 7, wherein the compound is a hydrochloride salt of (S)-2-amino-5-((6-aminohexyl)amino)pentanoic acid,

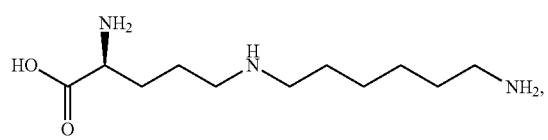

or (S)-2-amino-5-((5-aminopentyl)amino)pentanoic acid,

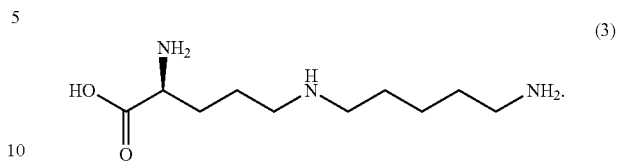

25. The method of claim 24, wherein the compound is a monohydrochloride salt, dihydrochloride salt, or trihydrochloride salt of (S)-2-amino-5-((6-aminohexyl)amino)pentanoic acid,

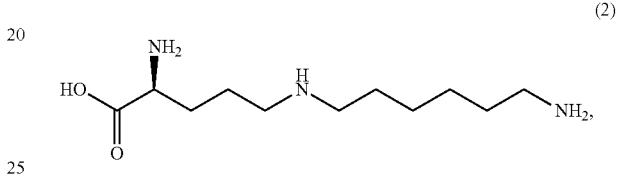

or (S)-2-amino-5-((5-aminopentyl)amino)pentanoic acid,

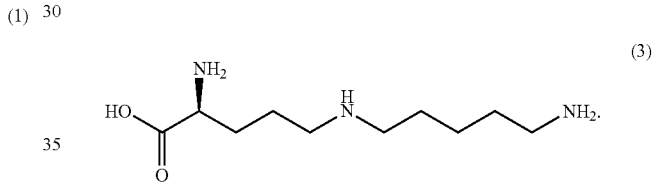

26. The method of claim 16, wherein the compound is a hydrochloride salt of (S)-2-amino-6-((3-aminopropyl)amino)hexanoic acid,

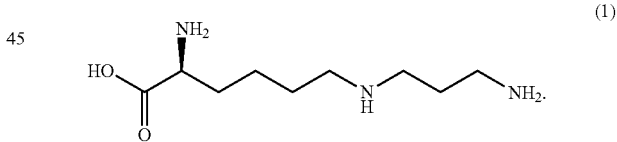

27. The method of claim 26, wherein the compound is a monohydrochloride salt, dihydrochloride salt, or trihydrochloride salt of (S)-2-amino-6-((3-aminopropyl)amino)hexanoic acid,

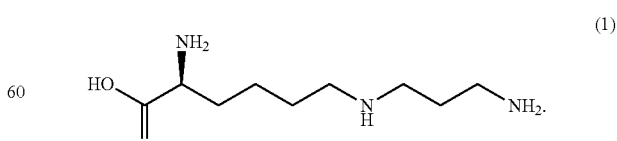

28. The method of claim 17, wherein the compound is a hydrochloride salt of (S)-2-amino-5-((6-aminohexyl)amino)pentanoic acid,

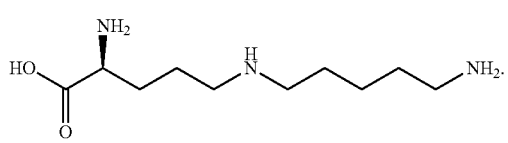

or (S)-2-amino-5-((5-aminopentyl)amino)pentanoic acid,

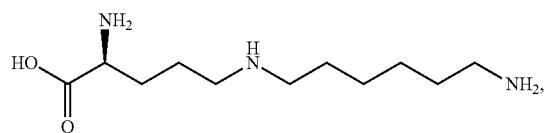

29. The method of claim 28, wherein the compound is a monohydrochloride salt, dihydrochloride salt, or trihydrochloride salt of (S)-2-amino-5-((6-aminohexyl)amino)pentanoic acid,

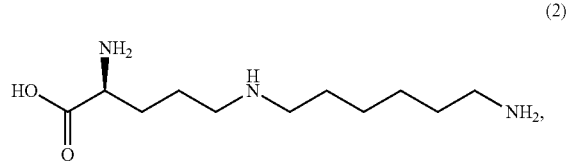 [SMILES: NCCCCCCNCCC[C@H](N)C(=O)O]

or (S)-2-amino-5-((5-aminopentyl)amino)pentanoic acid,

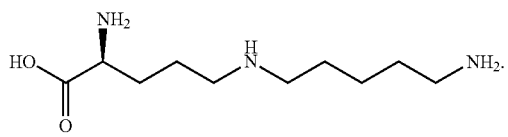

30. The method of claim 13, wherein the compound is a hydrochloride salt of (S)-2-amino-6-((3-aminopropyl)amino)hexanoic acid,

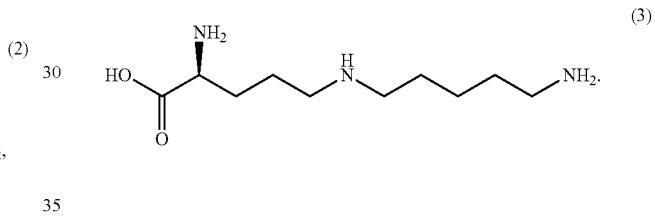

31. The method of claim 30, wherein the compound is a monohydrochloride salt, dihydrochloride salt, or trihydrochloride salt of (S)-2-amino-6-((3-aminopropyl)amino)hexanoic acid,

32. The method of claim 14, wherein the compound is a hydrochloride salt of (S)-2-amino-5-((6-aminohexyl)amino)pentanoic acid,

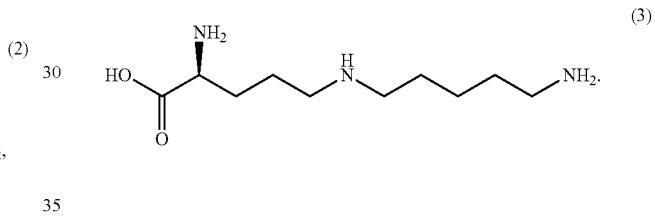

or (S)-2-amino-5-((5-aminopentyl)amino)pentanoic acid,

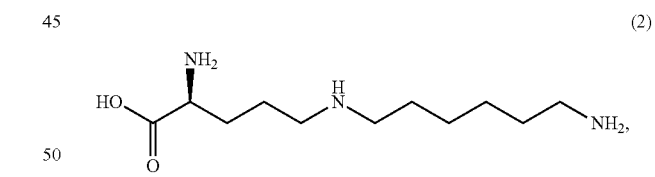

33. The method of claim 32, wherein the compound is a monohydrochloride salt, dihydrochloride salt, or trihydrochloride salt of (S)-2-amino-5-((6-aminohexyl)amino)pentanoic acid,

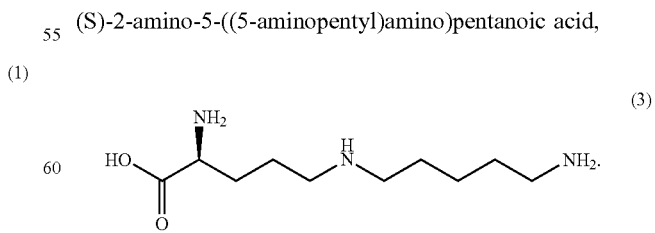

or (S)-2-amino-5-((5-aminopentyl)amino)pentanoic acid,

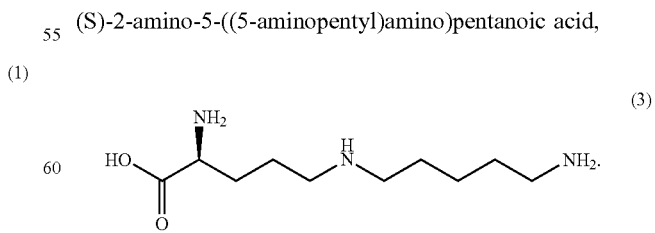

34. The method of claim 16, wherein the compound is a hydrochloride salt of (S)-2-amino-6-((3-aminopropyl)amino)hexanoic acid, (1)

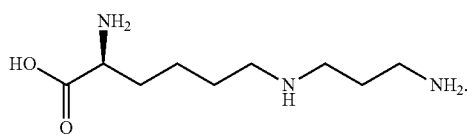

35. The method of claim 34, wherein the compound is a monohydrochloride salt, dihydrochloride salt, or trihydrochloride salt of (S)-2-amino-6-((3-aminopropyl)amino) hexanoic acid, (1)

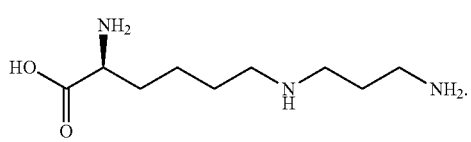

36. The method of claim 17, wherein the compound is a hydrochloride salt of (S)-2-amino-5-((6-aminohexyl)amino) pentanoic acid, (2)

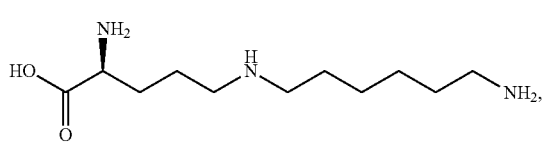

or
(S)-2-amino-5-((5-aminopentyl)amino)pentanoic acid, (3)

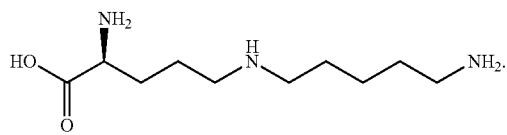

37. The method of claim 36, wherein the compound is a monohydrochloride salt, dihydrochloride salt, or trihydrochloride salt of (S)-2-amino-5-((6-aminohexyl)amino)pentanoic acid, (2)

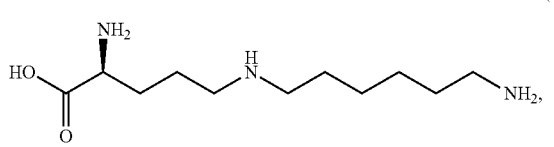

or
(S)-2-amino-5-((5-aminopentyl)amino)pentanoic acid, (3)

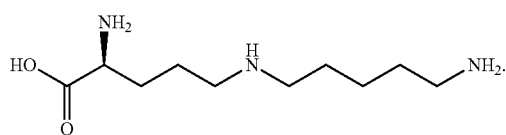

\* \* \* \* \*